US012468556B2

(12) United States Patent
Henry et al.

(10) Patent No.: US 12,468,556 B2
(45) Date of Patent: Nov. 11, 2025

(54) INTERMEDIARY DEVICE FOR OFFLOADING PROCESSING OPERATIONS FOR AN ARTIFICIAL-REALITY SYSTEM AND FOR ENABLING INTERACTIONS AND INPUT PARADIGMS, AND SYSTEMS AND METHODS OF USE THEREOF

(71) Applicant: Meta Platforms Technologies, LLC, Menlo Park, CA (US)

(72) Inventors: Emron Jackson Henry, Duvall, WA (US); Joseph N Bravate, Rockville Centre, NY (US); Roger Ibars Martinez, Seattle, WA (US); Eric Ma, Brooklyn, NY (US); Pol Pla I Conesa, Portland, OR (US); Thomas Robert Reardon, New York, NY (US); Chris Rojas, Seattle, WA (US); Ian Joseph Roth, Brooklyn, NY (US); Bryan Sparks, Sammamish, WA (US); Vikram Tank, Jersey City, NJ (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/803,030

(22) Filed: Aug. 13, 2024

(65) Prior Publication Data
US 2025/0060975 A1 Feb. 20, 2025

Related U.S. Application Data

(60) Provisional application No. 63/519,544, filed on Aug. 14, 2023.

(51) Int. Cl.
*G06F 9/445* (2018.01)
*G06F 1/16* (2006.01)
(Continued)

(52) U.S. Cl.
CPC ......... *G06F 9/44594* (2013.01); *G06F 1/163* (2013.01); *G06F 3/011* (2013.01);
(Continued)

(58) Field of Classification Search
CPC .. G06F 3/011–015; G06F 3/017; G06F 1/163; G06F 9/44594
See application file for complete search history.

(56) References Cited

U.S. PATENT DOCUMENTS

2023/0072423 A1* 3/2023 Osborn .................. G16H 20/30
2023/0074476 A1* 3/2023 Bae ..................... G06F 3/04847
(Continued)

FOREIGN PATENT DOCUMENTS

WO 2023150384 A1 8/2023

OTHER PUBLICATIONS

International Search Report and Written Opinion for International Application No. PCT/US2024/042241, mailed Nov. 27, 2024, 12 pages.

*Primary Examiner* — Patrick F Marinelli
(74) *Attorney, Agent, or Firm* — Morgan, Lewis & Bockius LLP

(57) ABSTRACT

A non-transitory computer-readable storage medium including instructions for distributing tasks between a handheld intermediary processing device (HIPD) and communicatively coupled devices is disclosed. The instructions cause one or more processors to, while a HIPD and a head-wearable device are communicatively coupled and share operational data for performing one or more computational tasks, identify one or more back-end tasks and one or more front-end tasks associated with performing the one or more computational tasks. The instructions further cause performance of the one or more back-end tasks at the HIPD including updating the operational data to create updated
(Continued)

operational data. The instructions further cause performance of the one or more front-end tasks at the head-wearable device using the updated operational data such that a representation based on the one or more computational tasks is presented to the user by the head-wearable device.

20 Claims, 40 Drawing Sheets

(51) Int. Cl.
  *G06F 3/01*     (2006.01)
  *G06F 3/0346*   (2013.01)
  *G06F 3/038*    (2013.01)
  *G06V 40/20*    (2022.01)

(52) U.S. Cl.
  CPC .............. *G06F 3/013* (2013.01); *G06F 3/015* (2013.01); *G06F 3/017* (2013.01); *G06F 3/0383* (2013.01); *G06V 40/28* (2022.01); *G06F 3/0346* (2013.01)

(56) References Cited

U.S. PATENT DOCUMENTS

| | | | |
|---|---|---|---|
| 2024/0061513 A1* | 2/2024 | Reisman | G06F 3/0485 |
| 2024/0061514 A1* | 2/2024 | Reisman | G06F 3/017 |
| 2024/0077946 A1* | 3/2024 | Agarwal | G06F 3/017 |
| 2024/0118749 A1* | 4/2024 | Holinski | G06F 3/038 |
| 2024/0168567 A1* | 5/2024 | Barachant | G06F 1/163 |
| 2024/0192765 A1* | 6/2024 | Matsimanis | G06F 3/015 |
| 2024/0192766 A1* | 6/2024 | Furtwangler | G06F 3/011 |
| 2024/0207682 A1* | 6/2024 | Matsimanis | A61B 5/1123 |
| 2024/0225520 A1* | 7/2024 | Gurovski | A61B 5/725 |
| 2024/0233233 A1* | 7/2024 | Bethurum | G06F 3/015 |
| 2024/0248553 A1* | 7/2024 | Gurovski | G06F 3/0346 |
| 2024/0252050 A1* | 8/2024 | Cabral | A61B 5/163 |
| 2024/0281029 A1* | 8/2024 | Weiss | F16M 13/04 |
| 2024/0281235 A1* | 8/2024 | Huang | G06F 1/163 |
| 2024/0284179 A1* | 8/2024 | Goudge | H04W 12/037 |
| 2024/0288958 A1* | 8/2024 | Kober | G06F 3/015 |
| 2024/0302899 A1* | 9/2024 | Edelson | G06F 3/017 |
| 2024/0310913 A1* | 9/2024 | Brenner | B60W 10/06 |
| 2024/0329738 A1* | 10/2024 | Piazza | G06F 3/015 |
| 2024/0329749 A1* | 10/2024 | Huang | G06F 3/0487 |
| 2024/0338171 A1* | 10/2024 | Goel | G06F 3/014 |
| 2024/0338908 A1* | 10/2024 | Kari | G06F 3/011 |
| 2024/0360601 A1* | 10/2024 | Khemani | G06F 1/163 |
| 2024/0403772 A1* | 12/2024 | Lafreniere | G06T 19/006 |
| 2025/0060975 A1* | 2/2025 | Henry | G06F 3/017 |
| 2025/0102812 A1* | 3/2025 | Bethel | G02B 27/0176 |

* cited by examiner

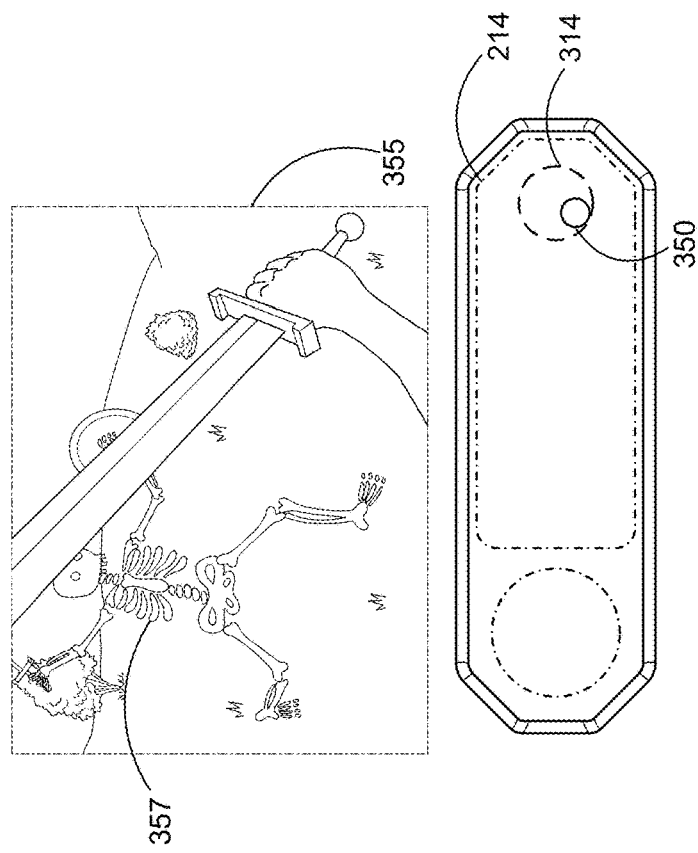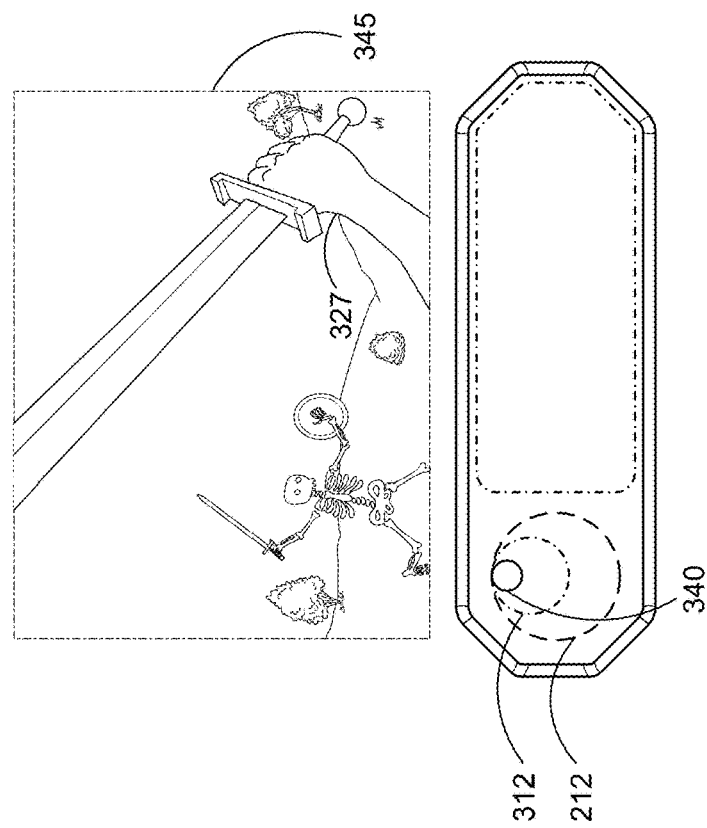
Figure 3E
Figure 3D

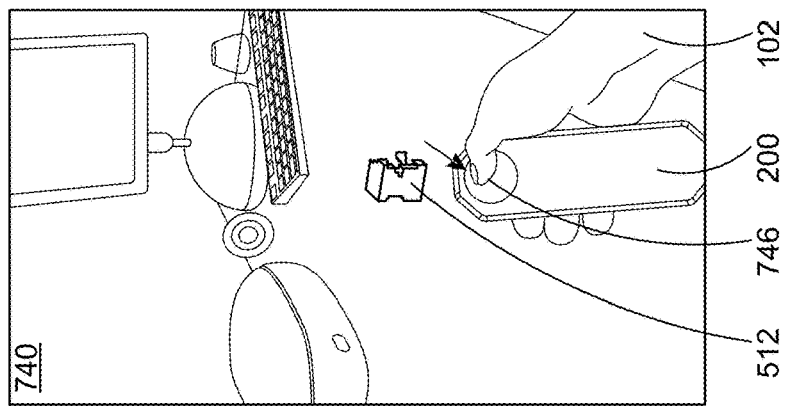
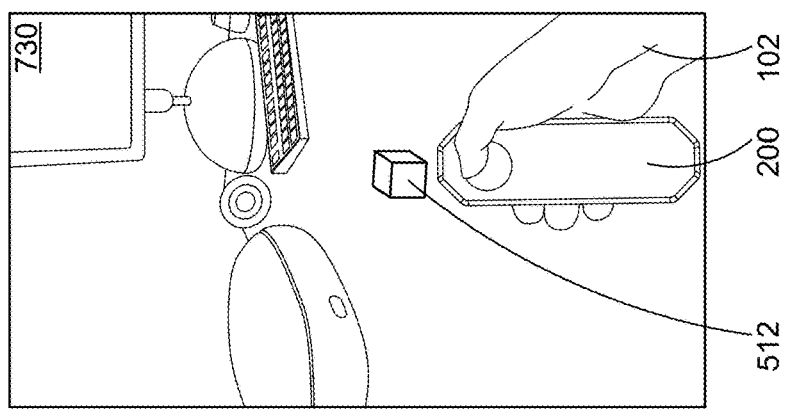
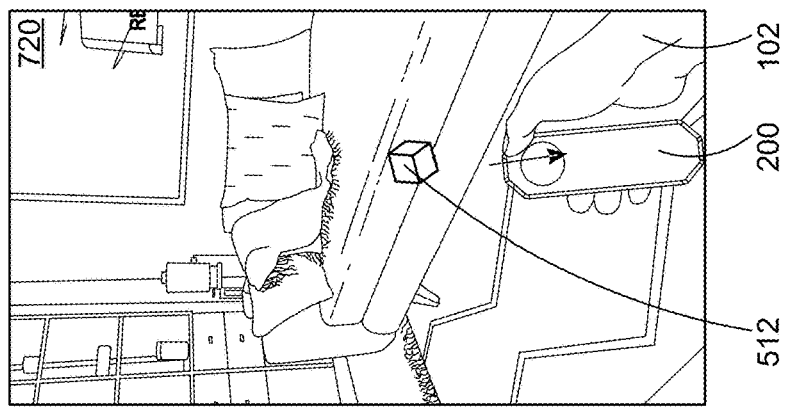
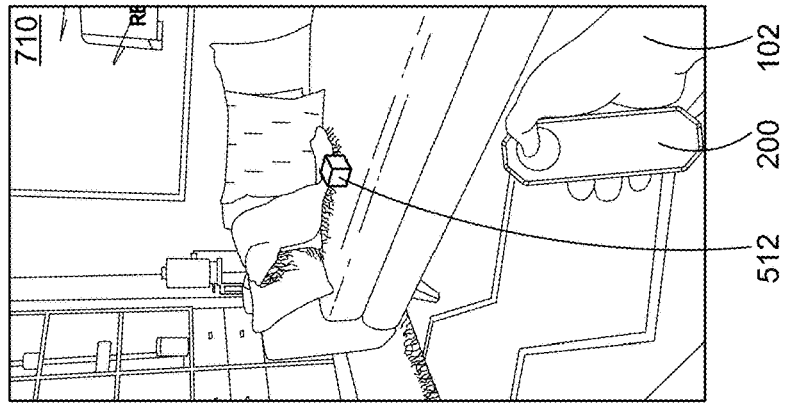

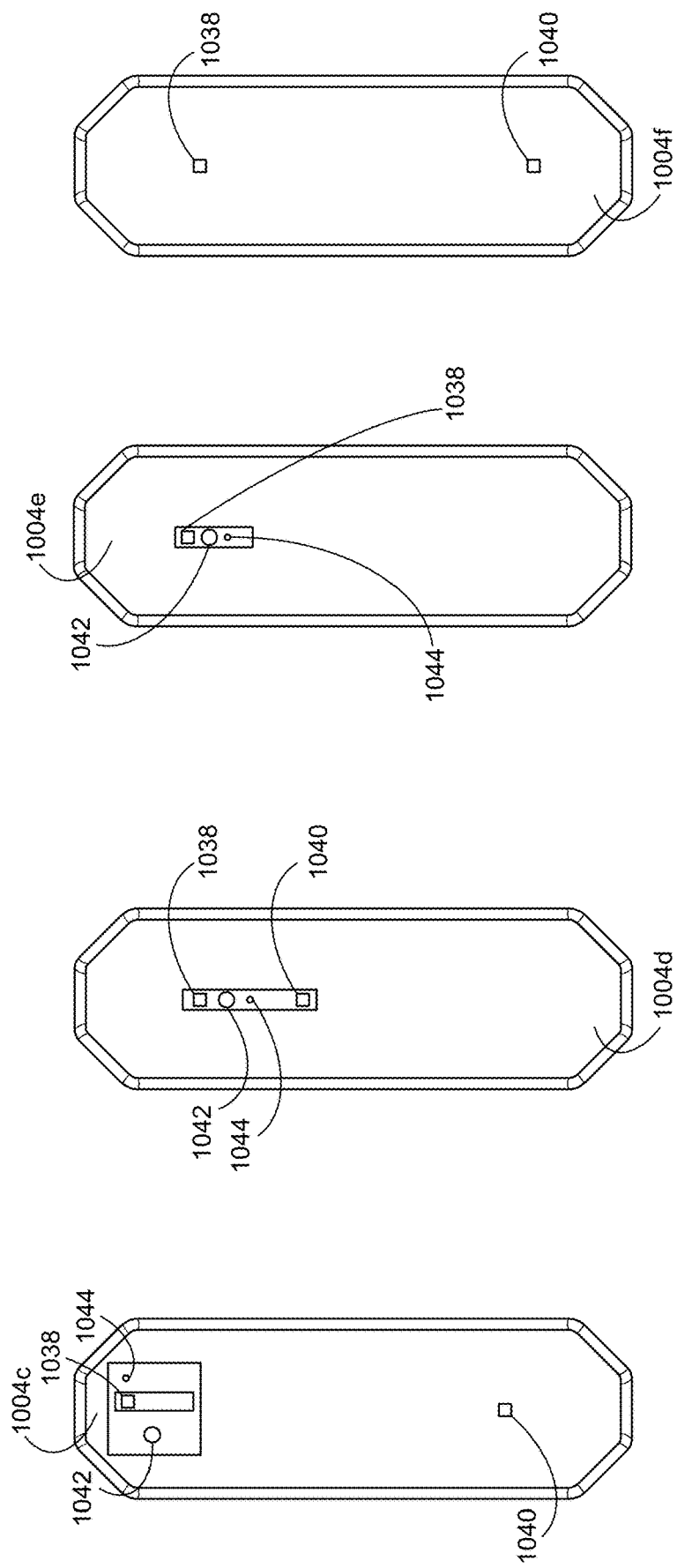
Figure 10D  Figure 10E

1800

1810
While a handheld intermediary processing device is communicatively coupled with a head-wearable device, distinct and separate from the handheld intermediary processing device, and the handheld intermediary processing device and the head-wearable device are configured to share operational data:

1820
Generate, by the handheld intermediary processing device, an artificial reality representation based on the operational data.

1830
Determine, by the handheld intermediary processing device, a location relative to the handheld intermediary processing device to present the artificial reality representation.

1840
Provide, by the handheld intermediary processing device, instructions to the head-wearable device that cause the head-wearable device to display the artificial reality representation at the location relative to the handheld intermediary processing device.

1910
While a handheld intermediary processing device and head-wearable device are communicatively coupled and share operational data for performing one or more computational tasks:

1920
Identify one or more back-end tasks and one or more front-end tasks associated with performing the one or more computational tasks.

1930
Cause performance of the one or more back-end tasks at the handheld intermediary processing device including updating the operational data to create updated operational data, wherein the updated operational data includes sensor data from the handheld intermediary processing device indicating a position of the handheld intermediary processing device.

1940
Cause performance of the one or more front-end tasks at the head-wearable device using the updated operational data such that a representation based on the one or more computational tasks is presented to the user by the head-wearable device.

Figure 19

INTERMEDIARY DEVICE FOR OFFLOADING PROCESSING OPERATIONS FOR AN ARTIFICIAL-REALITY SYSTEM AND FOR ENABLING INTERACTIONS AND INPUT PARADIGMS, AND SYSTEMS AND METHODS OF USE THEREOF

RELATED APPLICATION

This application claims priority to U.S. Provisional Patent Application No. 63/519,544, filed Aug. 14, 2023, titled "An Intermediary Device For Offloading Processing Operations For An Artificial-Reality System And For Enabling Interactions And Input Paradigms, And Systems And Methods of Use Thereof," which is hereby incorporated by reference in its entirety.

TECHNICAL FIELD

This disclosure relates generally to a handheld intermediary processing device for sharing data with communicatively coupled devices, including but not limited to techniques for processing shared data at the handheld intermediary processing device, performing one or more operations at the handheld intermediary processing device on behalf of a communicatively coupled device, and/or causing presentation of processed data at a communicatively coupled device.

BACKGROUND

Users typically carry several electronic devices at a time. For example, a student can go to school carrying a smartphone, a tablet, and a laptop, as well as wear a smartwatch and other wearable devices. Each device works independently and requires a user to interact with a particular device when performing a function. Additionally, each devices require its own power supply and computational resources that can impact the user's use. For example, process intensive tasks performed at the smartwatch can cause the smartwatch to run out of power before the day ends. In some circumstances, a user may not always have access to each device. For example, it may be impolite for a user to use their smartphone while talking to a client. Further, some wearable devices, such as virtual reality headsets and augmented reality headsets, can be bulky and heavy resulting in user fatigue after extended use.

Techniques for streamlining interactions between different electronic devices are limited. In addition, the available techniques require each device to have computational resources available to complete a task. Accordingly, there is a need for system and methods that streamline interactions between communicatively coupled devices. Additionally, there is a need for systems and methods for enabling a user to have access to communicatively electronic devices, as well as systems and methods for providing users with a rich and engaging user experience across communicatively coupled devices.

SUMMARY

The methods, systems, and devices described herein allow users to use a single device to perform one or more tasks independently and/or across several communicatively coupled devices. Specifically, the methods, systems, and devices described herein allow a user to use a handheld intermediary processing device to perform one or more operations alone and/or in conjunction with one or more wearable device, such as a wrist-wearable device, head-wearable device, and/or smart textile-based garment. The methods, systems, and devices described herein allow for low friction, efficient, and socially acceptable human-computer interactions that users can easily use to turn intent into action.

One example of a handheld intermediary processing device is described herein. This example handheld intermediary processing device is configured to communicatively coupled with a head-wearable device. The example handheld intermediary processing device includes a housing. The housing includes a multi-touch input surface, at least two imaging devices, and one or more processors. The multi-touch input surface includes a first touch-input surface defined by a surface depression of the multi-touch input surface and a second touch-input surface defined by a substantially planar portion of the multi-touch input surface. The first touch-input surface is disposed adjacent to the second touch-input surface and the surface depression of the multi-touch input surface is configured to guide user handling of the handheld intermediary processing device. The at least two imaging devices are disposed at distinct surfaces of the housing and configured to capture image data. Further, the one or more processors are configured to determine artificial-reality data including (i) positional mapping of the handheld intermediary processing device and (ii) one or more objects in proximity to the handheld intermediary processing device, such that an input detected at the multi-touch input surface is based, in part, on the AR data.

Having summarized the first aspect generally related to a handheld intermediary processing device above, a second aspect (generally related to causing presentation of data at a device communicatively coupled with a handheld intermediary processing device) is now summarized. An example method for causing presentation of data at a device communicatively coupled with a handheld intermediary processing device includes, while a handheld intermediary processing device is communicatively coupled with a head-wearable device, distinct and separate from the handheld intermediary processing device, and the handheld intermediary processing device and the head-wearable device are configured to share operational data, generating, by the handheld intermediary processing device, an artificial reality representation based on the operational data. The method further includes determining, by the handheld intermediary processing device, a location relative to the handheld intermediary processing device to present the artificial reality representation, and providing, by the handheld intermediary processing device, instructions to the head-wearable device that cause the head-wearable device to display the artificial reality representation at the location relative to the handheld intermediary processing device.

Having summarized the second aspect (generally related to causing presentation of data at a device communicatively coupled with a handheld intermediary processing device) above, a third aspect (generally related to distributing tasks between a handheld intermediary processing device and communicatively coupled devices) is now summarized. An example method for distributing tasks between a handheld intermediary processing device and communicatively coupled devices includes, while a handheld intermediary processing device and a head-wearable device are communicatively coupled and share operational data for performing one or more computational tasks, identifying one or more back-end tasks and one or more front-end tasks associated with performing the one or more computational tasks. The method further includes causing performance of the one or more back-end tasks at the handheld intermediary processing device including updating the operational data to create updated operational data. The updated operational data includes sensor data from the handheld intermediary device indicating a position of the handheld intermediary processing device. The method further includes causing performance of the one or more front-end tasks at the head-wearable device using the updated operational data such that a representation based on the one or more computational tasks is presented to the user by the head-wearable device.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 3A-3E illustrate user interactions with a handheld intermediary processing device while the handheld intermediary processing device is held in a landscape orientation, in accordance with some embodiments.

FIGS. 7A-7D illustrate further user interactions with an artificial reality object using a handheld intermediary processing device and a head-wearable device, in accordance with some embodiments.

FIGS. 10A-10G illustrate different embodiments of a handheld intermediary processing device's surfaces, in accordance with some embodiments.

FIG. 18 illustrates a flow diagram of a method for causing presentation of data at a device communicatively coupled with a handheld intermediary processing device, in accordance with some embodiments.

FIG. 19 illustrates a flow diagram of a method for distributing tasks between a handheld intermediary processing device and communicatively coupled devices, in accordance with some embodiments.

Figure 1A:
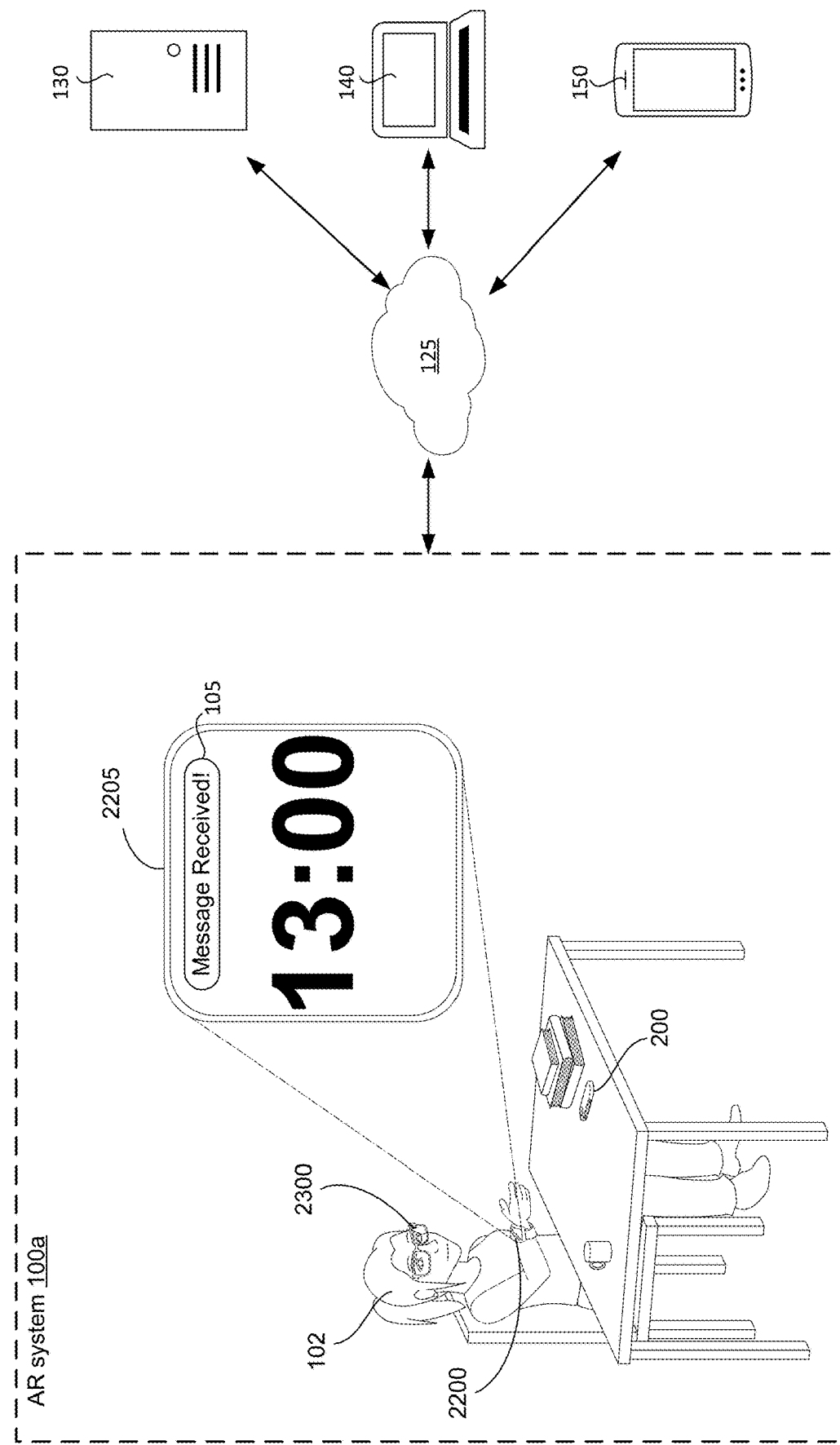
FIGS. 1A-1D illustrate an example artificial-reality system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types of extended-realities (XRs) such as mixed-reality (MR) and augmented-reality systems. While this application recites artificial-reality (AR) as a catchall term, it is understood that this term in interchangeable with the term extended-reality (XR). MRs and augmented-realities, as described herein, are any superimposed functionality and/or sensory-detectable presentation provided by MR and augmented-reality systems within a user's physical surroundings. Such MRs can include and/or represent virtual realities (VRs) and VRs in which at least some aspects of the surrounding environment are reconstructed within the virtual environment (e.g., displaying virtual reconstructions of physical objects in a physical environment to avoid the user colliding with the physical objects in a surrounding physical environment). In the case of MRs, the surrounding environment that is presented through a display is captured via one or more sensors configured to capture the surrounding environment (e.g., a camera sensor, time-of-flight (ToF) sensor). While a wearer of an MR headset can see the surrounding environment in full detail, they are seeing a reconstruction of the environment reproduced using data from the one or more sensors (i.e., the physical objects are not directly viewed by the user). An MR headset can also forgo displaying reconstructions of objects in the physical environment, thereby providing a user with an entirely VR experience. An augmented-reality system, on the other hand, provides an experience in which information is provided, e.g., through the use of a waveguide, in conjunction with the direct viewing of at least some of the surrounding environment through a transparent or semi-transparent waveguide(s) and/or lens(es) of the augmented-reality headset.

AR content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU)s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., the head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

As described herein, a handheld intermediary processing device (HIPD) is a human-machine interface controller that is configured to communicatively couple with another device, such as wrist-wearable device, a head-wearable device, and/or other computing device. The HIPD (also referred to as an intermediary device) is configured to work in conjunction with a communicatively coupled device to perform one or more computational tasks associated with one or more operations initiated at the communicatively coupled device and/or to perform one or more computational tasks on the communicatively coupled device's behalf. As such, the HIPD reduces the computer resource utilization and/or power usage of a communicatively coupled device. Alternatively, or in addition, the HIPD can cause the performance of one or more operations and provide operational data associated with the performed operations to a communicatively coupled device such that a representation of the operational data is presented to a user via the communicatively coupled device.

FIGS. 1A-1D illustrate an example artificial-reality system, in accordance with some embodiments. FIGS. 1A-1D show an AR system at distinct points in time and example user interactions using a wrist-wearable device 2200 (FIGS. 22A-22B), a head-wearable device (e.g., AR device 2300 and VR device 2310; FIGS. 23A-23C), and/or an HIPD 200 (FIGS. 2A-2E). The wrist-wearable device 2200 and one or more of its components are described below in reference to FIGS. 22A-22B; the head-wearable device and its one or more components are described below in reference to FIGS. 23A-23D; and the HIPD 200 and its one or more components are described below in reference to FIGS. 2A-2E. The wrist-wearable device 2200, the head-wearable devices, and/or the HIPD 200 can communicatively couple via a network 125 (e.g., cellular, near field, Wi-Fi, personal area network, wireless LAN, etc.). Additionally, the wrist-wearable device 2200, the head-wearable devices, and/or the HIPD 200 can also communicatively couple with one or more servers 130, computers 140 (e.g., laptops, computers, etc.), mobile devices 150 (e.g., smartphones, tablets, etc.), and/or other electronic devices via the network 125 (e.g., cellular, near field, Wi-Fi, personal area network, wireless LAN, etc.)

The wrist-wearable device 2200, the AR glasses 2300, and/or the HIPD 200 can operate alone or in conjunction to allow the user 102 to interact with the AR environment. Interactions with the AR environment include, without limitation, navigating a user interface (UI), operating an application (e.g., a messaging application, a gaming application, a financial application, a social media application, a streaming application, etc.), manipulating virtual objects (e.g., generated objects or virtual representations of real-world objects), navigating a virtual environment or representation of a real-world environment, etc. In some embodiments, interactions with an AR environment are associated with one or more one or more computational tasks that, when performed by the wrist-wearable device 2200, the AR glasses 2300, and/or the HIPD 200, cause the performance of the interaction. The HIPD 200 can be configured to detect one or more computational tasks to be performed at the HIPD 200 and/or a communicatively coupled device (e.g., the wrist-wearable device 2200 and/or the AR glasses 2300), identify one or more back-end and front-end tasks to complete performance of the one or more computational tasks, and distribute the back-end and front-end tasks such that back-end tasks are performed by the HIPD 200. For example, as described herein, the user 102 can provide an input to interact with the AR environment at any of the wrist-wearable device 2200, the AR glasses 2300, and/or the HIPD 200, and the HIPD 200 can identify one or more back-end and front-end tasks to cause the performance of the requested interaction, perform the back-end tasks, and distribute instructions (including data associated with completed back-end tasks) to cause the performance of the one or more front-end tasks at the wrist-wearable device 2200 and/or the AR glasses 2300. Alternatively, or in addition, in some embodiments, the HIPD 200 can distribute instructions to cause the performance of the one or more back-end and front-end tasks at the wrist-wearable device 2200, the AR glasses 2300, and/or the HIPD 200. For example, the HIPD 200 can cause the performance of a first set of one or more back-end tasks and distribute instructions to cause the performance of a second set of one or more back-end tasks and one or more front-end tasks at the wrist-wearable device 2200 and/or the AR glasses 2300.

In some embodiments, a back-end task is background processing task that is not perceptible by the user 102 (e.g., rendering content, decompression, compression, decryption, encryption, etc.), and a front-end task is a user-facing task that is perceptible to the user (e.g., presenting information and/or representations of data to the user, providing feedback to the user, etc.)). As described below in reference to FIGS. 2A-2B, the HIPD 200 can perform the back-end tasks and provide the wrist-wearable device 2200 and/or the AR glasses 2300 operational data corresponding to the performed back-end tasks such that the wrist-wearable device 2200 and/or the AR glasses 2300 can perform the front-end tasks. In this way, the HIPD 200, which has more computational resources and greater thermal headroom than the wrist-wearable device 2200 and/or the AR glasses 2300, performs computationally intensive tasks and reduces the computer resource utilization and/or power usage of the wrist-wearable device 2200 and/or the AR glasses 2300.

In FIG. 1A, the AR system is shown at a first point in time 100a. In FIG. 1A, a user 102 is sitting at their desk wearing the wrist-wearable device 2200 and the AR glasses 2300, as well as an HIPD 200 placed on the user 102's desk. The wrist-wearable device 2200, the AR glasses 2300, and the HIPD 200 are configured to facilitate user interactions with an AR environment. As shown in FIG. 1A, the wrist-wearable device 2200, the AR glasses 2300, and/or the HIPD 200 cause presentation of a representation of data (e.g., media content, audio data, video data, messages, and/or other information) to the user 102.

In some embodiments, the wrist-wearable device 2200, the AR glasses 2300, the HIPD 200, and/or other communicatively couple device can present one or more notifications to the user 102. The notification can be an indication of a new message, an incoming call, an application update, a status update, etc. For example, a display 2205 of the wrist-wearable device 2200 presents a UI element 105 notifying the user 102 of a received message (e.g., received from a communicatively coupled device via network 125). In some embodiments, the message can be received at the wrist-wearable device 2200 or received at the AR glasses 2300 and/or the HIPD 200 and provided to the wrist-wearable device 220 for presentation. In some embodiments, the UI element 105 notifying the user 102 of the received message is presented to the user via the AR glasses 2300. The user 102 can select the notification via the wrist-wearable device 2200, the AR glasses 2300, the HIPD 200, and cause presentation of an application or operation associated with the notification on at least one device. For example, the user 102 can receive a notification that a message was received at the wrist-wearable device 2200, the AR glasses 2300, the HIPD 200, and/or other communicatively couple device, and the user 102 can provide a user input at the wrist-wearable device 2200, the AR glasses 2300, and/or the HIPD 200 to view the message (e.g., which in turn causes an application associated with the notification to be initiated and/or presented at the wrist-wearable device 2200, the AR glasses 2300, and/or the HIPD 200).

The user 102 can use any of the wrist-wearable device 2200, the AR glasses 2300, and/or the HIPD 200 to provide user inputs. For example, the user 102 can perform one or more hand gestures that are detected by the wrist-wearable device 2200 (e.g., using one or more electromyography (EMG) sensors and/or IMUs inertial measurement units (IMU) s, described below in reference to FIGS. 22A-22B) and/or AR glasses 2300 (e.g. using one or more image sensors or cameras, described below in reference to FIGS. 23A-23B) and provided as a user input. Alternatively, or in addition, the user 102 can provide a user input via one or more touch surfaces of the wrist-wearable device 2200, the AR glasses 2300, and/or the HIPD 200. In some embodiments, the user can also use one or more microphones of the wrist-wearable device 2200, the AR glasses 2300, and/or the HIPD 200 to provide voice commands that are associated with one or more user inputs. In some embodiments, the wrist-wearable device 2200, the AR glasses 2300, and/or the HIPD 200 include a digital assistant to help the user in providing a user input (e.g., completing a sequence of operations, suggesting different operations or commands, providing reminders, confirming a command, etc.). In some embodiments, the user 102 can provide a user input via one or more facial gestures and/or facial expressions. For example, cameras of the wrist-wearable device 2200, the AR glasses 2300, and/or the HIPD 200 can track the user 102's eyes for navigating a UI.

Figure 1B:
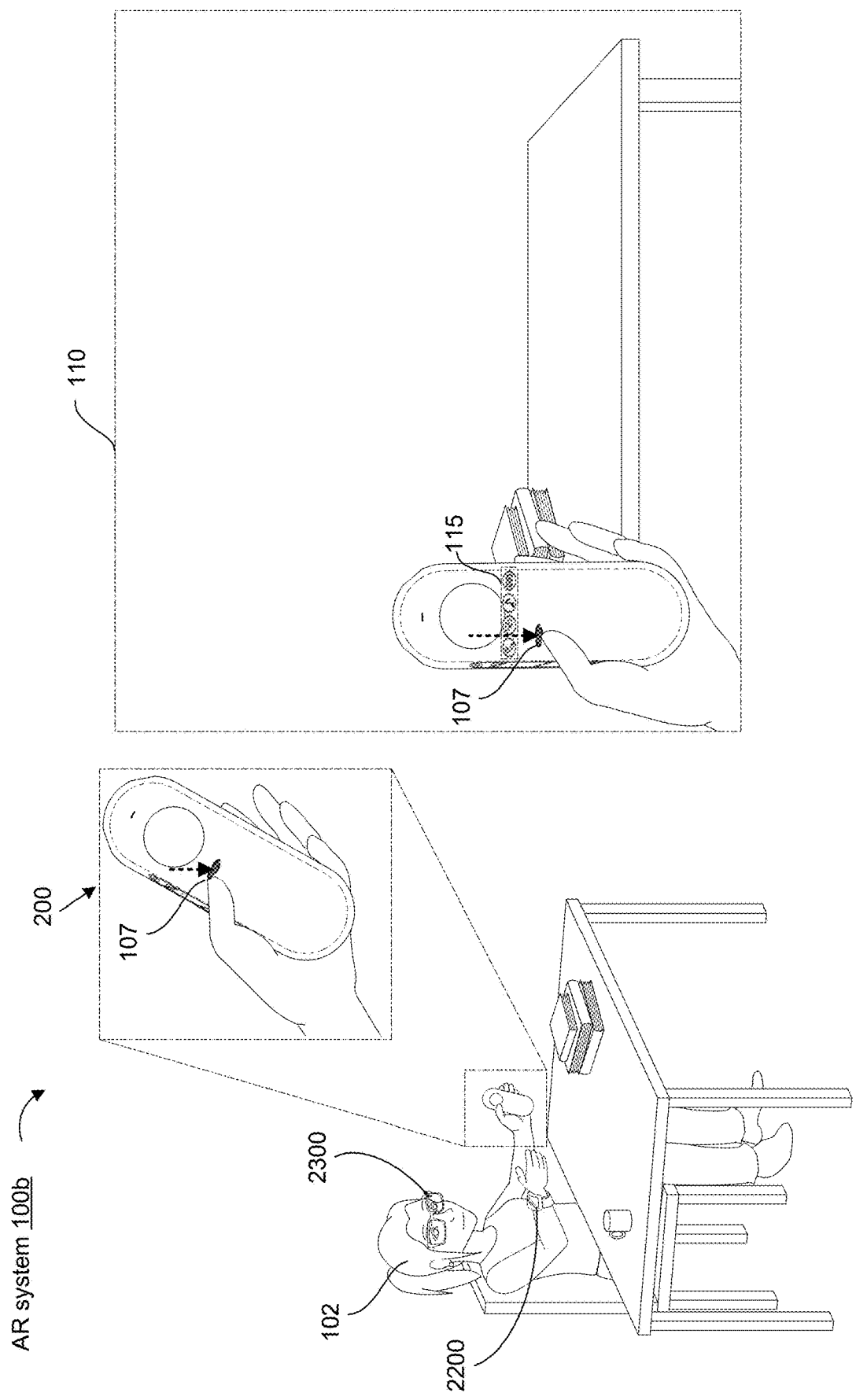

Turning to FIG. 1B, the AR system at a second point in time 100b is shown. In FIG. 1B, the user 102 is holding the HIPD 200 while still wearing the wrist-wearable device 2200 and the AR glasses 2300. A representation of the user 102's field of view 110, as seen through the AR glasses 2300, is also shown. User inputs provided at the wrist-wearable device 2200, the AR glasses 2300, and/or the HIPD 200 are coordinated such that the user can use any device to initiate, continue, and/or complete an operation. For example, the user 102, in response to the received message at the first point in time 100a, can use the HIPD 200 to access the received message (as shown below in reference to FIG. 1C).

In some embodiments, the HIPD 200 is configured to operate as a central hub or control center for the wrist-wearable device 2200, the AR glasses 2300, and/or another communicatively coupled device. When operating as a central hub or control center, the HIPD 200 can cause a communicatively coupled display (e.g., a display of the wrist-wearable device 2200 and/or the AR glasses 2300) to present an AR representation of a control center UI 115 at a relative location of the HIPD 200. For example, as shown in FIG. 1B, the AR glasses 2300 cause the control center UI 115 to be presented in the user 102's field of view 110. Alternatively, the user 102 can point the wrist-wearable device 2200 in the direction of the HIPD (e.g., while a camera of the wrist-wearable device 2200 captures a portion of the HIPD 200) to view the control center UI 115 via the wrist-wearable device 2200. The control center UI 115 can include one or more UI elements, that when selected, cause performance of an operation. For example, UI elements of the control center UI 115 when selected can cause the initiation of a calling application, a messaging application, a music application, an image capturing application, and/or other types of applications.

The HIPD 200 is configured to cause the control center UI 115 to be presented in a one point perspective, a second point perspective (e.g., when the HIPD 200 at an angle in front of the user 102's field of view 110), and/or third point perspective based on the user's view angle relative to the HIPD 200. For example, when the HIPD 200 directly in front of the user 102's field of view 110, the user 102 can view the control center UI 115 as substantially 2-dimensional (e.g., one point perspective); when the user 102 views the HIPD 200 at an angle, the user 102 can view the control center UI 115 as 3-dimensional and/or partially rotated along one axis (e.g., two point perspective); and when the user 102 views the HIPD 200 at different angles and different heights, the user 102 can view the control center UI 115 as 3-dimensional and/or partially rotated along two axes (e.g., three point perspective). In some embodiments, the HIPD 200 causes the control center UI 115 to be presented above a portion of its surface. Alternatively, in some embodiments, the control center UI 115 is presented offset a predetermined distance (e.g., 1 cm, 3 cm, 5 cm, etc.) from the HIPD 200 (e.g., presented at a left, right, down, up, or diagonal from the surface of the HIPD 200).

The control center UI 115 is presented to the user 102 in response to a user input at the HIPD 200. The user input at the HIPD 200 can be a touch input at a surface of the HIPD 200 (e.g., detected via a capacitive touch sensor, force sensor, pressure sensor, etc.) and/or a voice command detected by one or more microphones of the of the HIPD 200. For example, as shown in FIG. 1B, the user 102 performs a downward press 107 on a surface of the HIPD 200. Alternatively, or in addition, in some embodiments, the wrist-wearable device 2200, the AR glasses 2300, and/or another communicatively coupled device detect a user input provide instructions for performing a particular action or command at the HIPD 200.

Figure 1C:
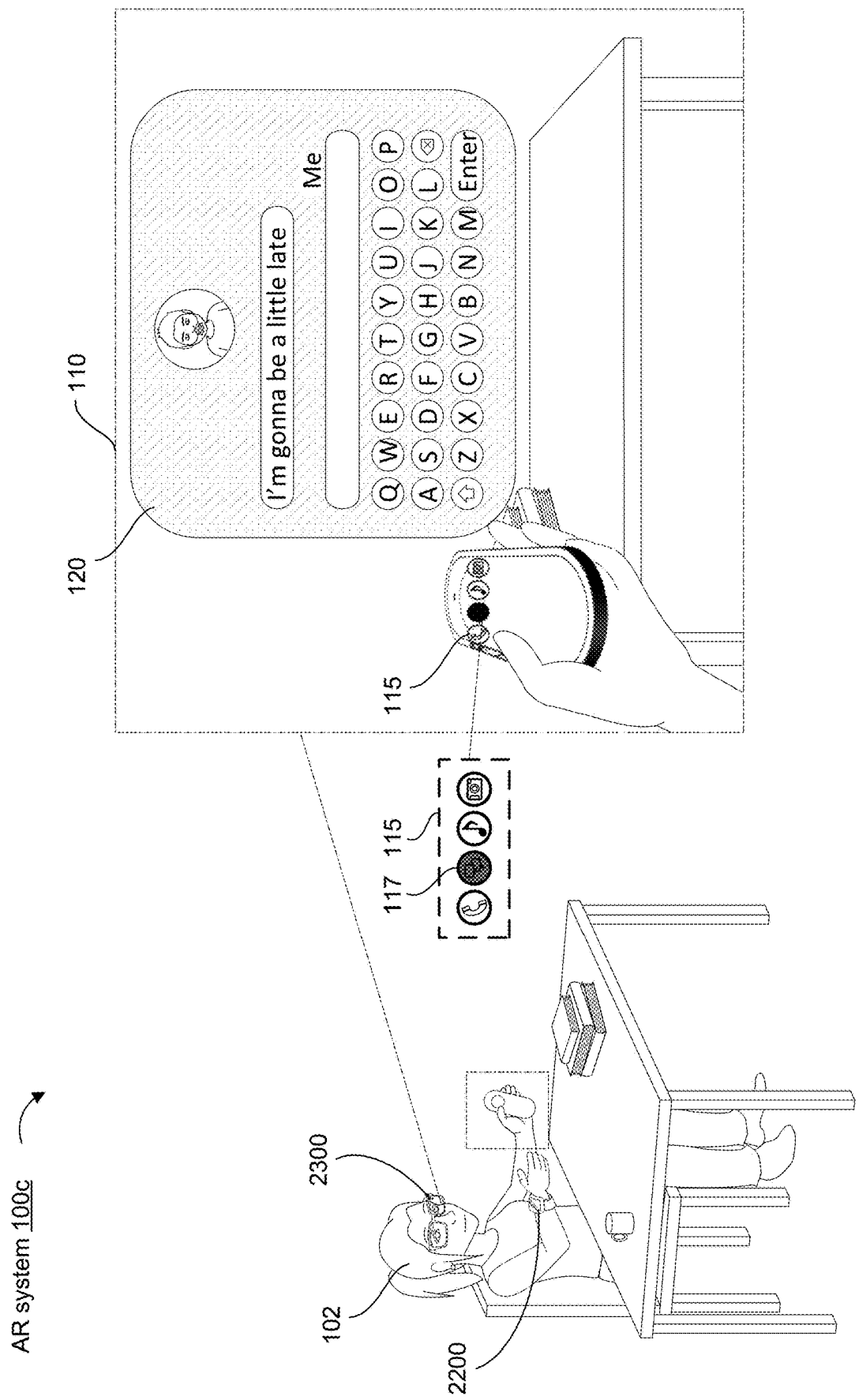

In FIG. 1C, the AR system at a third point in time 100c is shown. At the third point in time 100c, an AR representation of a messaging UI 120 is shown to the user 102 via the AR glasses 2300. The AR representation of the messaging UI 120 is presented to the user 102 in response to selection of the messaging application UI element 117 of the control center UI 115. In some embodiments, the user 102 selects the messaging application UI element 117 by contacting a surface of the HIPD 200 adjacent to the messaging application UI element 117 (e.g., directly beneath, above, and/or below the messaging application UI element 117). In some embodiments, the user 102 can select the messaging application UI element 117 by pointing and/or moving their finger through the AR representation of the messaging application UI element 117. Alternatively, or in addition, in some embodiments, the user 102 performs a hand gesture associated with a command for initiating the messaging application that is detected by the wrist-wearable device 2200, the AR glasses 2300, and/or the HIPD 200. As noted above in FIG. 1B, the control center UI 115 is presented above a surface of the HIPD 200, as such, the user 102 does not need to make physical contact with the HIPD 200 to select the messaging application UI element 117. More specifically, the wrist-wearable device 2200, the AR glasses 2300, and/or the HIPD 200 detect, based on sensor data and/or image data, a gesture performed by the user 102 selecting the messaging application UI element 117.

In response to user selection of the messaging application UI element 117, the HIPD 200 can cause the AR glasses 2300 to present both the control center UI 115 and the messaging UI 120 within the user's field of view 110. For example, the HIPD 200 can cause the AR glasses 2300 to display the control center UI 115 above a portion of the HIPD 200 and the messaging UI 120 to be presented at a different portion of the user 102's field of view. The control center UI 115 is presented such that it visible from the HIPD 200 while the HIPD 200 is held at different angles and orientations. Additionally, the messaging UI 120 can be presented in different sizes and/or with different transparencies such that the user 102's view is not obstructed. The user 102 can provide user input via the wrist-wearable device 2200, the AR glasses 2300, and/or the HIPD 200 to dismiss the control center UI 115 (e.g., such that it is no longer displayed). In some embodiments, after selection of a particular UI element within the control center UI 115, the HIPD 200 causes a respective application UI to be presented by a communicatively coupled display (e.g., display of the AR glasses 2300) and ceases to cause the control center UI 115. For example, after selection of the messaging application UI element 117, the HIPD 200 can cause the AR glasses 2300 to present the messaging UI 120 within the user's field of view 110 and automatically cease presenting the control center UI 115.

In some embodiments, the messaging UI 120 is automatically and/or temporarily hidden based on sensor data and/or other external factors that may require the user 102's attention. For example, a person entering the user 102's field of view 110 can cause the messaging UI 120 to be temporarily hidden to allow the user 102 determine whether his attention is needed. Additionally, or alternatively, in some embodiments, the messaging UI 120 is hidden based on input provided by the user 102.

As shown and described in reference to FIGS. 1A-1D, the wrist-wearable device 2200, the AR glasses 2300, and/or the HIPD 200 detect and coordinate one or more user inputs to initiate a messaging application and prepare a response to a received message via the messaging application. While the messaging UI 120 is presented to the user 102, the wrist-wearable device 2200, the AR glasses 2300, and/or the HIPD 200 can receive and/or send one or more messages (e.g., to one or more contacts associated with a message or a message thread of the messaging UI 120). The messaging UI 120 is updated with any messages received and/or sent via the wrist-wearable device 2200, the AR glasses 2300, and/or the HIPD 200.

While the user 102 initiated the messaging application via the HIPD 200, the messaging application can be operating on any of the wrist-wearable device 2200, the AR glasses 2300, and/or the HIPD 200. As described above, each of the devices can operate alone or in conjunction with one another. In some embodiments, an application is initiated and operated on the device (e.g., the wrist-wearable device 2200, the AR glasses 2300, and/or the HIPD 200) that detects the user input for initiating the application. The device operating the application can provide another communicatively coupled device operational data to cause the presentation of the operations and/or applications running on the device operating the application. For example, the wrist-wearable device 2200 can detect the user input to initiate a messaging application; initiate and operate (e.g., run) the messaging application; and provide operational data to the AR glasses 2300 and/or the HIPD 200 to cause presentation of the messaging application. Alternatively, the application can be initiated and operated at a device other than the device that detected the user input. For example, the wrist-wearable device 2200 can detect the hand gesture associated with initiating the messaging application and cause the HIPD 200 to run the messaging application and coordinate the presentation of the messaging application.

Figure 1D:
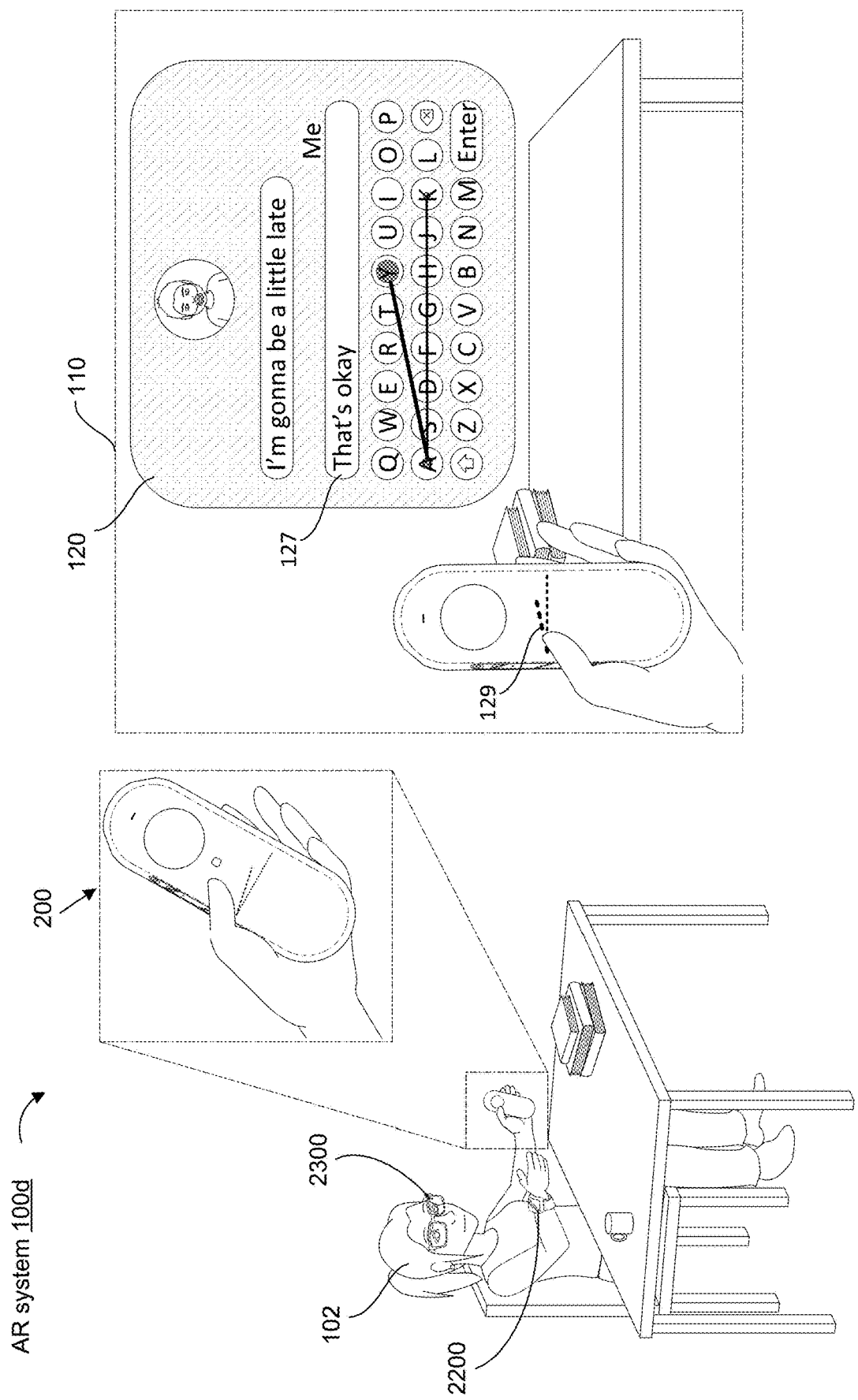

FIG. 1D shows the AR system at a fourth point in time 100*d*. At the fourth point in time 100*d*, the wrist-wearable device 2200, the AR glasses 2300, and/or the HIPD 200 continue and/or complete an initiated operation (e.g., viewing and/or responding to a received message). In particular, after initiating the messaging application and while the AR glasses 2300 present the messaging UI 120, the user 102 provides an input at the HIPD 200 to prepare a response 127 to the received message (e.g., shown by the swipe gesture 129 performed on the HIPD 200). The user 102's gestures performed on the HIPD 200 can be provided and/or displayed on another device. For example, the user 102's swipe gestures performed on the HIPD 200 are displayed on a virtual keyboard of the messaging UI 120 displayed by the AR glasses 2300. This allows the user 102 to track their inputs such that they can provide an intended response. The swipe gesture 129 can be performed at different portions of the HIPD 200's surface and detected. Text inputs provided using the HIPD 200 are discussed in detail below in reference to FIG. 8A.

The user 102 can use any of the wrist-wearable device 2200, the AR glasses 2300, and/or the HIPD 200 to cause the performance of one or more control action, such as confirm and send the prepared response 127. For example, the user 102 can perform one or more hand gestures that, when detected by the wrist-wearable device 2300, the AR glasses 2300, and/or the HIPD 200, cause at least one device of the AR system to send the prepared response 127 to another device (distinct from the wrist-wearable device 2200, the AR glasses 2300, and/or the HIPD 200). In some embodiments, the user 102 can provide one or more voice commands and/or mechanical inputs (e.g., actuation of one or more buttons, sliders, knobs, etc.) to cause the performance of one or more control action. Alternatively, or in addition, the user 102 can utilize a digital assistant of the wrist-wearable device 2200, the AR glasses 2300, and/or the HIPD 200 to cause the performance of one or more control actions.

While the above examples describe coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR glasses 2300 can present to the user 102 game application data and the HIPD 200 can use a controller to provide inputs to the game. Similarly, the user 102 can use the wrist-wearable device 2200 to initiate a camera of the AR glasses 2300, and the user can use the wrist-wearable device 2200, the AR glasses 2300, and/or the HIPD 200 to manipulate the image capture (e.g., zoom in or out, apply filters, etc.) and capture image data. Further, as the skilled artisan will appreciate upon reading the descriptions provided herein, the user 102 can initiate an application via user input at the wrist-wearable device 2200, the AR glasses 2300, and/or the HIPD 200 and, responsive to the user input, the application can be initiated (and operate) operate on at on at least one communicatively coupled device.

Although not shown, in some embodiments, the HIPD 200 can be used in conjunction with a smart textile-based garment (e.g., wearable gloves) to cause the performance of one or more control action and/or facilitate operation of the smart textile-based garment with one or more communicatively coupled devices (e.g., a head-wearable device and/or a wrist-wearable device 2200). For example, the HIPD 200 can cause the smart textile-based garment to provide a user with a haptic response based on gaming application presented to the user via the AR glasses 2300, and the HIPD 200 can cause the performance of a control action within the gaming application based on in input provided by the user via the smart textile-based garment.

Figure 2A:
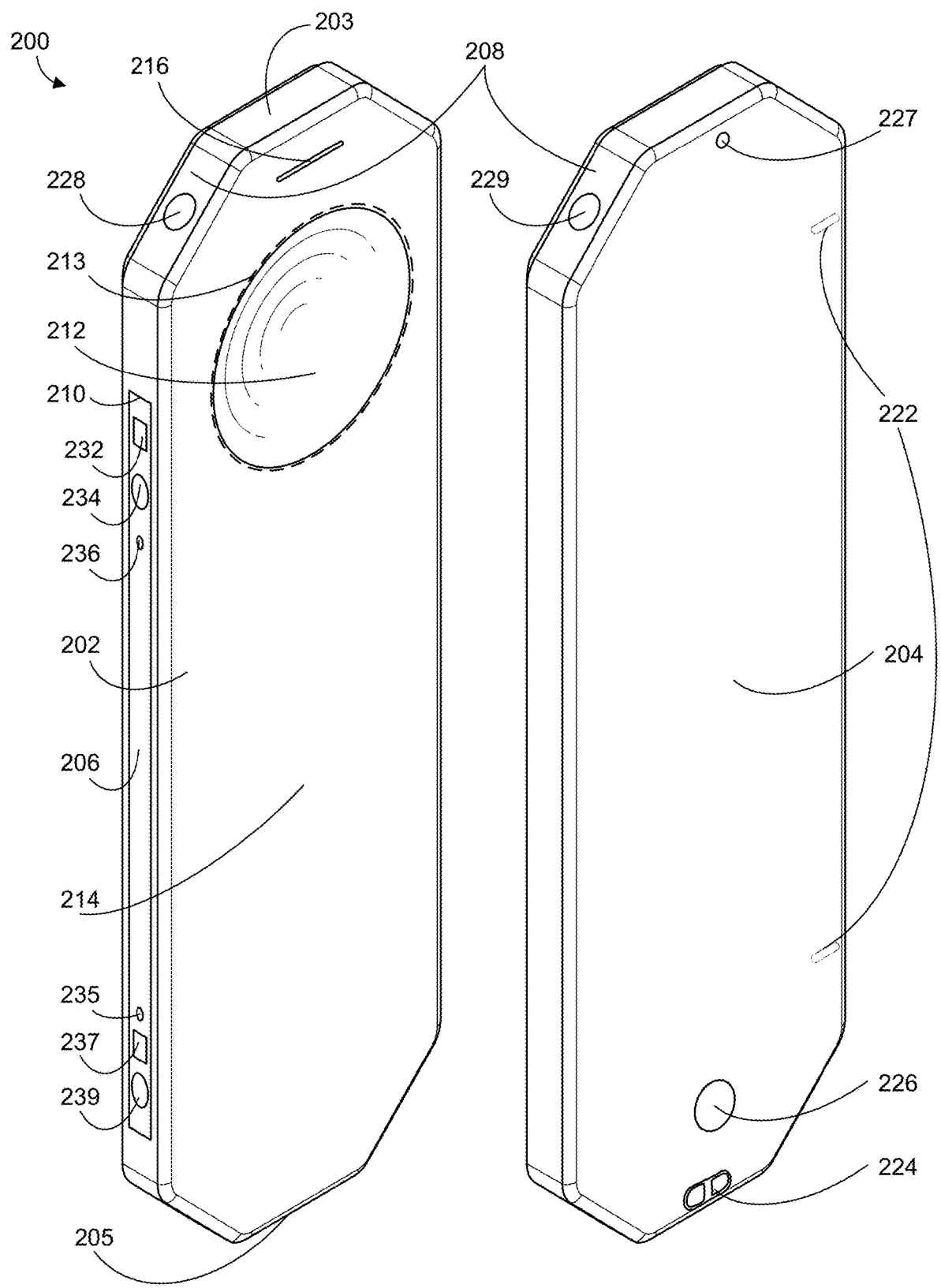
FIGS. 2A-2E illustrate example handheld intermediary processing devices and example components, in accordance with some embodiments.

FIGS. 2A-2E illustrate example handheld intermediary processing devices and example components, in accordance with some embodiments. FIG. 2A illustrates an example handheld intermediary processing device, in accordance with some embodiments. The HIPD 200 includes of a housing including a multi-touch input surface 202, one or more imaging devices (e.g., imaging devices 228, 229, 232, and 237), one or more sensors (e.g., ambient light sensors 235, depth sensors, pressure sensors, IMUs, magnetometers, altimeters, etc.), one or more illumination sources (e.g., light emitting diodes (LED)s 216, 227, and 236). As discussed below in reference to FIG. 2E, the HIPD 200 includes a peripherals interface 250 for interfacing with one or more components, such as a haptics device 271, the one or more imaging devices, the one or more sensors, etc. The HIPD 200 further includes one or more processor (e.g., central processing unit (CPU) 277), a controller 275, and memory 278 for providing one or more instructions to different components of the HIPD 200. The HIPD 200 also includes at least one communications component for communicatively coupling with at least one other device and power system 295 (including a charger input and/or output 296 for charging a battery 298). The charger input and/or output 296 can be a USB-C port (e.g., at a bottom portion 205 of the HIPD 200) are any other port to provide power to the HIPD 200. Alternatively, or in addition, in some embodiments, the charger input and/or output 296 is configured to facilitate wireless charging (e.g., resonance charging, inductive charging, radio frequency charging, etc.).

The multi-touch input surface 202 is configured to detect one or more user inputs. The multi-touch input surface 202 can include a first touch-input surface 212 and a second touch-input surface 214. In some embodiments, the first touch-input surface 212 and the second touch-input surface 214 are adjacent to one another. The first touch-input surface 212 is defined by a surface depression of the multi-touch input surface 202 and the second touch-input surface 214 is defined by a substantially planar portion of the multi-touch input surface 202. In some embodiments, the surface depression is substantially circular. The surface depression is configured to guide the user when handling the HIPD 200, such that the user's thumb rests on top of the surface depression. In some embodiments, the multi-touch input surface 202 includes a plurality of touch-input regions as shown and described below in reference to FIGS. 2B-2D.

The multi-touch input surface 202 (including each respective touch-input zone and/or surface) is configured to detect a single tap, a double tap, a triple tap, a hard tap, a soft tap, rapid taps, and/or a combination of any of thereof. The multi-touch input surface 202 is configured to detect different pressure or forces applied to the touch-input surfaces. In some embodiments, the multi-touch input surface 202 is configured to detect dragging and/or sliding inputs (e.g., unbroken movement of an input as it moves from one portion of the multi-touch input surface 202 to another portion). Additionally, the multi-touch input surface 202 is configured to detect held gestures (e.g., maintained contact with the multi-touch input surface 202 or a portion thereof), drawn gestures (e.g., predefined or user defined symbols, drawings, patterns, etc.), tap gestures (e.g., predefined or user defined tap patterns).

In some embodiments, the multi-touch input surface 202 includes one or more one or more illumination sources. For example, the multi-touch input surface 202 can include a first LED 216 to provide status indications to the user. For example, the first LED 216 can notify the user when the HIPD 200 is active (e.g., on, off, idle, etc.), when the user receives a message, a battery life of the HIPD 200. In some embodiments, one or more touch-input surfaces include one or more illumination sources. For example, the first touch-input 212 can include a light ring that is configured to illuminate when the user provides an input at the first touch-input surface 212 (e.g., when the user adjusts a volume, scrolls through a menu, etc.) and/or to communicate additional information to the user (e.g., message received, battery level, etc.).

In some embodiments, the housing of the HIPD 200 includes a second surface 204, opposite of the multi-touch input surface 202. In some embodiments, the second surface 204 includes a physical button 226. The physical button 226 can be pressed by the user to cause the HIPD 200 to perform at least one command at the HIPD 200 and/or a communicatively coupled device (e.g., turn the HIPD 200 on and/or off, initiate a communicatively coupling process with another device (e.g., the head-wearable device (e.g., AR device 2300), the wrist-wearable device 2200), and/or reset the HIPD 200). In some embodiments, the user 102 may perform different types of presses (e.g., single press, double press, long press) at the physical button 226 to perform different commands. Alternatively, or in addition, in some embodiments, the physical button 226 is a capacitive button configured to detect user inputs.

In some embodiments, the second surface 204 includes at least one elastomer protrusion 222, which supports the HIPD 200 in an upright position when placed on a surface (e.g., on a desk, table, etc.). In other words, the elastomer protrusion 222 can operate as a kickstand to be used by the user. In some embodiments, at least a portion of the second surface 204 is magnetic, such that the user can coupled the HIPD 200 to an opposite surface, a charger, etc. In some embodiments, the second surface 204 includes a bezel 224, which allows the user to couple a lanyard and/or another device to assist the user in holding the HIPD 200.

In some embodiments, one or more imaging device are located at a top portion 203 of the HIPD 200. For example, as shown in FIG. 2A, a first imaging device 228 and a second imaging device 229 are located adjacent to the first touch-input surface 212 of the multi-touch input surface 202. As further shown in FIG. 2A, the first and second imaging devices 228 and 229 can be located at opposite sides of the housing of the HIPD 200. The first and second imaging devices 228 and 229 provide image data for performing simultaneous localization and mapping (SLAM) processing. SLAM processing is used for six degree of freedom (6DoF) movement detection and/or other AR gesture detection, as shown and described below in reference to FIGS. 5A-7D.

In some embodiments, a set of one or more sensors (e.g., represented by sensor screen surface 210) are located at a side surface 206 of the HIPD 200 (e.g., a longitudinal portion of the HIPD 200 extending from the top portion 203 and the bottom portion 205). The set of one or more sensors can include a third imaging device 232, a fourth imaging device 237, a depth projector 234, a depth receiver 239, and the ambient light sensor 235. In some embodiments, the set of one or more sensors includes an illumination source (e.g., LED 236). In some embodiments, the third and fourth imaging devices 232 and 237 are red-green-blue (RGB) cameras. In some embodiments, the set of one or more sensors are positioned at a predetermined tilt relative to the multi-touch input surface 202 (e.g., a tilt angle of 26 degrees). The predetermined tilt allows for the set of one or more sensors to be angled toward the user when the HIPD 200 is placed on a flat surface (e.g., a table, desk, etc.). The set of one or more sensors can be used for Indirect Time-of-Flight (iToF) and/or Time-of-Flight (ToF) determinations. In some embodiment, illumination source operates as a privacy indicator that is illuminated when the one or more imaging devices are active. In some embodiments, the set of one or more sensors are used for 3 dimensional or 2.5-dimensional video calling as described herein.

In some embodiments, the HIPD 200 does not include a display; however, the HIPD 200 can work in conjunction with another wearable device to cause the presentation of information. For example, as described below in reference to FIGS. 1A-1D, the HIPD 200 can operate as a central hub or anchor point for causing the presentation of information. In some embodiment, the HIPD 200 generates AR processing data for presentation at a communicative coupled display (e.g., display of the head-wearable device (e.g., AR device 2300 and VR device 2310; FIGS. 23A-23C), wrist-wearable device 2200, and/or other device).

Figure 2D:
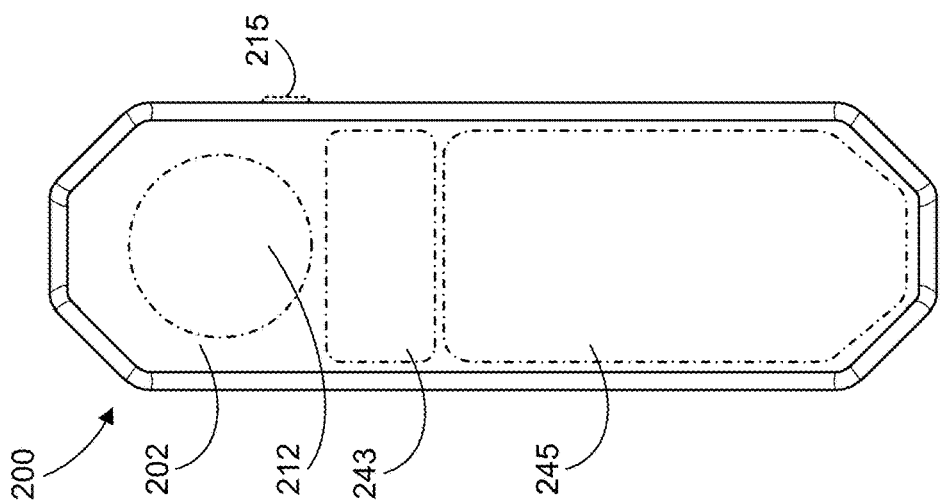
Figure 2C:
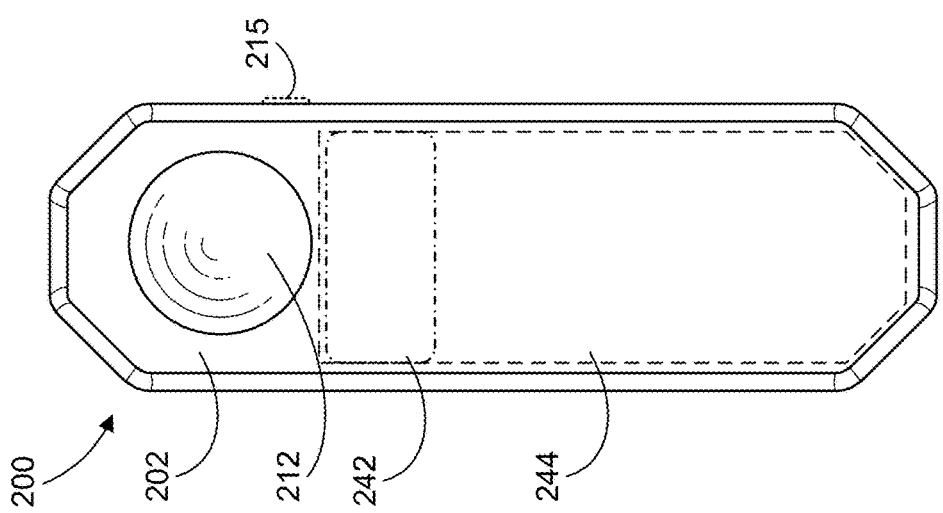
Figure 2B:
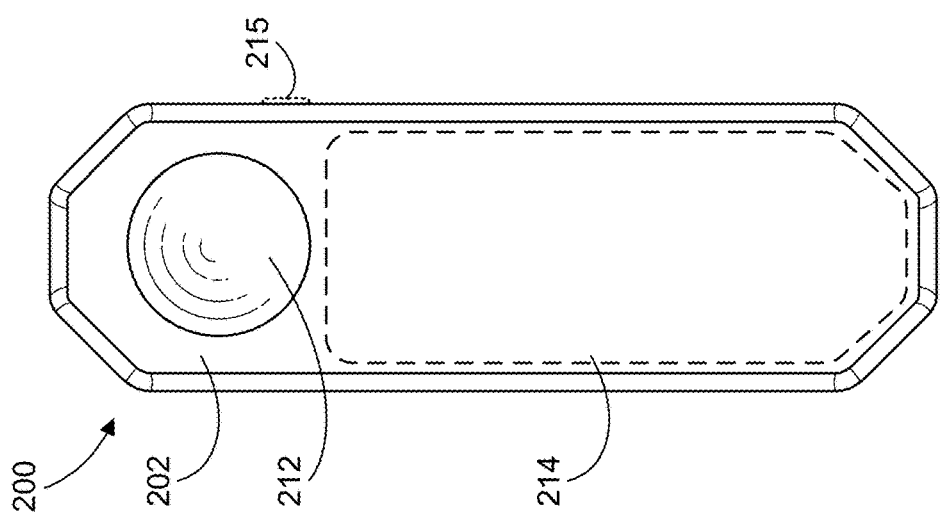

FIGS. 2B-2D illustrate one or more zone configurations of the multi-touch input surface 202. As described above in reference to FIG. 2A, the multi-touch input surface 202 can include a plurality of touch-input regions. The plurality of touch-input regions can be selected from a set of predefined touch-input regions or defined by the user. Non-limiting examples of the plurality of touch-input regions are show in FIGS. 2B-2D. In FIG. 2B, a first plurality of touch-input regions includes the first touch-input surface 212 and the second touch-input surface 214. In FIG. 2C, a second plurality of touch-input regions include the first touch-input surface 212 and the second touch-input surface 214. The second touch-input surface 214 is partitioned into a first region 242 of the second touch-input surface 214 and a second region 244 of the second touch-input surface 214 (where the first region 242 of the second touch-input surface 214 is within the second region 244 of the second touch-input surface 214). In FIG. 2D, a third plurality of touch-input regions include the first touch-input surface 212, an intermediary region 243, and bottom surface region 245 (where the intermediary region 243 and the bottom surface region 245 are distinct regions that define the second touch-input surface 214). FIGS. 2B-2D also show an optional side button 215.

In some embodiments, each region of the plurality of region is associated with one or more commands. For example, the first touch-input surface 212 can be associated with a first set of one or more commands, the first region 242 of the second touch-input surface 214 can be associated with a second set of one or more commands, and the second region 244 of the second touch-input surface 214 can be associated with a third set of one or more commands. In some embodiments, one or more commands of a respective set of commands are the same. Alternatively, in some embodiments, one or more commands of the respective set of commands are distinct. The first region 242 (or the intermediary region 243) is configured to operate as a launcher zone. The launcher zone is configured to cause presentation of the control center UI 115 in response to a user input (e.g., a downward press). Examples inputs at the HIPD 200 are discussed below in reference to FIGS. 3A-8C.

Figure 2E:
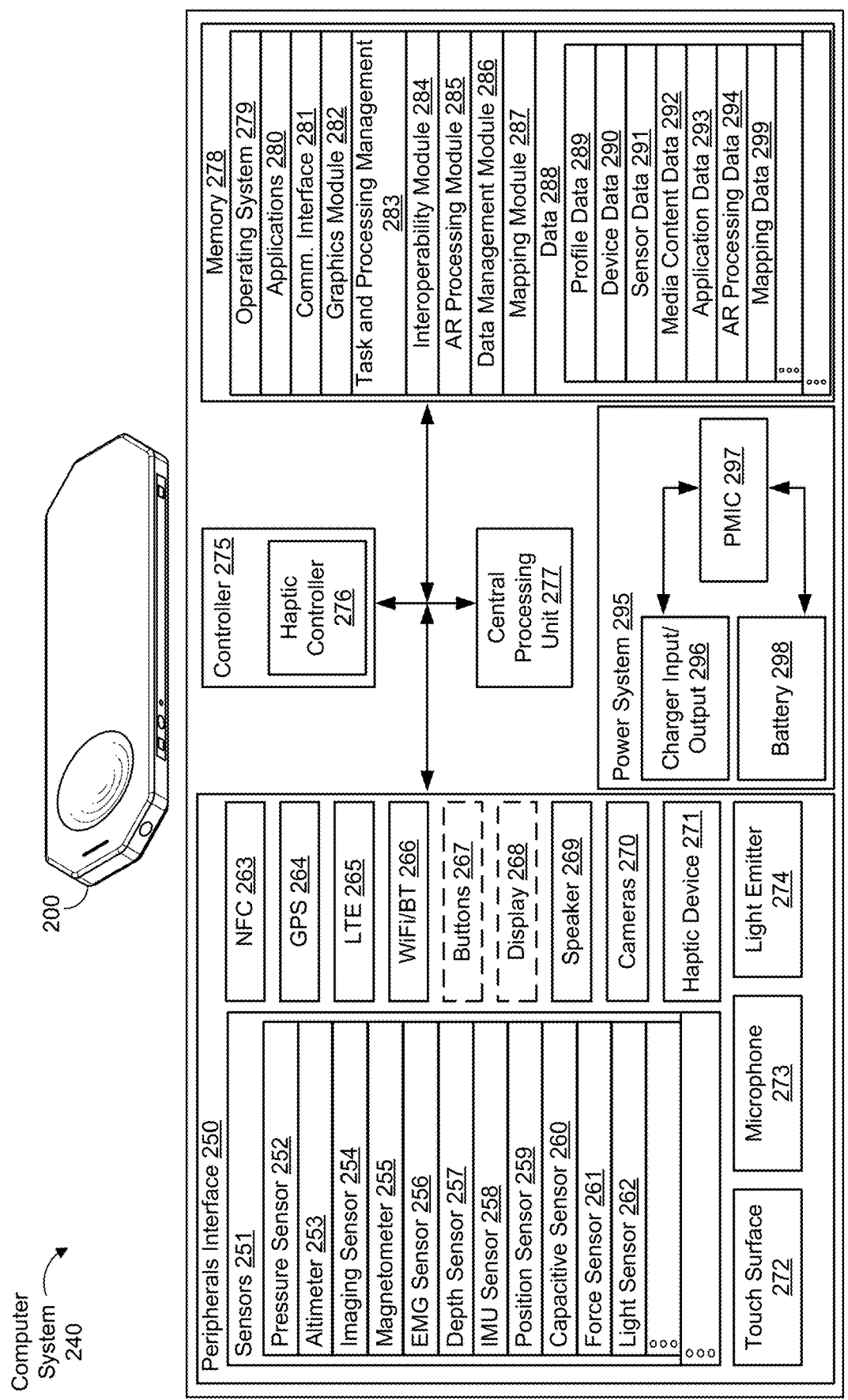

FIG. 2E shows block diagrams of the HIPD 200's computing system 240, according to at least one embodiment of the present disclosure. The HIPD 200, described in detail above, can include one or more components shown in HIPD computing system 240. The HIPD 200 will be understood to include the components shown and described below for the HIPD computing system 240. In some embodiments, all, or a substantial portion of the components of the HIPD computing system 240 are included in a single integrated circuit. Alternatively, in some embodiments, components of the HIPD computing system 240 are included in a plurality of integrated circuits that are communicatively coupled.

The HIPD computing system 240 can include a processor (e.g., a CPU 277, a GPU, and/or a CPU with integrated graphics), a controller 275, a peripherals interface 250 that includes one or more sensors 251 and other peripheral devices, a power source (e.g., a power system 295), and memory (e.g., a memory 278) that includes an operating system (e.g., an operating system 279), data (e.g., data 288), one or more applications (e.g., applications 280), and one or more modules (e.g., a communications interface module 281, a graphics module 282, a task and processing management module 283, an interoperability module 284, an AR processing module 285, a data management module 286, a mapping module 287, etc.). The HIPD computing system 240 further includes a power system 295 that includes a charger input and output 296, a PMIC 297, and a battery 298. The charger input and output 296 can be a wired or wireless connection that is used to charge the battery 298 of the HIPD computing system 240 and/or provide usable power for charging a coupled wearable device (or other communicatively coupled device). Similar to the PMIC 2258 (described below in reference to FIGS. 22A-22B), the PMIC 297 manages the power consumption and distribution of power Additionally, the battery 298 is configured to store power to provide usable power to components of the HIPD computing system 240.

In some embodiments, the peripherals interface 250 can include one or more sensors 221. The sensors 251 can include analogous sensors to those described below in reference to FIG. 22B. For example, the sensors 251 can include imaging sensors 254 (also referred to as imaging devices; e.g., cameras), (optional) EMG sensors 256, IMUs 258, and capacitive sensors 260. In some embodiments, the sensors 251 can include one or more pressure sensor 252 for sensing pressure data, an altimeter 253 for sensing an altitude of the HIPD 200, a magnetometer 255 for sensing a magnetic field, a depth sensor 257 (or a time-of flight sensor) for determining a difference between the camera and the subject of an image, a position sensor 259 (e.g., a flexible position sensor) for sensing a relative displacement or position change of a portion of the HIPD 200, a force sensor 261 for sensing a force applied to a portion of the HIPD 200, and a light sensor 262 (e.g., an ambient light sensor) for detecting an amount of lighting. The sensors 251 can include one or more sensors not shown in FIG. 2A.

Analogous to the peripherals described below in reference to FIG. 22B, the peripherals interface 250 can also include an NFC component 263, a GPS component 264, an LTE component 265, a Wi-Fi and/or Bluetooth communication component 266, a speaker 269, a haptic device 271, and a microphone 273. As described above in reference to FIG. 2A, the HIPD 200 can optionally include a display 268 and/or one or more buttons 267. The peripherals interface 250 can further include one or more cameras 270, touch surfaces 272, and/or one or more light emitters 274. The multi-touch input surface 202 described above in reference to FIG. 2A is an example of touch surface 272. The light emitters 274 can be one or more LEDs, lasers, etc. and can be used to project or present information to a user. For example, the light emitters 274 can include light indicators 213 (e.g., light ring around the first touch-input surface 212) and 227 described above in reference to FIG. 2A. The cameras 270 (e.g., imaging devices 228, 229, 232, and 237 described above in FIG. 2A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 270 can be used for SLAM; 6 DoF raycasting, gaming, object manipulation, and/or other rendering; facial recognition and facial expression recognition, etc. Imaging sensors 254 can be instances of cameras 270 and/or components thereof.

The HIPD computing system 240 can include one or more haptic controllers 276 and associated componentry (e.g., haptic devices 271) for providing haptic events at the HIPD 200. The one or more haptic controllers 276 and the associated componentry are similar to one or more components of the watch body computing system 2260 and the watch band computing system 2230 described below in reference to FIG. 22B.

Memory 278 can include high-speed random-access memory and/or non-volatile memory, such as one or more magnetic disk storage devices, flash memory devices, or other non-volatile solid-state memory devices. Access to the memory 278 by other components of the HIPD 200, such as the one or more processors and the peripherals interface 250, can be controlled by a memory controller of the controllers 275.

In some embodiments, software components stored in the memory 278 include one or more operating systems 279, one or more applications 280, one or more communication interface modules 281, one or more graphics modules 282, one or more data management modules 285, which are analogous to the software components described below in reference to FIG. 22B. The software components stored in the memory 278 can also include the mapping module 287, which is configured to generate one or more maps and/or localize a user and/or objects (animate or inanimate) based on image data, sensor data, and/or other available data. The one or more maps and/or localization data can be used for facilitating the presentation of AR representations to the user and/or improving user interactions within an AR and/or VR environment.

In some embodiments, software components stored in the memory 278 include a task and processing management module 283 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 283 uses data 288 (e.g., device data 290) to distribute the one or more front-end and/or back-end tasks based on communicatively coupled devices' computing resources, available power, thermal headroom, ongoing operations, and/or other factors. For example, the task and processing management module 283 can cause the performance of one or more back-end tasks (of an operation performed at communicatively coupled AR glasses 2300) at the HIPD 200 in accordance with a determination that the operation is utilizing a predetermined amount (e.g., at least 70%) of computing resources available at the AR glasses 2300.

In some embodiments, software components stored in the memory 278 include an interoperability module 284 for exchanging and utilizing information received and/or provided to distinct communicatively coupled devices. The interoperability module 284 allows for different systems, devices, and/or applications to connect and communicate in a coordinated way without user input. In some embodiments, software components stored in the memory 278 include an AR processing module 285 that is configured to process data (e.g., image data, sensor data, maps and/or localization data, and/or other available data) to generate AR and/or VR representations of the data; generate AR and/or VR environments; process signals based at least on sensor data for use in an AR and/or VR environment; and/or enable a user to engage and/or interact with one or more devices and/or with an AR environment as described herein. For example, the AR processing module 285 can be used for 3D object manipulation, gesture recognition, facial and facial expression, recognition, etc.

The memory 278 can also include data 288, including structured data. In some embodiments, the data 288 can include profile data 289, device data 290 (including device data of one or more devices communicatively coupled with the HIPD 200, such as device type, hardware, software, configurations, etc.), sensor data 291, media content data 292, application data 293, and AR processing data 294, which stores processed AR data such as AR representations, AR environments, AR applications, as well as one or more models, gestures, etc. for facilitating user engagement and/or interaction with one or more devices and/or with an AR environment. The data 288 can further include mapping data 299 for storing one or more maps and/or localization data generated by the mapping module 287.

In some embodiments, the HIPD 200 generates an AR representation based on operational data (e.g., data generated and/or obtained by the HIPD 200). Operational data includes image data, audio data, message data, application data, user profile data, device data, and/or any other data stored in memory of a device. For example, the operational data can include data generated by one or more operations or applications running on the HIPD 200 and/or data provided by to the HIPD 200 by a communicatively coupled device (e.g., AR device 2300 and VR device 2310), a wrist-wearable device 2200, etc.). The AR representation is data that can be presented to the user via the HIPD 200 and/or another communicatively coupled device, such as a head-wearable device. For example, the HIPD 200 can provide instructions to the head-wearable device that cause the head-wearable device to display an AR representation of a video call (where the AR representation of the video call generated by the HIPD 200 based on the video call running on the HIPD 200 or performed by the HIPD 200 in conjunction with another device as described herein).

It should be appreciated that the HIPD computing system 240 is an example of a computing system within the HIPD 200, and that the HIPD 200 can have more or fewer components than shown in the HIPD computing system 240, combine two or more components, and/or have a different configuration and/or arrangement of the components. The various components shown in HIPD computing system 240 are implemented in hardware, software, firmware, or a combination thereof, including one or more signal processing and/or application-specific integrated circuits.

The techniques described herein can be used with any device used as a human-machine interface controller. In some embodiments, an HIPD 200 can be used in conjunction with one or more wearable device such as a head-wearable device (e.g., AR device 2300 and VR device 2310) and/or a wrist-wearable device 2200 (or components thereof). In some embodiments, an HIPD 200 can also be used in conjunction with a wearable garment, such as smart textile-based garment (now shown).

Figure 3A:
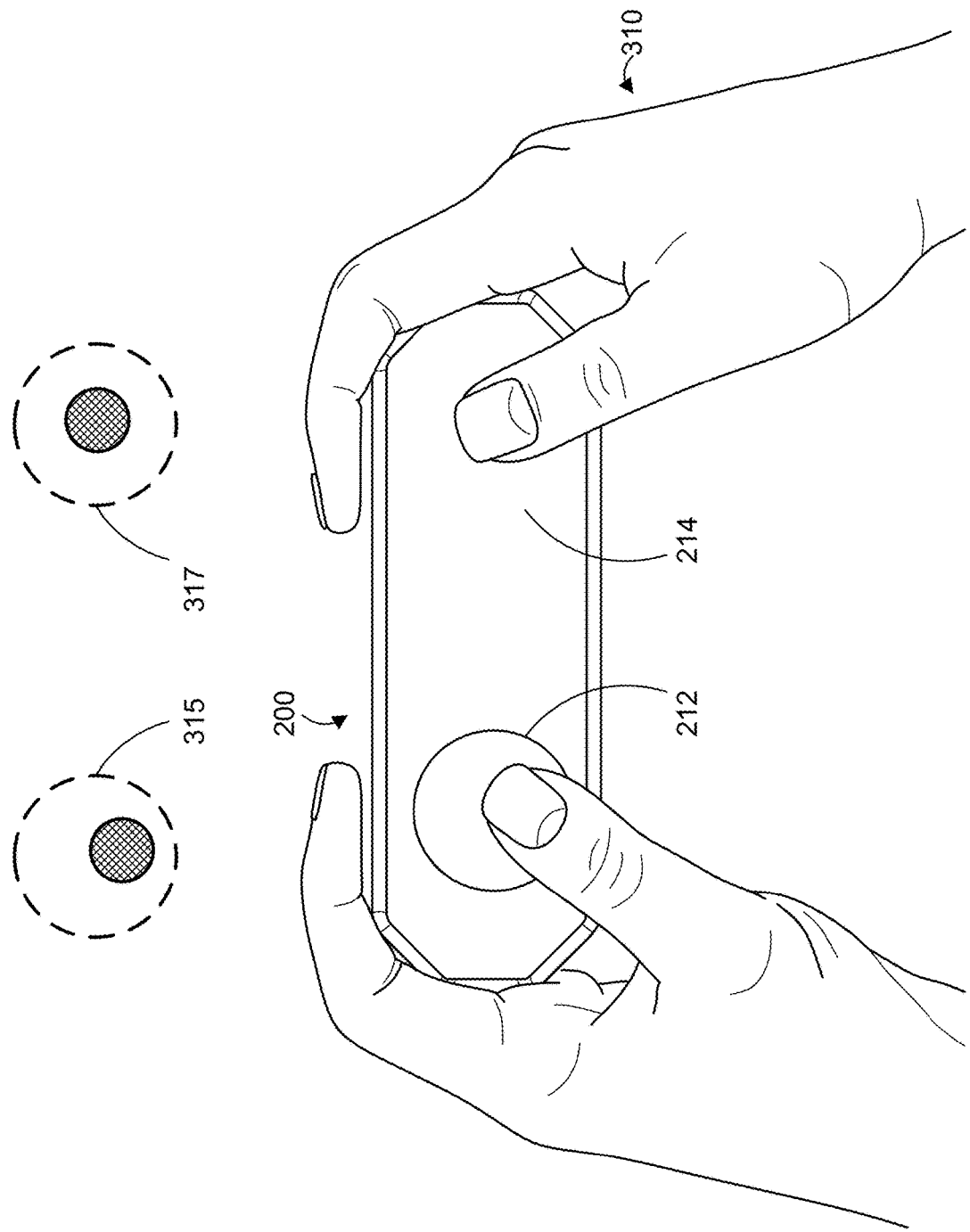

FIG. 3A illustrates the HIPD 200 held in a landscape orientation, in accordance with some embodiments. In particular, the HIPD 200 is held by a user 102 using both of their hands 310. The HIPD 200 is configured such that, when held in the landscape orientation, the user's thumbs contact the multi-touch input surface 202. More specifically, one thumb rests within the first touch-input surface 212 and another thumb rests on top of the second touch-input surface 214. In some embodiments, the HIPD 200 can be used as a gaming controller. For example, as shown in FIG. 3A, the user's left thumb contact on the first touch-input surface 212 are detected as left thumbstick (or joystick) inputs 315 and the user's right thumb contact on the second touch-input surface 214 are detected as right thumbstick inputs 317. User inputs at the HIPD 200 cause the performance of one or more commands at the HIPD 200 (e.g., at one or more applications running on the HIPD 200 and/or operated in conjunction with the HIPD 200). Alternatively, or addition, in some embodiments, user inputs at the HIPD 200 are provided as instructions to cause the performance of one or more commands at one or more devices communicatively coupled with the HIPD 200. For example, the HIPD 200 can run a gaming application and the user inputs can cause the performance of one or more inputs within the gaming application (as shown and described below in reference to FIGS. 3B-3E.

FIGS. 3B-3E illustrate touch inputs performed on the handheld intermediary processing device that cause the performance of one or more commands, in accordance with some embodiments. FIGS. 3B-3E show an AR representation of a gaming application that is presented to a user via the HIPD 200 and a communicatively coupled display. In particular, the HIPD 200 is communicatively coupled with a head-wearable device, and the HIPD 200 and the head-wearable device share operational data for performing one or more computational tasks associated with running and causing presentation of a gaming application. As described above, the HIPD 200 generates an AR representation based on the operational data of the HIPD 200 and/or other operational data shared with the HIPD 200.

In some embodiments, while the HIPD 200 and the head-wearable device are communicatively coupled and share operational data for performing one or more computational tasks (e.g., running and causing presentation of an application, such as a gaming application), the HIPD 200 is configured to identify one or more back-end tasks and one or more front-end tasks associated with performing the one or more computational tasks. The HIPD 200 performs the one or more back-end tasks, which can include updating the operational data to create updated operational data, and causes the head-wearable device to perform one or more front-end tasks using the updated operational data such that a representation based on the one or more computational tasks (e.g., the AR representation) is presented to the user by the head-wearable device. In other words, the HIPD 200 is configured to perform computationally intensive tasks associated with generating the AR representation and provides data to the head-wearable device (or other device) to cause the presentation of the data.

The computation task can be initiated at the HIPD 200 or the head-wearable device (or another communicatively coupled device, such as a wrist-wearable device 2200), and the HIPD 200 can coordinate the performance of the back-end tasks and front-end tasks based on the shared operational data. In some embodiments, a computation task can be executed at the head-wearable device (or other communicatively coupled device) and, when the HIPD 200 is communicatively coupled, the HIPD 200 can perform the associated back-end tasks, based on the shared operational data, to reduce the computational burden on the head-wearable device (or other communicatively coupled device). In this way, the HIPD 200 reduces the processes performed by the head-wearable device conserving the available power at the head-wearable device, reducing the thermal load on the head-wearable device, and/or reducing the computational resources needed at the head-wearable device.

While the above example describe coordination between the HIPD 200 and the head-wearable device, the skilled artisan will appreciate upon reading the descriptions that the HIPD 200 can communicatively couple with any other wearable device and/or electronic device to coordinate the performance of one or more computational tasks and/or presentation of data associated with any number of operations and/or applications including, but not limited to, gaming applications, social media applications, messaging applications, streaming applications, video calling applications, web-based applications, etc.

Returning to FIG. 3B, a first AR representation 325 of a gaming application is presented to the user via a display of the head-wearable device communicatively coupled with the HIPD 200. The HIPD 200 receives one or more user inputs detected at the multi-touch input surface 202 and causes performance of one or more commands associated with the detected inputs at the gaming application. For example, the user provides a tap input 320 at the second touch-input surface 214 to cause their avatar 327 within the AR representation of the gaming application to swing their sword. In particular, the HIPD 200 performs back-end tasks for causing the performance of the sword swing within the gaming application and provides operational data and front-end tasks to the head-wearable device such that the head-wearable device presents the sword swing within the gaming application.

Figure 3C:
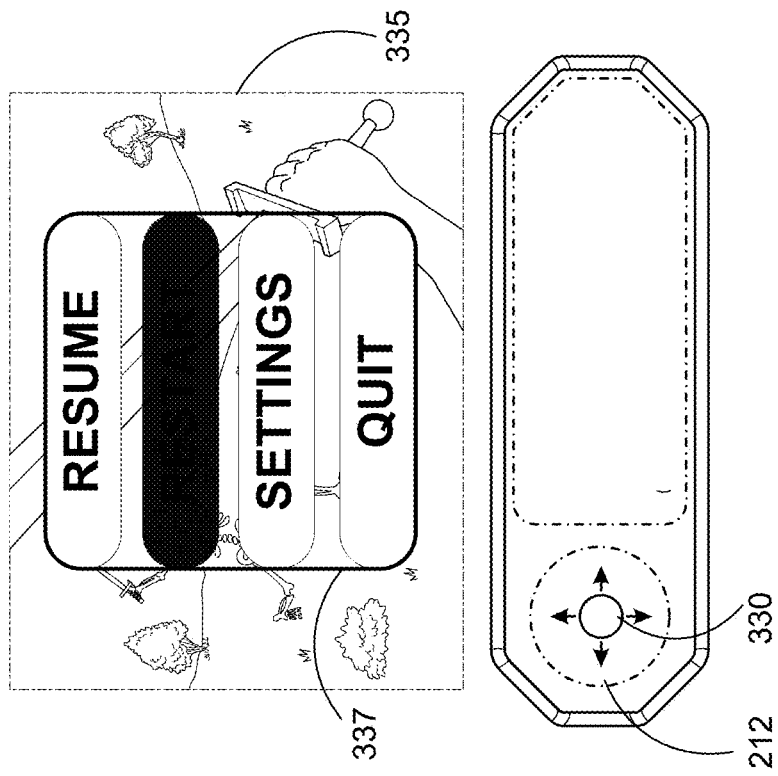
Figure 3B:
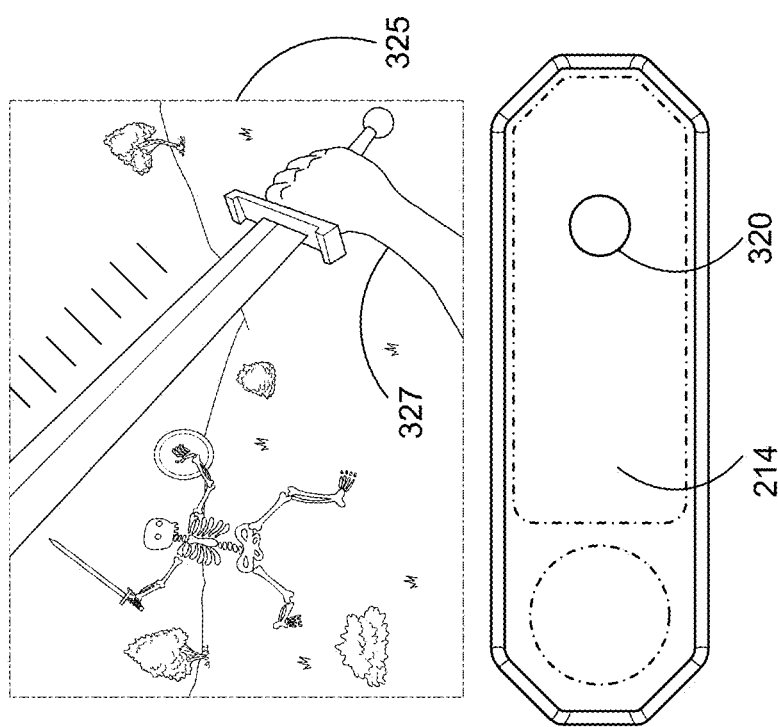

In FIG. 3C, a second AR representation 335 of the gaming application is presented to the user via the display of the head-wearable device communicatively coupled with the HIPD 200. In the second AR representation 335, the user navigates a menu UI 337 of the second AR representation 335 using a drag gesture 330 performed at the first touch-input surface 212. The drag gesture 330 can be associated with one or more commands associated with a thumbstick (e.g., moving left, right, up, down, diagonally, etc.) such that the user can move between UI elements of the menu UI 337. In some embodiments, the user can provide an input at a first touch-input surface 212 or the second touch-input surface 214 to select a UI element of the menu UI 337. For example, the user can perform a downward press at the first touch-input surface 212 and/or the second touch-input surface 214 to select the UI element (e.g., "restart"). In some embodiments, the first touch-input surface 212 and/or the second touch-input surface 214 are configured to detect different force and/or pressure inputs performed by the user. Each force and/or pressure input can be associated with a distinct command. For example, a first pressure input performed at the first touch-input surface 212 and/or the second touch-input surface 214 can be associated with a first command, and a second pressure input, distinct from the first pressure input, performed at the first touch-input surface 212 and/or the second touch-input surface 214 can be associated with a second, distinct, command.

FIG. 3D shows a third AR representation 345 of the gaming application presented to the user via the display of the head-wearable device communicatively coupled with the HIPD 200. In the third AR representation 345, the user moves their avatar 327 forward using another drag gesture 340 and holding the other drag gesture 340. For example, as shown in FIG. 3D, the other drag gesture 340 is dragged upward (e.g., relative to the user's held position shown in FIG. 3A) to cause the avatar 327 to move forward. The first touch-input surface 212 can be divided into one or more regions (e.g., as described above in reference to FIGS. 2B-2D). In some embodiments, the user's input within the first touch-input surface 212 and/or regions thereof (upper region 312 of the first touch-input surface 212) cause the performance of distinct commands. For example, as the user moves the other drag gesture 340 from a center of the first touch-input surface 212 upward, the avatar 327 can begin to walk forward; and as the user moves the other drag gesture 340 from the center of the first touch-input surface 212 into the upper region 312 of the first touch-input surface 212 the avatar 327 can begin to run forward.

FIG. 3E shows a fourth AR representation 355 of the gaming application presented to the user via the display of the head-wearable device communicatively coupled with the HIPD 200. In the fourth AR representation 355, the user adjusts a field of view of their avatar 327 by providing an input at the second touch-input surface 214. In particular, the user performs a downward drag gesture 350 toward a bottom left portion of a region 314 of the second touch-input surface 214. For example, as shown in FIG. 3E, the downward drag gesture 350 causes the avatar's field of view to focus on the AR skeleton 357. The user can provide any number of inputs via the HIPD 200 to cause the performance of one or more commands at an AR representation. Although FIGS. 3B-3E show in input performed at the first touch-input surface 212 or the second touch-input surface 214, the skilled artisan will appreciate upon reading the descriptions that the HIPD 200 that inputs can be provided at the first touch-input surface 212 and the second touch-input surface 214 (or region thereof) at the same time and/or while an input is ongoing. For example, the user can provide an input at the first touch-input surface 212 to move forward, left, right, backwards, etc. while the user adjusts a field of view via one or more inputs at the second touch-input surface 214.

Figure 4:
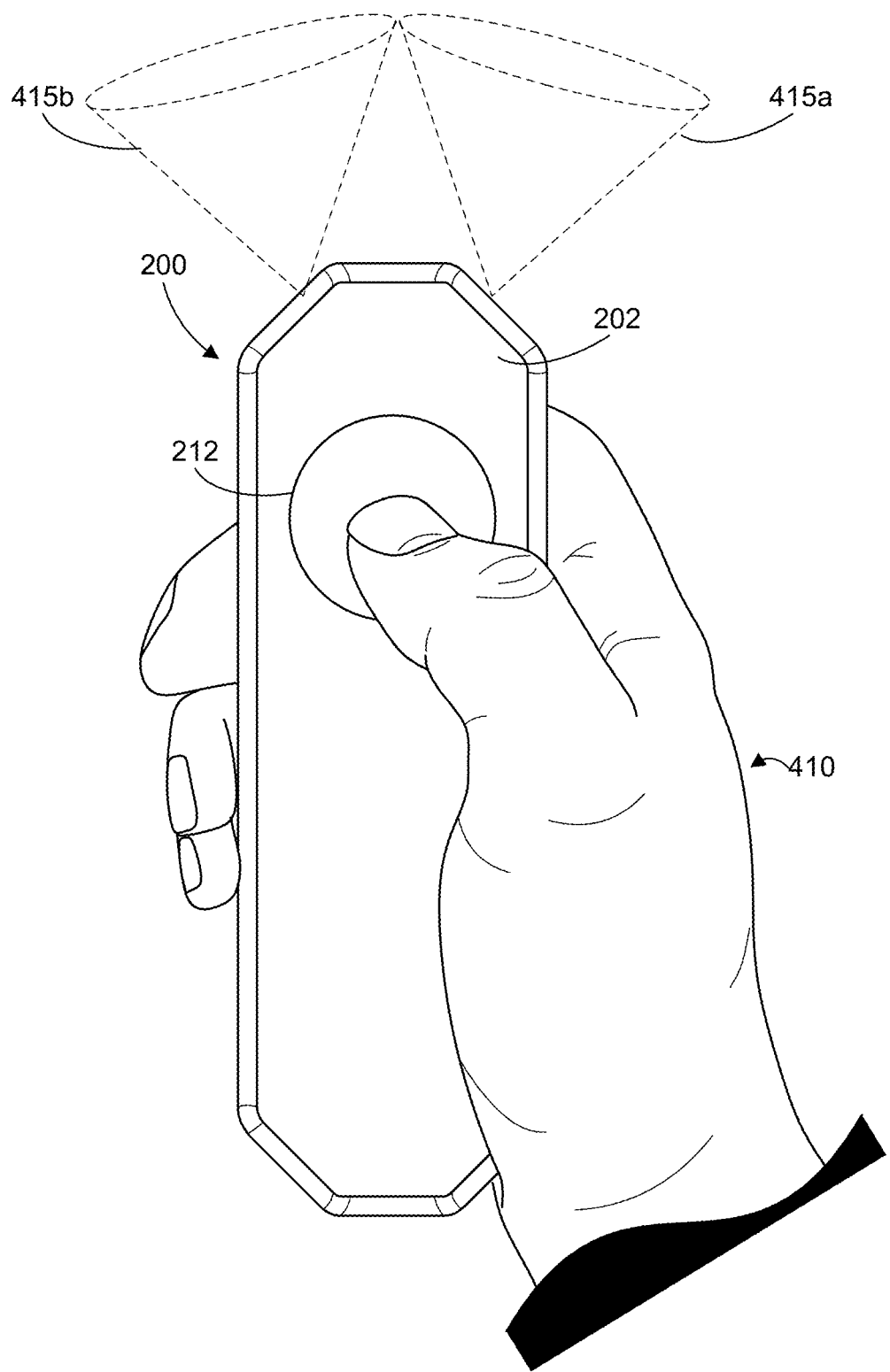
FIG. 4 illustrates a user holding the handheld intermediary processing device in a portrait position, in accordance with some embodiments.

FIG. 4 illustrates a user holding the handheld intermediary processing device in a portrait position, in accordance with some embodiments. The HIPD 200 is configured to be held in one hand 410 or both hands (as described above in reference to FIGS. 3A-3E). When the HIPD 200 is held in one hand, a surface depression of the multi-touch input surface 202 (e.g., within the first touch-input surface 212) is configured to guide user handling of the HIPD 200 such that a thumb of the user's hand rests in the surface depression. In some embodiments, the surface depression of the multi-touch input surface 202 is configured to guide user handling of the HIPD 200 such that a portion of a user's palm is adjacent to the second touch-input surface 214 (or such that a portion of the user's palm holds the HIPD 200 along a longitudinal portion of the HIPD 200, which extend from the top portion 203 and the bottom portion 205; FIG. 2A).

FIG. 4 further shows image data captured by one or more imaging devices (e.g., imaging devices 228 and 229; FIG. 2A) that is used for SLAM processing. In some embodiments, the HIPD 200 uses the at least one imaging device to collect image data (e.g., represented by dotted cones 415a and 415b) for applying one or more SLAM algorithms. SLAM processed image data can be used to determine one or more of a location, orientation, and/or direction of movement of the user, the head-wearable device, the wrist-wearable device, the HIPD 200 and/or foreign objects within a proximity of the HIPD 200 and/or the user. In some embodiments, the image data captured by one or more imaging devices is used for 6DoF tracking of the HIPD 200 (which can be used as additional user inputs (e.g., swinging an AR object)).

FIGS. 5A-5D illustrate user interactions with an AR object using a handheld intermediary processing device and a head-wearable device, in accordance with some embodiments. In some embodiments, the HIPD 200 can operate in conjunction with a head-wearable device to present an AR object 512 to the user (e.g., as shown by a first point of view 510). The AR object 512 can be presented as part of a passthrough representation of the user's field of view and/or as an overlay over the user's field of view. As described above in reference to FIGS. 1A-4, the HIPD 200 can generate an AR representation that is provided to a communicatively coupled display (e.g., a display of the head-wearable device) to be presented to the user. Interactions with the AR representation, AR objects, and/or other interactions described below are determined and/or generated by the HIPD 200, which provides corresponding data to the communicatively coupled head-wearable device for presentation.

In some embodiments, the AR representation includes one or more visual aids for assisting the user. For example, the AR representation generated by the HIPD 200 can include a visual guide 514 that is presented by the head-wearable device. The visual guide 514, when presented by a display, shows the user 102 where the HIPD 200 is currently pointed (e.g., the HIPD 200 can generate the visual aid 514 and cause the visual aid 514 to be presented by the head-wearable device). This allows the user 102 to target, aim, and/or select the AR object 512 and/or any other AR representations within their field of view using the HIPD 200. Alternatively, or in addition, the user 102 can select real-world objects using the HIPD 200 for additional interactions, such as a targeted image capture (e.g., capturing a portion of the user 102's field of view), real-world object tagging, a real-world object search (e.g., definition search, object recognition, purchase options, etc.), etc. For example, the user 102 can select book 518 to perform a public (e.g., a public search engine, online search, public database, etc.) or private search (e.g., local database search, private database, etc.) on the book 518. In some embodiment, the HIPD 200 is configured to operate as a controller for one or more electronic devices. In particular, the user 102 can select electronic devices using the HIPD 200 to interact with the electronic devices. For example, the user 102 can select a television or monitor 519 to turn on, turn off, or adjust settings of the monitor (e.g., increase or decrease a volume, change inputs, change a channel, etc.).

In some embodiments, the HIPD 200 can use the user's field of view to determine a position of the visual guide 514 and cause the presentation of the visual guide 514 (e.g., the user's gaze, as captured by one or more image sensors of a head-wearable device, can be used to determine the visual guide 514). For example, the user 102 can focus their view on the monitor 519 to cause selection or to cause the visual aid 514 to be pointed at the monitor 519 and change their focus to look at the book 518, which cause selection or cause the visual aid 514 to be pointed at the book 518. In some embodiments, a bounding box or an outline is positioned over (e.g., overlayed) a focused or selected AR object, real-world object, and/or any AR representations.

In some embodiments, the user selects the AR object 512 by performing touch-inputs at the multi-touch input surface of the HIPD 200 (e.g., press 516 on the first touch-input surface 212 of the HIPD 200, as shown by the first point of view 510). In some embodiments, the AR object 512 is selected as long as the user 102 maintains a touch-input (e.g., the user 102 holds the press 516 the first touch-input surface 212). Alternatively, in some embodiments, the AR object 512 is selected until the user 102 provides a subsequent input instructing the HIPD 200 to deselect the AR object 512. In some embodiments, the AR object 512, when selected, is locked, or anchored to the HIPD 200 such that it moves and/or follows the HIPD 200 as it is moved. When deselected, the AR object 512 is unlocked from the HIPD 200 such that it can move or rest at a location independent of the HIPD 200's position.

Figure 5D:
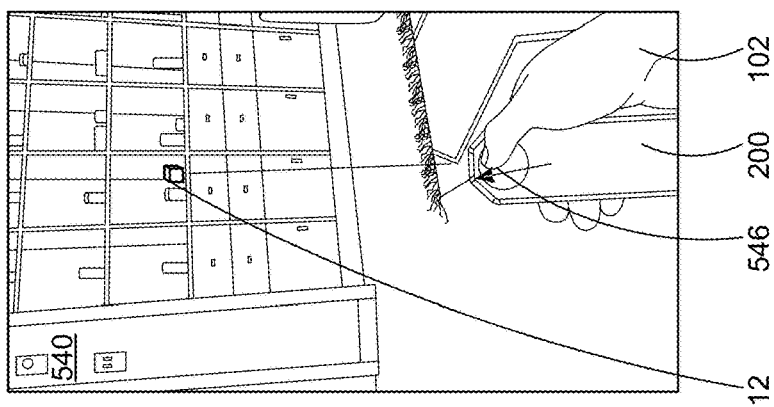
FIGS. 5A-5D illustrate user interactions with an artificial reality object using a handheld intermediary processing device and a head-wearable device, in accordance with some embodiments.
Figure 5C:
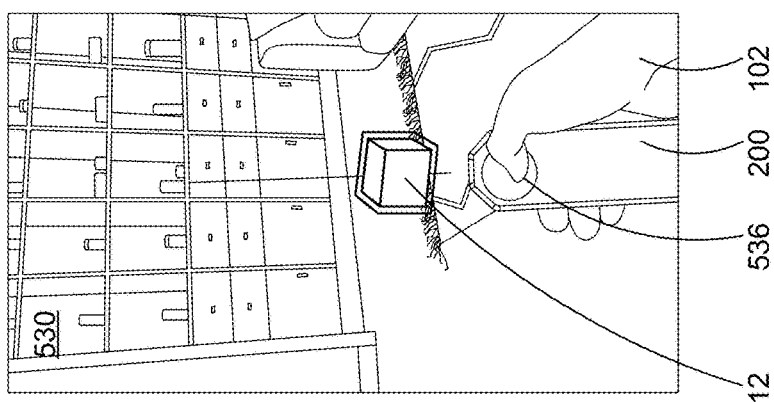
Figure 5B:
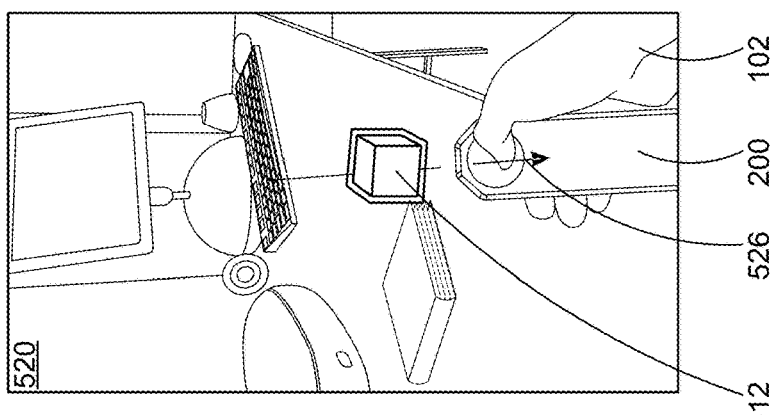
Figure 5A:
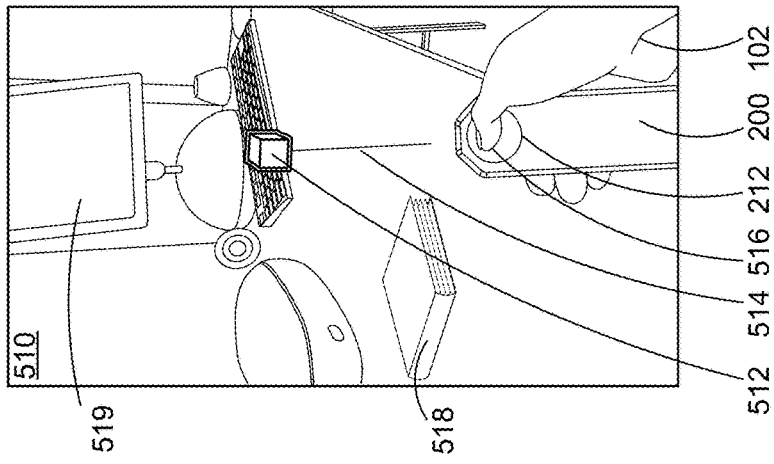

Turning to FIG. 5B, the user 102 can perform additional interactions with the AR object 512 by performing additional touch-inputs at the HIPD 200. For example, the user can move the AR object 512 closer to their person by performing a downward swipe gesture 526 on the first touch-input surface 212, as shown by a second point of view 520. Similarly, while the AR object 512 is selected by the HIPD 200, the HIPD 200's spatial movements can be provided as inputs to the AR object 512. For example, as shown in FIG. 5C, while the user 102 holds down 536 on the first touch-input surface 212 of the HIPD 200, the HIPD 200's movements are also applied to the AR object 512. In particular, as shown by a third point of view 530, the HIPD 200 and the AR object 512 move from a first position to a second position. The HIPD 200's spatial movements are determined via one or more sensors and/or imaging devices of the HIPD 200. For example, one or more IMUs of the HIPD 200 and/or SLAM data can be used to track the HIPD 200's movements, which are provided as additional inputs for interacting with the AR object 512.

FIG. 5D shows interaction between the AR object 512 and the user 102's real-world environment. In a fourth point of view 540, the user provides an upward swipe gesture 546 on the first touch-input surface 212 to cause the AR object 512 to move away from the HIPD 200 or the user 102. As further shown in the fourth point of view 540, the user 102 places the AR object 512 on a bookshelf. The HIPD 200 uses image data captured by one or more of its imaging devices and/or imaging devices of the head-wearable device to place the AR object 512 on the bookshelf while maintaining the AR object 512's pose (position and orientation). In particular, the HIPD 200 uses sensor data and/or image data to assess a distance and/or position of one or more objects and/or structures of a real-word environment such that AR representations can be presented in conjunction with the real-world environment and interact with the real-world environment accordingly.

FIGS. 6A-6E illustrate additional user interactions with an AR object using a handheld intermediary processing device and a head-wearable device, in accordance with some embodiments. As described above in reference to FIGS. 5A-5D, the HIPD 200 can operate in conjunction with a head-wearable device to present the AR object 512, the visual guide 514, and/or other AR representations to the user as part of their point of view.

Figures 6A, 6B, 6C, 6D, 6E:
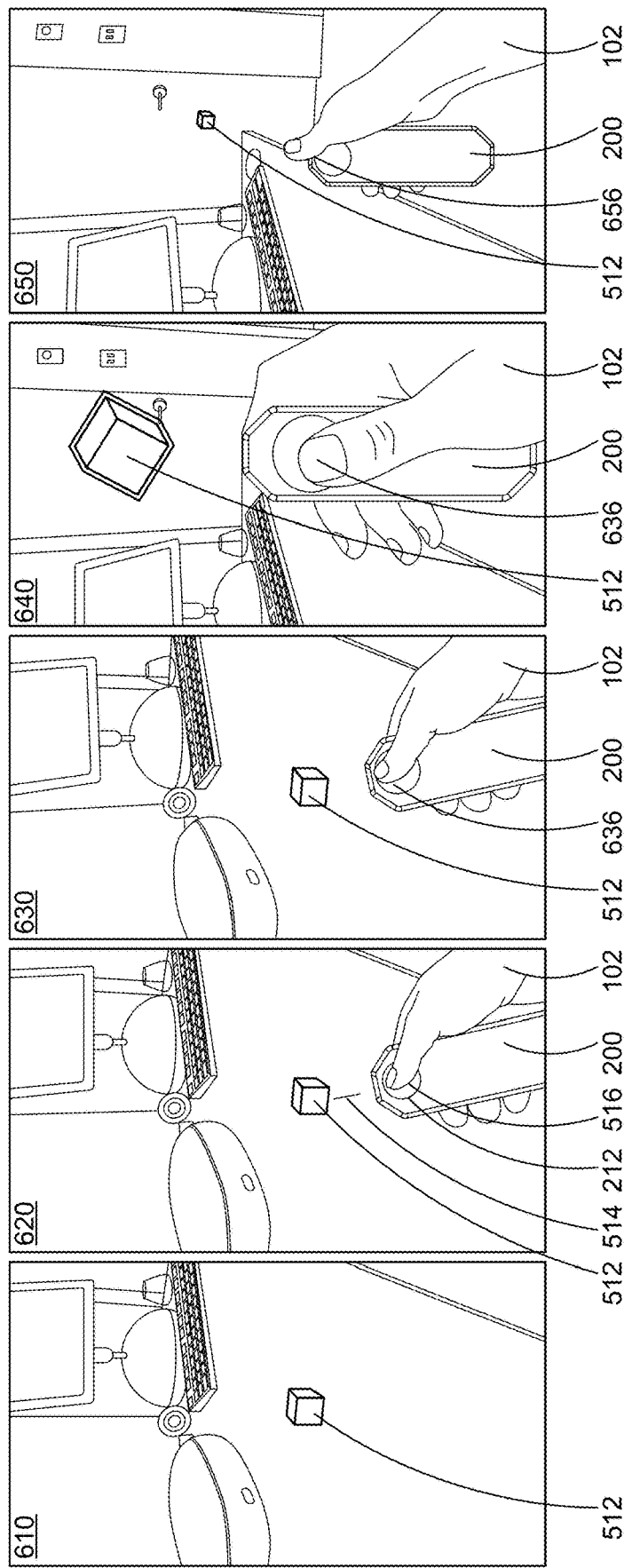
FIGS. 6A-6E illustrate additional user interactions with an artificial reality object using a handheld intermediary processing device and a head-wearable device, in accordance with some embodiments.

In FIGS. 6A and 6B, the user 102 selects the AR object 512 using the HIPD 200. In particular, the user 102 provides an input at the first touch-input surface 212 to select the AR object 512 as shown in first and second points of view 610 and 620. In FIG. 6C, while holding the press gesture (e.g., held gesture 636), the user 102 moves the HIPD 200 to control or adjust a pose of the AR object 512 as shown in a third point of view 630. In FIG. 6D, the user 102 lifts the HIPD 200 which causes the AR object 512 to also move upwards. Additionally, the HIPD 200 maintains the AR object 512's pose. For example, as shown in a fourth point of view 640, the AR object 512 slightly rotates when the user lifts the HIPD 200. In FIG. 6E, the user 102 throws the AR object 512 by releasing the held gesture (e.g., gesture release 656) at the same time that they fling or flick the HIPD 200 forward. As shown in a fifth point of view 650, the AR object 512 is thrown across the room in response to gestures performed by the user on the HIPD 200. Additionally, to maintain scene responsiveness and accuracy, the HIPD 200 uses captured image data and/or sensor data to adjust the AR object 512's pose as it is thrown across the room.

FIGS. 7A-7D illustrate further user interactions with an AR object using a handheld intermediary processing device and a head-wearable device, in accordance with some embodiments. As described above in reference to FIGS. 5A-6E, the HIPD 200 can operate in conjunction with a head-wearable device to present the AR object 512, the visual guide 514, and/or other AR representations to the user as part of their point of view. In FIGS. 7A-7C, the user 102 performs analogous interactions as those described above in reference to FIGS. 5A-5E. In points of view 710, 720, and 730, the user 102 grabs the AR object 512 using the HIPD 200 and moves the AR object 512 to a new location before releasing the AR object 512. Further in FIG. 7D, the user provides an additional user input 746 at the first touch-input surface 212 to destroy or remove the AR object 512. As shown in the fourth point of view 740, the HIPD 200 causes the AR representation to show an animation of the AR object 512 disintegrating. The user 102 can provide different inputs at the HIPD 200 to create, modify, and/or generate different AR objects. The examples shown above in FIGS. 5A-7D are non-limiting, and any number of interactions can be performed by a user via the HIPD 200.

Figure 8A:
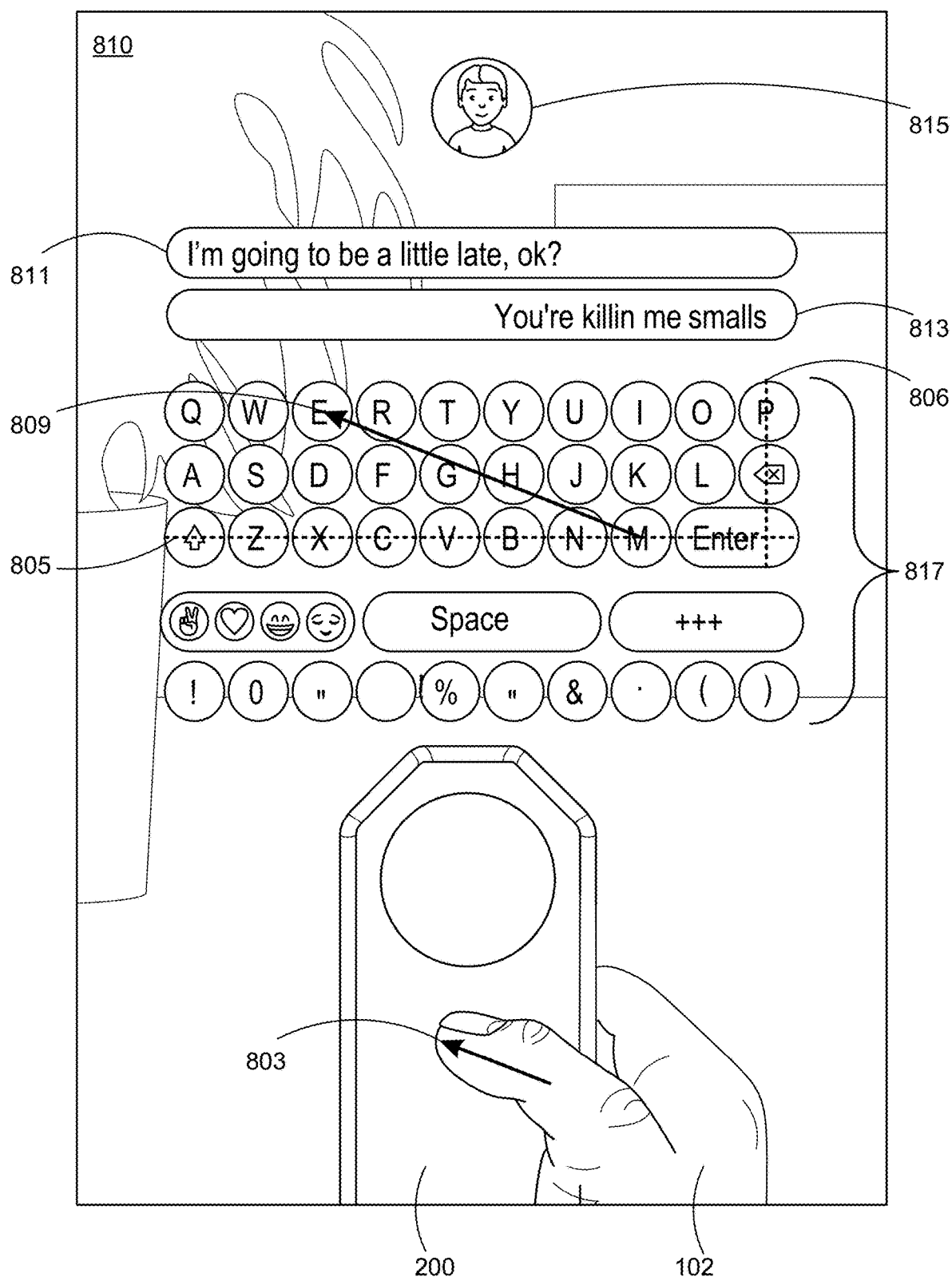
FIGS. 8A-8C illustrate artificial reality interactions using a handheld intermediary processing device and a head-wearable device, in accordance with some embodiments.
Figure 8C:
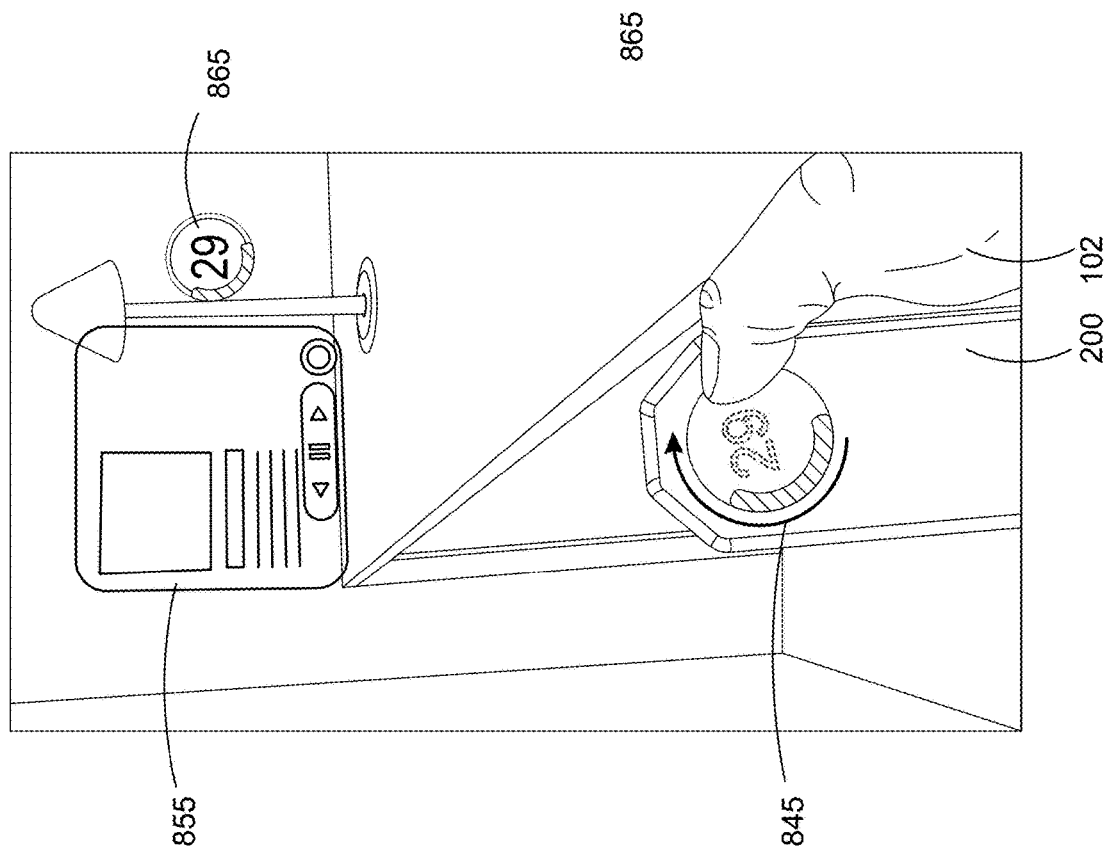
Figure 8B:
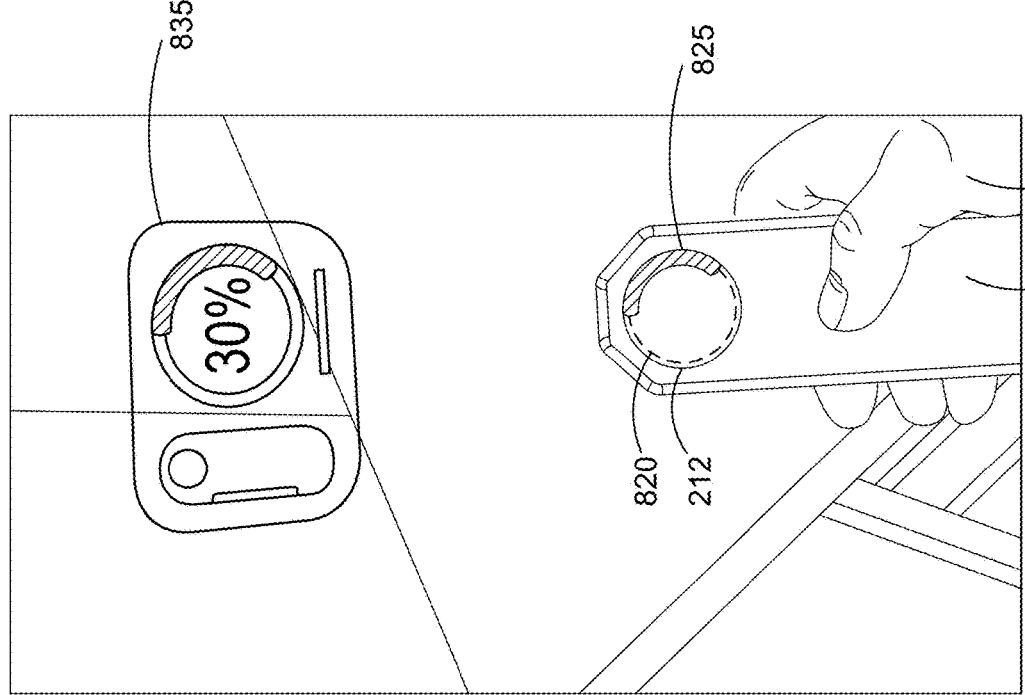

FIGS. 8A-8C illustrate AR interactions using a handheld intermediary processing device and a head-wearable device, in accordance with some embodiments. In some embodiments, the HIPD 200 can initiate one or more applications and provide an AR representation of the application for presentation at a communicatively coupled device (e.g., a display of a head-wearable device). For example, in FIG. 8A, the user 102 initiated a messaging application via the HIPD 200 (or another communicatively coupled device) and the HIPD 200 provides an AR representation of the messaging application to the head-wearable device. The head-wearable device presents the AR representation of the messaging application to the user within their field of view 810. In particular, the AR representation of the messaging application is presented in conjunction with the user's field of view such that the user does not disengage or disconnect from a real-world activity in which they are participating. In some embodiments, the AR representation of the messaging application is presented transparent or substantially transparent such that the user's view is not obstructed.

The AR representation of the messaging application includes a contact UI element 815, an incoming message UI element 811, a message input text field UI element 813, and a virtual keyboard UI 817. While the AR representation of the messaging application is presented to the user 102, the user 102 can provide an input at the HIPD 200 that is presented via the AR representation of the messaging application. As shown in FIG. 8A, the user 102 performs a swipe gesture 803 at the HIPD 200 to input a response to a contact. As the user 102 performs the swipe gesture 803, a trailing arrow 809 is presented to the user within AR representation of the messaging application to show the user 102 their current and previous inputs. For example, when the user performs the swipe gesture 803, the AR representation shows the trailing arrow 809 starting from an initial letter input "M" and ending at a second letter "E" (e.g., representative of swipe gesture 803 spelling out "me" as shown by the message input text field UI element 813). In some embodiments, the HIPD 200 predicts the user's next input. For example, as shown in FIG. 8A, the message input text field UI element 813 shows predicted text input "smalls" in greyed text. In some embodiments, the predicted input is determined using one or more machine learning models trained using the user's input history.

While the HIPD 200 runs the messaging application, the HIPD 200 is configured such that the user 102 can provide a swipe or tap gesture on any portion of the multi-touch input surface 202 and an input is detected. In particular, the HIPD 200 is configured such that the user 102 can provide a swipe and/or a tap on any portion of the first touch-input surface 212 and/or the second touch-input surface 214 (FIGS. 2A-2E) and the user 102 has sufficient space on the surface of the HIPD 200 to contact each key presented in the virtual keyboard UI 817. Additionally, the HIPD 200 is configured such that the user does not need to look at the HIPD 200. In order to provide the user 102 with enough space to contact each key presented in the virtual keyboard, the HIPD 200 aligns the user 102's initial input along a home row 805 and/or a home column 806. In this way, the user 102 is aware of (or comes to anticipate) where their initial input is with respect the virtual keyboard UI 817 and adjust their subsequent input accordingly. In some embodiment, the home row 805 is at the bottom row or the top row of the virtual keyboard UI 817 and/or at another predefined position along the virtual keyboard UI 817. In some embodiment, the home column 806 is at the leftmost column or the rightmost column of the virtual keyboard UI 817 and/or at another predefined position along the virtual keyboard UI 817. As an example, a user input at the leftmost edge of the HIPD 200 causes the AR representation of the messaging application to show the user's initial inputs adjacent to one of the leftmost characters and/or symbols of the virtual keyboard UI 817 along the home row 805 and/or the home column 806. Alternatively, a user input at the center of the HIPD 200 causes the AR representation of the messaging application to show the user's initial inputs adjacent to one of the center characters and/or symbols of the virtual keyboard UI 817 along the home row 805 and/or the home column 806.

In some embodiments, the HIPD 200 can use sensor data and/or image data of a communicatively coupled device to supplement the user input. For example, the head-wearable device presenting the AR representation of the messaging application can track the user's eye movements and provide data associated with the tracked eye movements to the HIPD 200 to be used in positioning the user's input along the virtual keyboard UI 817. Alternatively, or in addition, the head-wearable device can supplement the AR representation received by the HIPD 200 to accurately position the user's input along the virtual keyboard UI 817.

FIGS. 8B and 8C illustrate handheld intermediary processing device notifications presented to the user, in accordance with some embodiments. In some embodiments, the HIPD 200 includes one or more light emitters 274 and/or haptic devices 271 (e.g., FIGS. 2A-2E) for providing a user 102 with information. For example, the HIPD 200 can include light emitters 274 configured as a light ring 820. The light ring 820 is arranged around the first touch-input surface 212 and configured to illuminate when the user 102 receives one or more messages, calls, status indications, and/or other notifications received by the HIPD 200 and/or another communicatively coupled device. For example, as shown in FIG. 8B, a portion of the light ring 820 is illuminated to show a current battery level of the HIPD 200 (e.g., 30% of the light ring 820 is illuminated to show that the HIPD 200 is 30% charged (e.g., illuminated light ring 825). In some embodiments, the light ring 820 is illuminated in different colors (e.g., green, yellow, red, etc.) and/or with different patterns.

Additionally, or alternatively, the HIPD 200 can provide an AR representation of one or more messages, calls, status indications, and/or other notifications to a communicatively coupled display for presentation. For example, the HIPD 200 can cause a communicatively coupled display of the head-wearable device to present an AR representation of a status UI 835 to the user 102. The AR representation of one or more messages, calls, status indications, and/or other notifications can be synchronized with the notifications presented at the HIPD 200. For example, the AR representation of the status UI 835 can show a battery level of 30%, which is the same as the battery level presented at the HIPD 200. In some embodiments, the HIPD status UI 835 includes one or more status indicators including, but not limited to, mute mode, power on, power off, vibrate mode, etc.

FIG. 8C shows an AR representation of a music application (e.g., represented by music UI 855) presented to the user 102 via a display of the head-wearable device communicatively coupled with the HIPD 200. The music UI 855 is presented to the user 102 while a music application is running on the HIPD 200, the head-wearable device, and/or another communicatively coupled device. In some embodiments, the music application runs in the background and the music UI 855 is hidden or transparent. In some embodiments, the music UI 855 is presented when the user 102 provides input at the HIPD 200 for controlling the music application. For example, as shown in FIG. 8C, the user 102 performs a circular gesture 845 at the HIPD 200, which is associated with a control command for adjusting the volume of the music application, and the HIPD 200 causes the head-wearable device to present the music interface 855. Different control commands for operating the music application can include, without limitation, changing tracks, changing playlists, pausing a track, searching for an artist, saving a track or playlist, liking a track or playlist, disliking a track or playlist, and creating a playlist.

In some embodiments, the HIPD 200 causes the head-wearable device to present a volume indicator UI element 865 when a control command for adjusting the volume is performed. For example, when the user 102 performs the circular gesture 845, the HIPD 200 causes the head-wearable device to present a volume indicator UI element 865. In some embodiments, the volume indicator UI element 865 is presented as part of the music UI 855. The volume indicator UI element 865 can indicate the sound output generated by the music application running on the HIPD 200 or a communicatively coupled device. Alternatively, the volume indicator UI element 865 can indicate the sound output generated by speakers communicatively coupled with the HIPD. For example, in FIG. 8C, the volume indicator UI element 865 shows the current volume of the system as a numerical indicate (e.g., 29% of a maximum). Additionally, or alternatively, in some embodiments, the light ring 820 is illuminated to provide an indication of the current volume of the music track. For example, the light ring 820 of the HIPD 200 can light up 29% of the circumference of the first touch-input surface 212 to indicate that the volume is at 29% of the system maximum. In some embodiments, the light ring 820 can include a numerical indicator (e.g., a 29% shown at the center of the first touch-input surface 212).

While the above examples describe controls for operating a messaging and music application, the HIPD 200 is configured to operate with any number of applications. For example, non-limiting examples of applications that can be operated with the HIPD 200 include video streaming applications, financial applications, social media applications, video calling applications, voice call applications, live streaming applications, gaming applications, web-based applications, and/or any other applications described above in reference to FIG. 2E.

FIGS. 9A-9D illustrate an artificial-reality video call performed using a handheld intermediary processing device and a head-wearable device, in accordance with some embodiments. In some embodiments, an HIPD 200 generates an AR representation that is presentable via a communicatively coupled display, such as a display of a head-wearable device communicatively coupled with the HIPD 200. In some embodiments, the AR representation generated by the HIPD 200 is based on shared operational data between the HIPD 200 and/or the head-wearable device. For example, image data, application data, audio data, sensor data and/or other data of the HIPD 200 and/or the head-wearable device can be used by the HIPD 200 to generate the AR representation.

In some embodiments, the HIPD 200 determines a location to cause presentation of the AR representation. In some embodiments, the location is relative to a position of the HIPD 200. The HIPD 200 can provide instructions to the head-wearable device to cause presentation of the AR representation at the determined location. For example, the as shown in FIG. 9A, the HIPD 200 can cause the head-wearable device to present an AR representation of a video call 910 at a predetermined location above of the HIPD 200 (e.g., such that the AR representation floats or hover over the HIPD 200). The AR representation of the video call 910 can be a digital human representation of another person. In some embodiments, the AR representation of the video call 910 is a 3D live volumetric call, a 2.5D call, and/or other type of virtual call. In some embodiments, the AR representation of the video call 910 is a one-to-one representation of another person. Alternatively, in some embodiments, the AR representation of the video call 910 is a predetermined scaled representation (e.g., one-to-two, one-to-three, two-one, etc.).

Figure 9B:
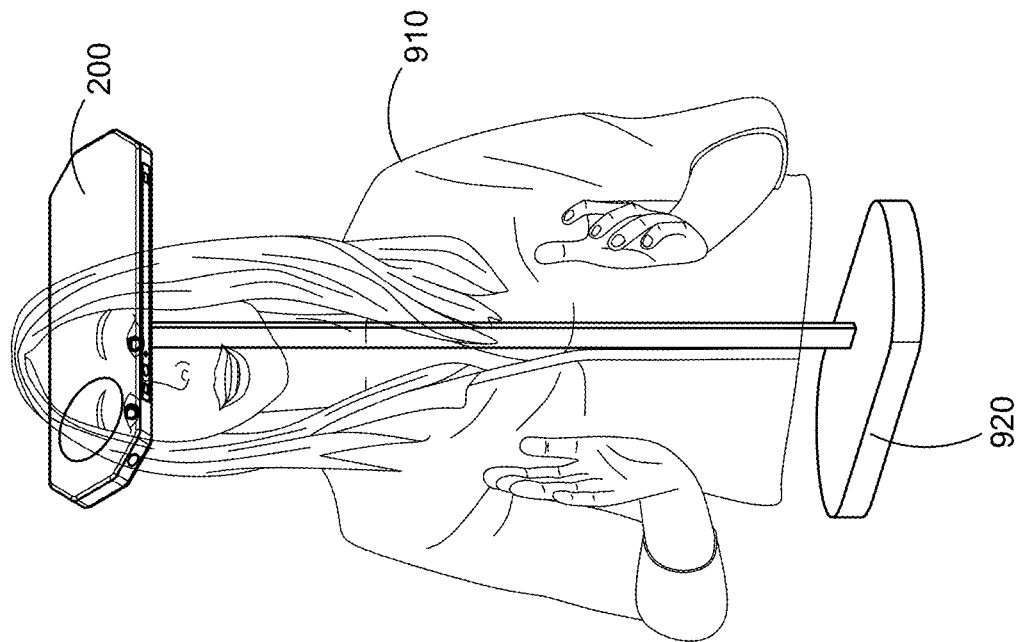
FIGS. 9A-9D illustrate an artificial-reality video call performed using a handheld intermediary processing device and a head-wearable device, in accordance with some embodiments.
Figure 9A:
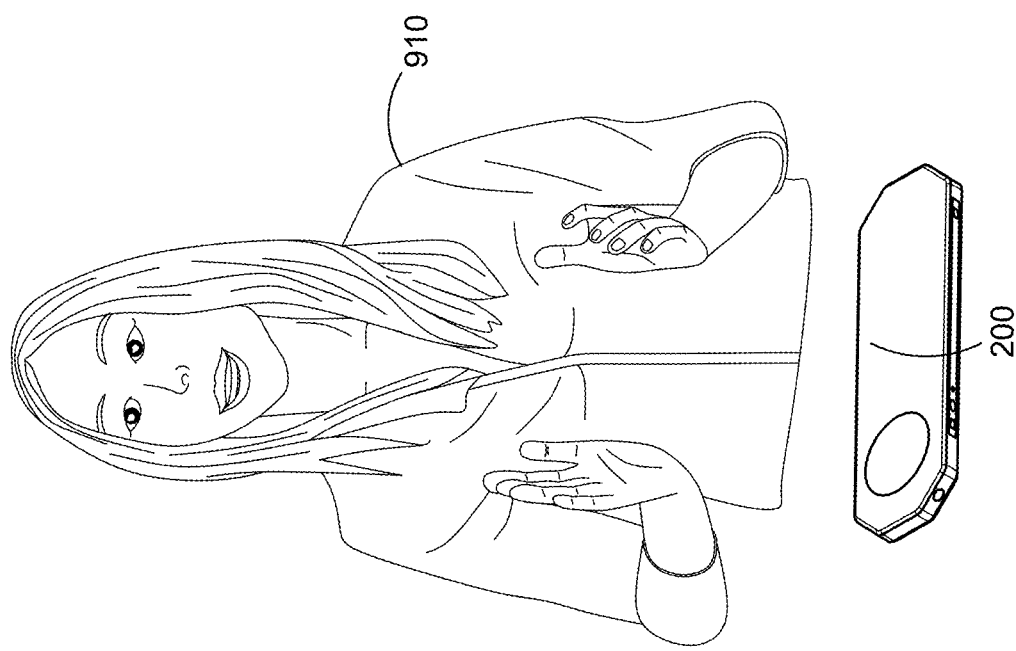

In FIG. 9B, the HIPD 200 is coupled to a stand 920 that elevates the HIPD 200 such that a set of one or more sensors of the HIPD 200 (e.g., represented by sensor screen surface 210; FIG. 2A) are at or near the user's eye level. By elevating the set of one or more sensors of the HIPD 200, the user is able to look directly at one or more imaging devices of the set of one or more sensors of the HIPD 200 without having to look down or otherwise tilt their head, which allows the user to transmit image data to video call recipients that is representative of a face-to-face interaction. As described above, the HIPD 200 can determine a location at which to cause the head-wearable device to present the AR representation of the video call 910. In some embodiments, the determined location is used to provide the user with a better viewing experience. For example, as further shown in FIG. 9B, the HIPD 200 causes the head-wearable device to present the AR representation of the video call 910 through a portion of the HIPD 200. In this way, the HIPD 200 simulates a real-life interaction by providing the user with an eye-level or face-to-face interaction with another person.

Figures 1, 9C:
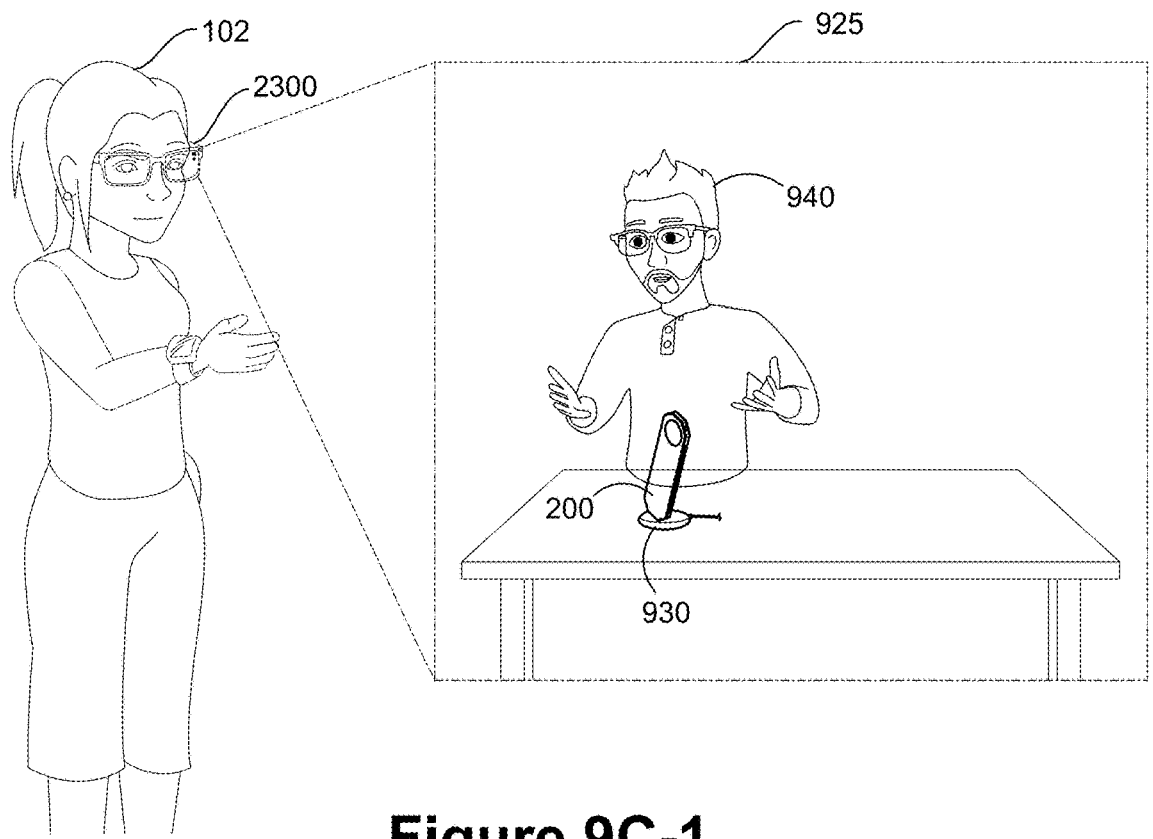

Turning to FIG. 9C-1, the HIPD 200 is coupled to a charging stand 930 and the HIPD 200 is positioned in an upright position (e.g., substantially perpendicular with a table). The HIPD 200 generates an AR representation of a video call and cause an AR device 2300 to present the AR representation of the video call. For example, as shown in FIG. 9C-1, a user 102 wearing an AR device 2300 has their field of view 925 directed at the HIPD 200 on top of a table, and the HIPD 200 cause the AR device 2300 to present a representation of another person's avatar (e.g., another AR representation of a video call 940). The representation of the other AR representation of the video call 940 is analogous to the video calls described above in reference to FIGS. 9A and 9B.

Figures 2, 9C:
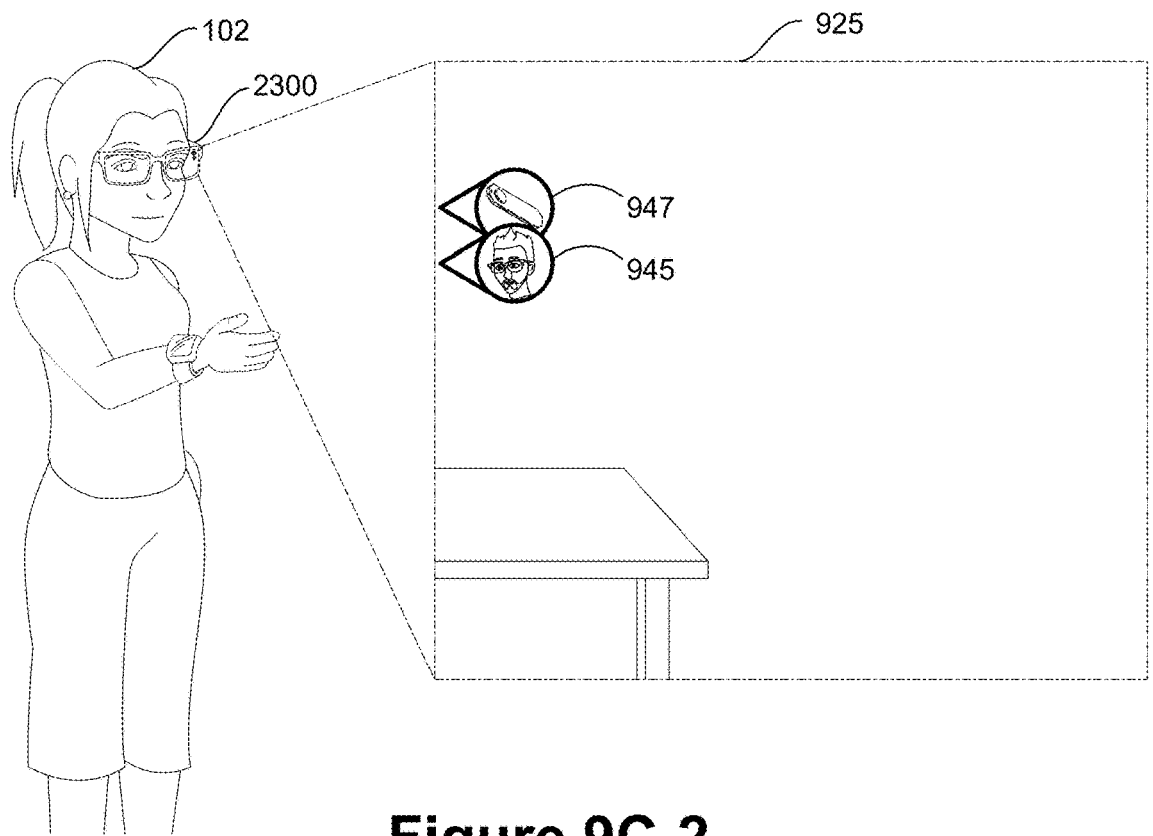
FIGS. 21A-21B-2 illustrate example artificial-reality systems, in accordance with some embodiments.

FIG. 9C-2 shows the user 102's field of view 925 after moving and/or turning their head. When the user 102 moves, the HIPD 200 is no longer in their field of view 925. In some embodiments, the HIPD 200 can cause the AR device 2300 to present an indicator or other marker for identifying the general location of the HIPD 200 and/or a currently presented AR representation. For example, as shown in FIG. 9C-2, the HIPD 200 causes the AR device 2300 to present a first indicator 945 showing a location of the other AR representation of the video call 940 and a second indicator 947 showing a location of the HIPD 200. Although FIGS. 9C-1 and 9C-2 show the other AR representation of the video call 940 anchored or presented above the HIPD 200, the other AR representation of the video call 940 (or any other AR representation) can be displayed at some other location relative to the HIPD 200. In some embodiments, when an AR representation is no longer in the user 102's field of view 925, the HIPD 200 can cause the AR device 2300 to cease presenting the AR representation. When the AR representation is video call, the HIPD 200 can change the video call to an audio call.

Figure 9D:
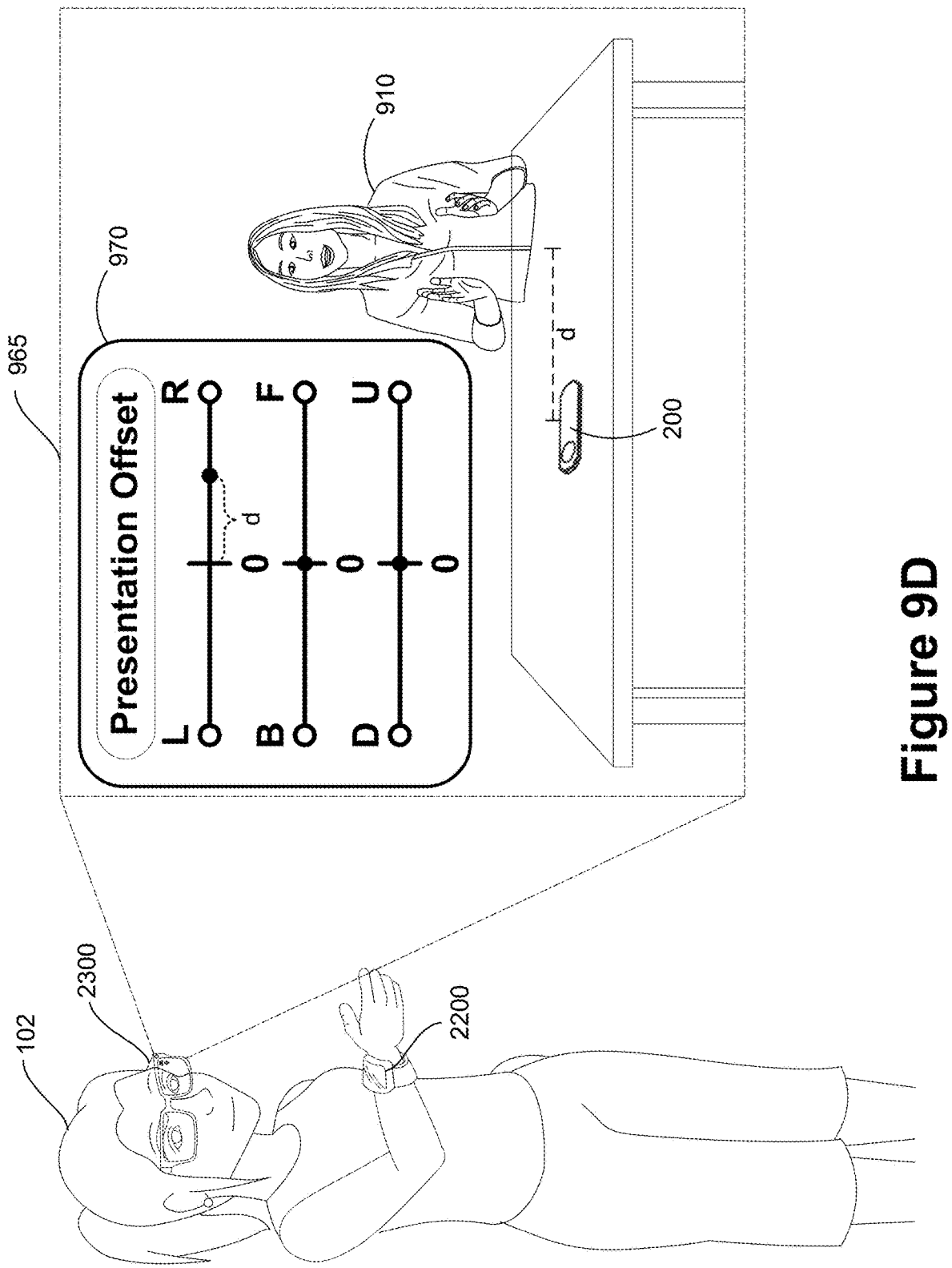

FIG. 9D shows adjustments to a location at which an AR representation is displayed. In particular, the user 102 provides one or more user inputs for defining a location relative to the HIPD 200 for presenting the AR representation of the video call 910. In some embodiments, the user 102 can provide one or more user inputs via a positional adjustment UI 970. The positional adjustment UI 970 allows the user 102 to cause the HIPD 200 to present the AR representation in front, behind, below, above, to the right, to the left of the HIPD 200 and/or any other variation. For example, the positional adjustment UI 970 includes a left-right adjustment UI element, a back-forward adjustment UI element, a down-up adjustment UI element, and/or other positional adjustment UI element. The positional adjustment UI elements can be sliders, knobs, input fields, radio buttons, and/or other similar UI elements.

In FIG. 9D, the user 102 provides a user input for causing the HIPD 200 to present the AR representation of the video call 910 to the right of the HIPD 200 by a distance "d," and, responsive to the user input, the HIPD 200 causes the AR device 2300 to present the AR representation of the video call 910 to the right of the HIPD 200 by the distance "d," as shown in the user 102's field of view 965. In some embodiments, the user 102 can provide the user input via the HIPD 200, the wrist-wearable device 2200, and/or the AR device 2300.

Figure 10C:
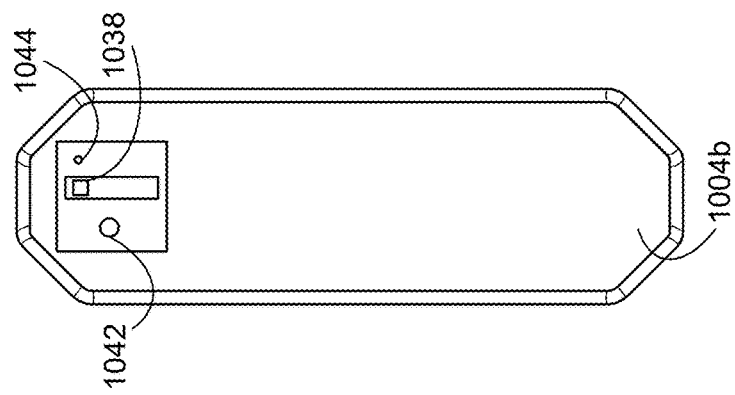
Figure 10B:
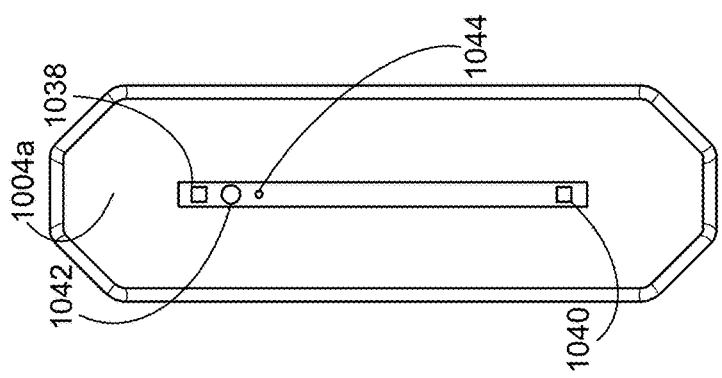
Figure 10A:
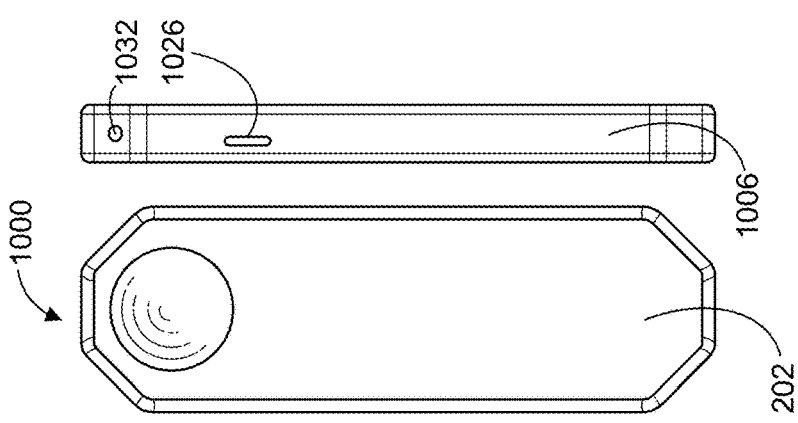

FIGS. 10A-10G illustrate different embodiments of a handheld intermediary processing device's surfaces, in accordance with some embodiments. FIG. 10A illustrates an embodiment of a front surface of an HIPD 1000 (analogous to HIPD 200; FIGS. 2A-2E) including a housing and a multi-touch input surface 202, as well as a side surface 1006 of the HIPD 1000. The side surface 1006 of the HIPD 1000 can include at least one imaging device 1032 and at least one physical button 1026. The side surface 1006 can be a first side surface including a first set of inputs (e.g., physical button 1026), imaging devices 1032, and sensors. A second side surface can be a distinct surface that includes a distinct set of sensors and and/or imaging devices. For example, the second side surface configured as side surface 206 (FIG. 2A) including the sensor screen surface 210 and corresponding components.

FIGS. 10B-10G illustrate different embodiments of a rear surface of handheld intermediary processing devices, in accordance with some embodiments. The rear surface of an HIPD 1000 is a surface opposite the multi-touch input surface 202. The different rear surface embodiments can include one or more sensors, imaging devices, and/or other components described above in reference to FIGS. 2A-2E.

FIG. 10B shows a first embodiment 1004a of a rear surface of the HIPD 1000. The first embodiment 1004a of the rear surface of the HIPD 1000 includes a set of one or more sensors. The set of sensors can include the one or more sensors describe above in reference to the screen surface 210 (FIG. 2A). For example, the set of sensors of the first embodiment 1004a of the rear surface of the HIPD 1000 can include a first rear imaging device 1038, a second rear imaging device 1040, a depth projector/receiver 1042, and a status light 1044.

FIG. 10C shows a second embodiment 1004b of a rear surface of the HIPD 1000. The second embodiment 1004b of the rear surface of the HIPD 1000 includes a set of one or more sensors. The set of sensors can include the one or more sensors describe above in reference to the screen surface 210 (FIG. 2A). For example, the set of sensors of the second embodiment 1004b of the rear surface of the HIPD 1000 can include the first rear imaging device 1038, the depth projector/receiver 1042, and a status light 1044.

FIG. 10D shows a third embodiment 1004c of a rear surface of the HIPD 1000. The third embodiment 1004c of the rear surface of the HIPD 1000 includes a set of one or more sensors. The set of sensors can include the one or more sensors describe above in reference to the screen surface 210 (FIG. 2A). For example, the set of sensors of the third embodiment 1004c of the rear surface of the HIPD 1000 can include the first rear imaging device 1038, the second rear imaging device 1040, the depth projector/receiver 1042, and the status light 1044.

FIG. 10E shows a fourth embodiment 1004d of a rear surface of the HIPD 1000. The fourth embodiment 1004d of the rear surface of the HIPD 1000 includes a set of one or more sensors. The set of sensors can include the one or more sensors describe above in reference to the screen surface 210 (FIG. 2A). For example, the set of sensors of the fourth embodiment 1004d of the rear surface of the HIPD 1000 can include the first rear imaging device 1038, the second rear imaging device 1040, the depth projector/receiver 1042, and the status light 1044.

FIG. 10F shows a fifth embodiment 1004e of a rear surface of the HIPD 1000. The fifth embodiment 1004e of the rear surface of the HIPD 1000 includes a set of one or more sensors. The set of sensors can include the one or more sensors describe above in reference to the screen surface 210 (FIG. 2A). For example, the set of sensors of the fifth embodiment 1004e of the rear surface of the HIPD 1000 can include the first rear imaging device 1038, a depth projector/receiver 1042, and a status light 1044.

FIG. 10G shows a sixth embodiment 1004*f* of a rear surface of the HIPD 1000. The sixth embodiment 1004*f* of the rear surface of the HIPD 1000 includes a set of one or more sensors. The set of sensors can include the one or more sensors describe above in reference to the screen surface 210 (FIG. 2A). For example, the set of sensors of the sixth embodiment 1004*f* of the rear surface of the HIPD 1000 can include the first rear imaging device 1038 and the second rear imaging device 1040.

FIGS. 11A-11G illustrate different embodiments of the multi-touch input surface, in accordance with some embodiments. The different embodiments of the multi-touch input surface described below in reference to FIGS. 11A-11G are similar to the multi-touch input surface 202 described above in reference to FIGS. 2B-2D. Similarly, the different embodiments of the multi-touch input surface can include a plurality of touch-input regions as described above in reference to FIGS. 2B-2D. The different embodiments of the multi-touch input surface can include distinct surface textures, surface depressions, surface rises, etc.

Figure 11D:
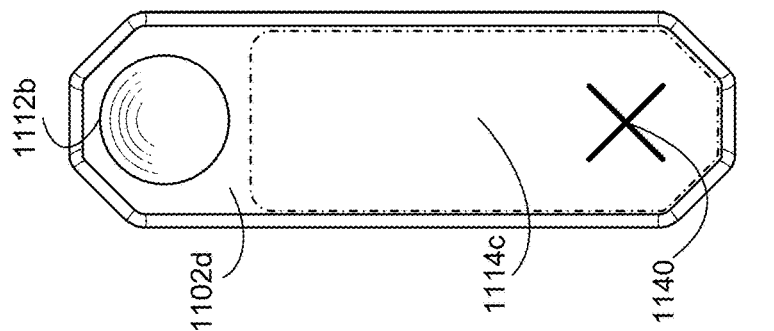
FIGS. 11A-11G illustrate different embodiments of the multi-touch input surface, in accordance with some embodiments.
Figure 11C:
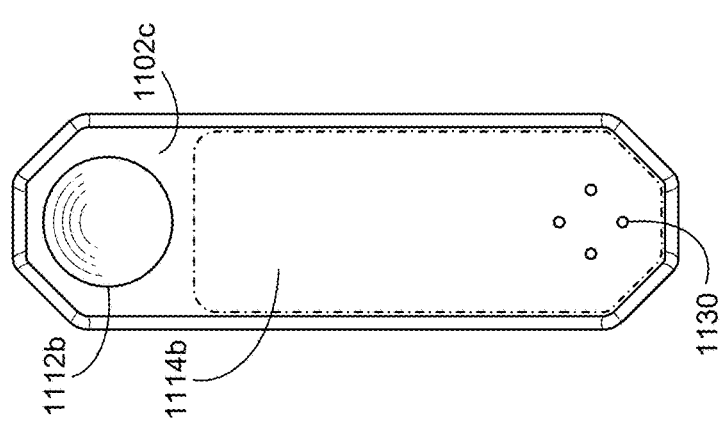
Figure 11B:
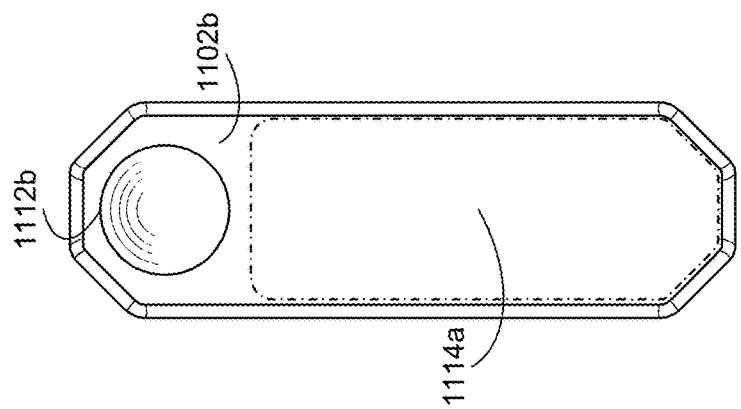
Figure 11A:
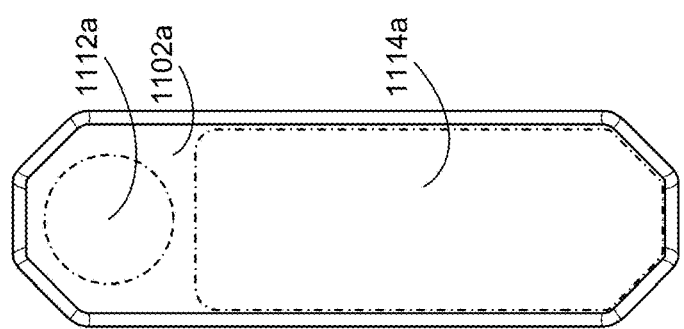

In FIG. 11A, a first embodiment of a multi-touch input surface 1102*a* is shown. The first embodiment of the multi-touch input surface 1102*a* is substantially planar and/or substantially uniform. For example, the first embodiment of the multi-touch input surface 1102*a* can include a substantially planar first touch-input surface 1112*a* and a substantially planar second touch-input surface 1114*a*. In particular, the substantially planar first touch-input surface 1112*a* and the substantially planar second touch-input surface 1114*a* do not include surfaces depressions or rises. The first embodiment of the multi-touch input surface 1102*a* can optionally include visual markers, texture markers (e.g., grooves), and/or other indicators to define the substantially planar first touch-input surface 1112*a* and the substantially planar second touch-input surface 1114*a* such that a user can be informed of the location of the touch-input surfaces.

FIG. 11B shows a second embodiment of a multi-touch input surface 1102*b*. The second embodiment of the multi-touch input surface 1102*b* includes at least one surface depression. For example, the second embodiment of the multi-touch input surface 1102*b* can include a depressed first touch-input surface 1112*b* and a substantially planar second touch-input surface 1114*a*. The depressed first touch-input surface 1112*b* is configured to guide user handling of an HIPD such that the user's thumb rests on top of the surface depression as discussed above in reference to FIGS. 2A-2E.

FIG. 11C shows a third embodiment of a multi-touch input surface 1102*c*. The third embodiment of the multi-touch input surface 1102*c* includes at least one surface depression and one or more controller-input visual markers. For example, the third embodiment of the multi-touch input surface 1102*c* can include a depressed first touch-input surface 1112*b* and a controller-touch-input surface 1114*b*. The controller-touch-input surface 1114*b* is substantially planar and includes one or more visual markers 1130 identifying common input buttons for a game controller (e.g., four graphic circle outlines). The controller-touch-input surface 1114*b* is analogous to the substantially planar second touch-input surface 1114*a* and includes visual markers for at least four distinct touch-input buttons. Although the controller-touch-input surface 1114*b* includes four graphic circle outlines for touch-input buttons, the user can provide an input at any portion of the controller-touch-input surface 1114*b*.

FIG. 11D shows a fourth embodiment of a multi-touch input surface 1102*d*. The fourth embodiment of the multi-touch input surface 1102*d* includes at least one surface depression and at least one zone-input visual marker 1140. For example, the fourth embodiment of the multi-touch input surface 1102*d* can include a depressed first touch-input surface 1112*b* and a zone-touch-input surface 1114*c*. The zone-touch-input surface 1114*c* is substantially planar and includes a zone-input visual marker 1140 identifying at least four regions. The zone-touch-input surface 1114*c* is analogous to the substantially planar second touch-input surface 1114*a*. Although the zone-touch-input surface 1114*c* identifies at least four regions, the user can provide an input at any portion of the zone-touch-input surface 1114*c*.

Figure 11G:
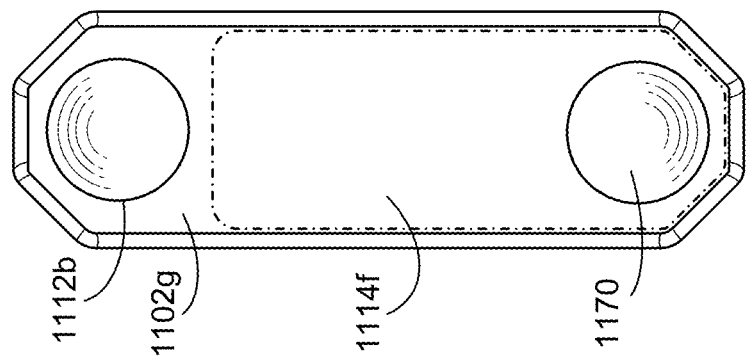
Figure 11F:
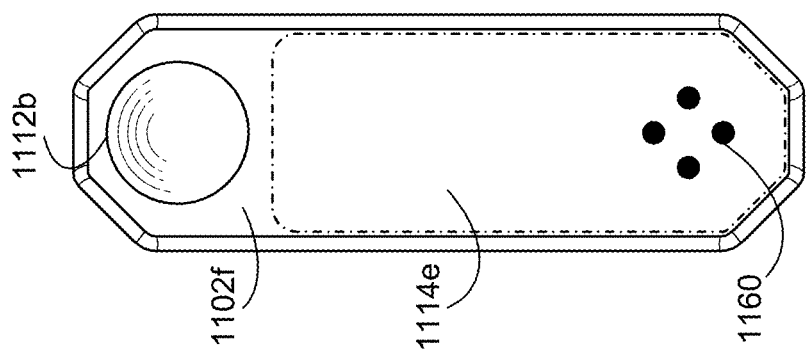
Figure 11E:
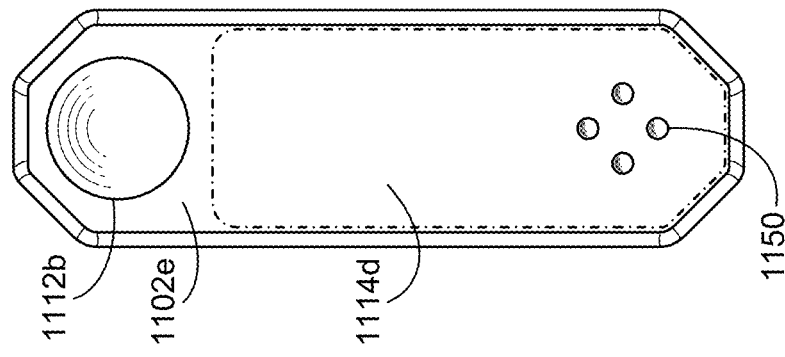

FIG. 11E shows a fifth embodiment of a multi-touch input surface 1102*e*. The fifth embodiment of the multi-touch input surface 1102*e* includes a plurality of surface depression. For example, the fifth embodiment of the multi-touch input surface 1102*d* can include a depressed first touch-input surface 1112*b* and a substantially planar second touch-input surface with depressions 1114*d*. The substantially planar second touch-input surface with depressions 1114*d* is substantially planar and includes a plurality of depression 1150 identifying common input buttons for a game controller. The substantially planar second touch-input surface with depressions 1114*d* is analogous to the substantially planar second touch-input surface 1114*a* and includes depression for at least four distinct touch-input buttons. Although the substantially planar second touch-input surface with depressions 1114*d* includes four touch-button depressions, the user can provide an input at any portion of the substantially planar second touch-input surface with depressions 1114*d*.

FIG. 11F shows a sixth embodiment of a multi-touch input surface 1102*f*. The sixth embodiment of the multi-touch input surface 1102*f* includes a plurality of surface rises. For example, the sixth embodiment of the multi-touch input surface 1102*f* can include a depressed first touch-input surface 1112*b* and a substantially planar second touch-input surface with rises 1114*c*. The substantially planar second touch-input surface with rises 1114*e* is substantially planar and includes a plurality of rises 1160 identifying common input buttons for a game controller. The substantially planar second touch-input surface with rises 1114*e* is analogous to the substantially planar second touch-input surface 1114*a* and includes rises for at least four distinct touch-input buttons. Although the substantially planar second touch-input surface with rises 1114*e* includes four touch-button rises, the user can provide an input at any portion of the substantially planar second touch-input surface with rises 1114*c*.

FIG. 11G shows a seventh embodiment of a multi-touch input surface 1102*g*. The seventh embodiment of the multi-touch input surface 1102*g* includes at least two surface depressions. For example, the seventh embodiment of the multi-touch input surface 1102*g* can include a depressed first touch-input surface 1112*b* and a substantially planar second touch-input surface with a depressed touch-input surface 1114*f*. The substantially planar second touch-input surface with the depressed touch-input surface 1114*f* is substantially planar and includes a depressed touch-input surface 1170 similar to the depressed first touch-input surface 1112*b*. In particular, the depressed touch-input surface 1170 is configured to guide the user when handling the HIPD such that each user's thumb rests on top of a surface depression. Although the substantially planar second touch-input surface with the depressed touch-input surface 1114*f* includes the depressed touch-input surface 1170, the user can provide an input at any portion of the substantially planar second touch-input surface with a depressed touch-input surface 1114*f*.

FIGS. 12A-12F illustrate different touch-input regions of a multi-touch input surface, in accordance with some embodiments. As described above in reference to FIGS. 2A-2E, a multi-touch input surface can include a plurality of touch-input regions. The plurality of touch-input regions can be selected from a set of predefined touch-input regions or defined by a user. The example plurality of touch-input regions described below in reference to FIGS. 12A-12F are non-limiting and can be configured as needed to provide the user with more flexibility. For example, a plurality of touch-input regions can include more or less regions and/or combine different configurations of regions shown below in reference to FIGS. 12A-12F. In some embodiments, one or more regions of a plurality of touch-input regions are dynamically adjusted based on an orientation of the HIPD 200 (e.g., landscape or portrait), a running application (e.g., a gaming application, messaging application, etc.), a communicatively coupled device controlled by the HIPD 200, etc.

Figure 12A:
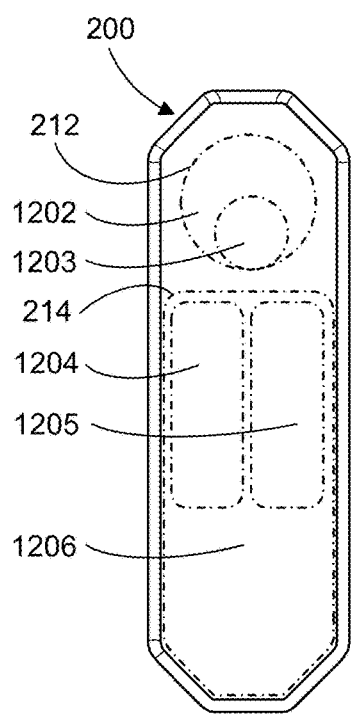
FIGS. 12A-12F illustrate different touch-input regions of a multi-touch input surface, in accordance with some embodiments.

FIG. 12A illustrates a first example configuration of the plurality of touch-input regions. The first example configuration of the plurality of touch-input regions includes at least the first touch-input surface 212 and the second touch-input surface 214. The first touch-input surface 212 and the second touch-input surface 214 can be partitioned into one or more regions. For example, the first touch-input surface 212 is partitioned into a first region 1202 and a second region 1203, and the second touch-input surface 214 is partitioned into a first region 1204, a second region 1205, and a third region 1206.

Figure 12B:
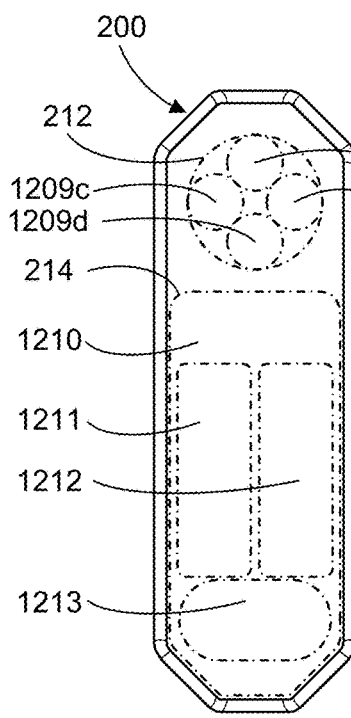

FIG. 12B illustrates a second example configuration of the plurality of touch-input regions. The second example configuration of the plurality of touch-input regions includes at least the first touch-input surface 212 and the second touch-input surface 214, each partitioned into one or more regions. For example, the first touch-input surface 212 is partitioned into a cluster of regions 1209a-1209d, and the second touch-input surface 214 is partitioned into a first region 1210, a second region 1211, a third region 1212, and a fourth region 1213.

Figure 12C:
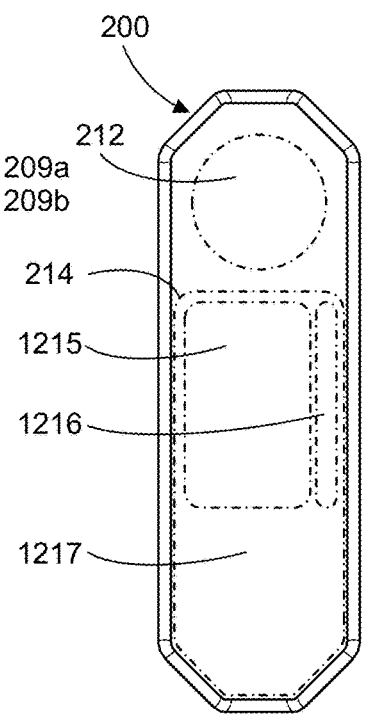

FIG. 12C illustrates a third example configuration of the plurality of touch-input regions. The third example configuration of the plurality of touch-input regions includes at least the first touch-input surface 212 and the second touch-input surface 214. The second touch-input surface 214 is partitioned into one or more regions. For example, the second touch-input surface 214 is partitioned into a first region 1215, a side scroll region 1216, and a third region 1217.

Figure 12D:
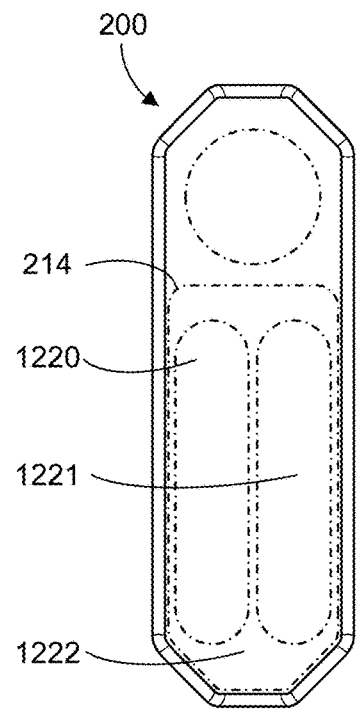

FIG. 12D illustrates a fourth example configuration of the plurality of touch-input regions. In the fourth example configuration of the plurality of touch-input regions, the second touch-input surface 214 is partitioned into a first region 1220, a second region 1221, and a third region 1222.

Figure 12E:
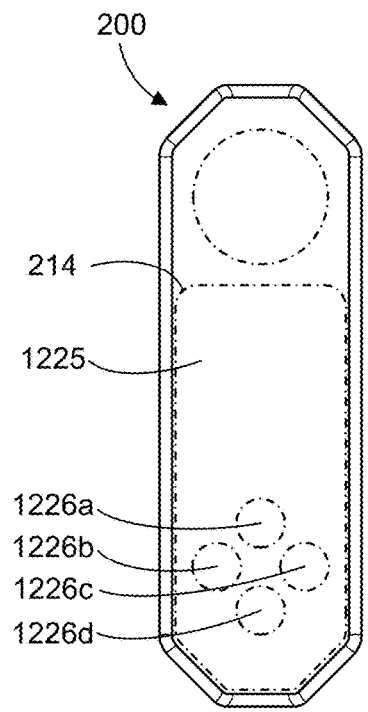

FIG. 12E illustrates a fifth example configuration of the plurality of touch-input regions. In the fifth example configuration of the plurality of touch-input regions, the second touch-input surface 214 is partitioned into a first region 1225 and a cluster of regions 1226a-1226d.

Figure 12F:
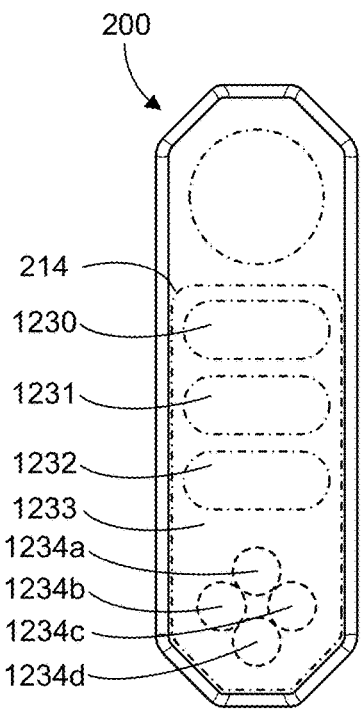

FIG. 12F illustrates a sixth example configuration of the plurality of touch-input regions. In the sixth example configuration of the plurality of touch-input regions, the second touch-input surface 214 is partitioned into a first region 1230, a second region 1231, a third region 1232, a fourth region 1233, and cluster of regions 1234a-1234d.

Each region of the plurality of touch-input regions can be associated with one or more distinct commands. In this way, the user is provided with any number of input regions based on their use case. Additionally, users can customize the regions of the plurality of touch-input regions such that use of the HIPD is personalized and/or accommodates different use cases.

Non-limiting examples of operational states of the HIPD 200, as well as example inputs provided at the HIPD 200 (FIGS. 2A-2E) are provided below in Tables 1-4.

Table 1 shows example functionality available at the HIPD 200 while the HIPD 200 is in standby mode (e.g., sleep mode) or in active mode (e.g., in use).

TABLE 1

| Availability of Functionality | | |
|---|---|---|
| HIPD Functionality | Standby Mode | Active Mode |
| Power Physical button (e.g., Physical button 226) | Available - Active | Available - Active |
| Launcher Soft Button (Optional) (e.g., Side button 215) | Available - Active | Available - Active |
| Large Cap Touch (e.g., second touch-input surface 214) | Available - Active | Available - Active |
| Force touch (e.g., multi-touch input surface 202) | Available - Active | Available - Active |
| Dish Cap touch (e.g., first touch-input surface 212) | Available - Active | Available - Active |
| IMU (e.g., IMU 258) | Available - Active | Available - Active |
| SLAM cameras (6DoF) (e.g., imaging devices 228 and 229) | Disabled | Available - Active on user input |
| Depth + RGB cameras (e.g., imaging devices 232 and 237) | Disabled | Available - Active on user input |

Table 2 shows example mode control inputs for the HIPD 200. In particular, example inputs for powering on, powering off, waking (e.g., transition from standby mode to active mode), sleeping, pairing (e.g., initiating a Bluetooth synchronization process), a resetting the HIPD 200. A tap, for purposes of this disclosure, in some embodiments, means a contact without application of subsequent downward pressure or force. Alternatively, a press, for purposes of this disclosure, in some embodiments, means a contact applied with a downward pressure or force or immediately followed by subsequent downward pressure or force. In some embodiments, a press is accompanied with audio and/or haptic feedback.

TABLE 2

| HIPD Mode Control Inputs | |
|---|---|
| HIPD Action | Control Input |
| Wake | Single Press or Tap (e.g., at physical button 226, side button 215, and/or multi-touch input surface 202) |
| Sleep | Single Press or Tap |
| Pair | Multi-press (e.g., at physical button 226 and/or side button 215) |
| Power On | Single Press/Long press (e.g., at physical button 226 while HIPD 200 is off) |
| Power Off | Long press (e.g., pressing down at physical button 226 for at least 3 seconds) |
| Reset | Long press (e.g., pressing down at physical button 226 for at least 5 seconds) |
| Assistant | Long press (e.g., at multi-touch input surface 202 to activate virtual assistant) |

Table 3 shows example inputs and control actions available at the HIPD 200. Scrolling and panning provide 1-dimensional control (e.g., up, and down) and 2-dimensional control (e.g., up, down, left, and right), respectively, using the multi-touch input surface 202 (while the HIPD 200 is held in portrait and/or landscape mode). Alternatively, manipulation provides 3-dimensional control using 6DoF or SLAM data obtained by the HIPD 200 (e.g., at least via imaging devices 228 and 229) while the HIPD 200 is held in portrait mode. A launcher, for purposes of this disclosure, in some embodiments, is a home menu or quick access menu, such as control center UI 115 (FIG. 1B), that allows the user to easy and quick access to one or more applications or functions of the HIPD 200. In some embodiments, the user can modify and/or adjust the different applications or functionality shown in the launcher (e.g., via a long press at the multi-touch input surface 202 when the launcher is shown).

TABLE 3

HIPD Control Actions

| HIPD Action | First Input Method | Second Input Method | Third Input Method |
|---|---|---|---|
| Target | Drag/Swipe (e.g., at second touch-input surface 214) | Eye Tracking (e.g., via an imaging device) | N/A |
| Select | Eye Tracking | Single Tap (e.g., at second touch-input surface 214) | N/A |
| Scrolling (1D) | Eye Tracking | Drag/Swipe (e.g., at second touch-input surface 214) | N/A |
| Panning (2D) | Eye Tracking | Drag/Swipe (e.g., at second touch-input surface 214) | N/A |
| Manipulations (3D) | Eye Tracking | Tap and Hold (e.g., at second touch- input surface 214) | Movement (e.g., tracked using computer vision image sensors) |
| Launcher | Single Press (e.g., at side button 215) | Single Press (e.g., at first region 242 of the second touch-input surface 214) | N/A |
| Long pinch | Eye Tracking | Tap and Hold (e.g., at second touch-input surface 214) | N/A |
| Game Menu | Single Press (in game) (e.g., at side button 215) | Single Press (in game) (e.g., at first region 242 of the second touch-input surface 214) | N/A |

Table 4 shows example textual inputs at the HIPD 200. The textual inputs can be presented via a virtual keyboard presented to a user (e.g., a virtual keyboard UI 817). Alternatively, the textual inputs can be dictated to the user (e.g., textual inputs can be presented as audio feedback to the user (e.g., reading out each input letter, each completed word, completed sentence, etc.)). Textual inputs provided via the HIPD 200 allow the user to send messages while remaining socially active. For example, the user does not need to look down at a display to type a message and can remain engaged with others without appearing disinterested or distracted. Alternatively, or in addition, the HIPD 200 allows the user to provide textual inputs while the user is in motion (e.g., walking, shopping, etc.), multitasking, and/or in any number of other situations.

TABLE 4

HIPD Textual Inputs

| HIPD Action | Textual Input |
|---|---|
| Default Typing | Single Press or Tap (e.g., at multi-touch input surface 202) |
| Swipe Typing | Drag/Swipe (e.g., at multi-touch input surface 202) |
| Computer Vision Typing | Eye tracking (e.g., via image data captured by cameras 270) |
| Dictation | Press and hold (e.g., at multi-touch input surface 202) to activate a microphone for voice to text transcription, release hold to deactivate microphone |
| Typing Option | Tap and Hold (e.g., at multi-touch input surface 202) |

Figures 13A, 13B, 13C:
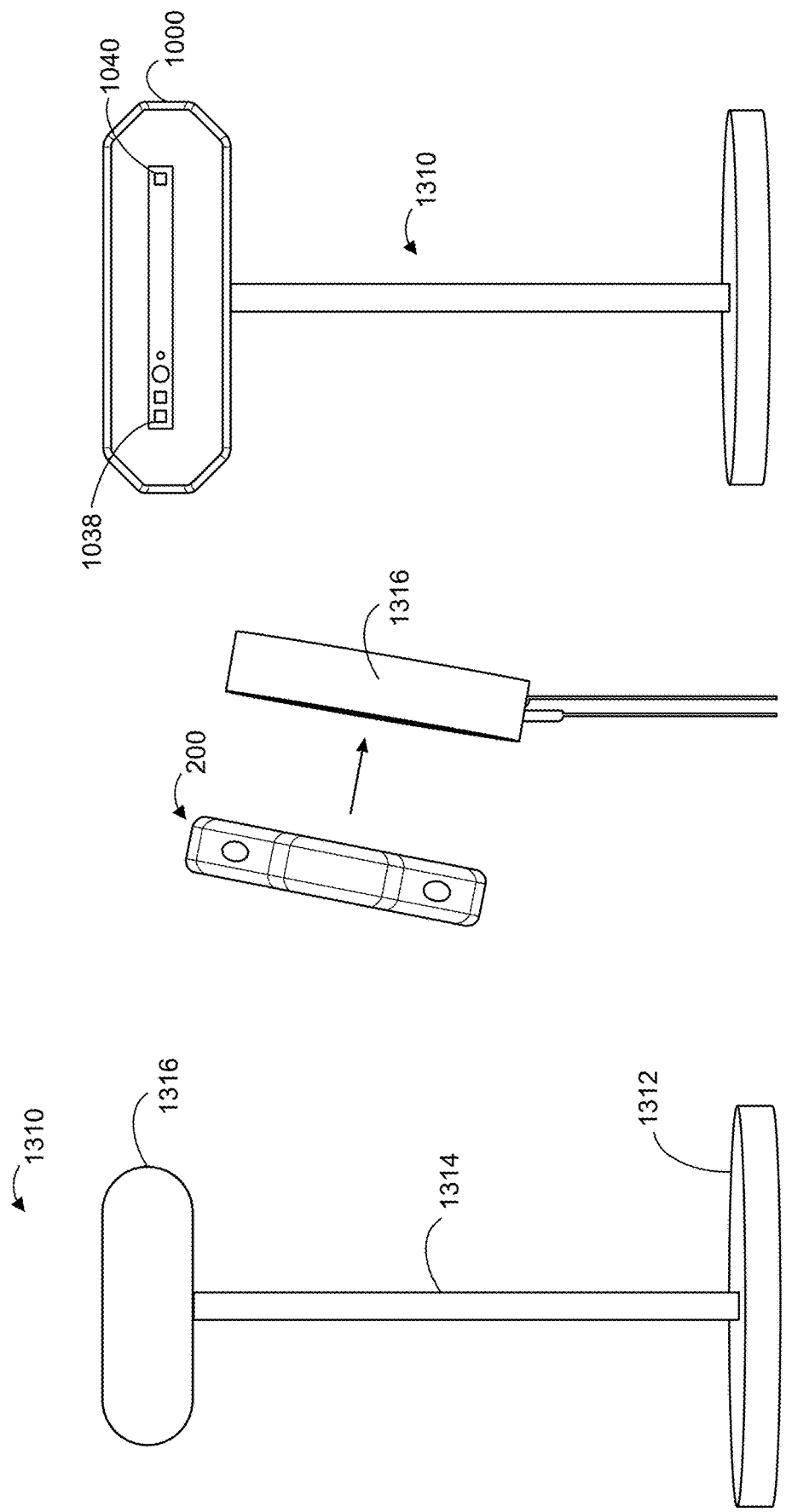
FIGS. 13A-13C illustrate a magnetic stand for holding the handheld intermediary processing device, in accordance with some embodiments.

FIGS. 13A-13C illustrate a magnetic stand for holding the handheld intermediary processing device, in accordance with some embodiments. As shown in FIG. 13A, the magnetic stand 1310 can include a base 1312, an adjustable neck (or post) 1314, and a magnetic coupling surface 1316. A user can adjust as height of the adjustable neck 1314 such that, when an HIPD 200 (FIGS. 2A-2E) is coupled to the magnetic stand 1310, one or more imaging devices (e.g., imaging devices 232 and 237) of the HIPD 200 are eye level with the user's eye. By adjusting the height of the adjustable neck 1314, the magnetic stand 1310 is configured enable an in-person interaction. For example, as shown in FIG. 9B, the HIPD 200 can cause an AR representation of a video call 910 to be presented via a head-wearable device as a one-to-one representation of another person. Additionally, because the magnetic stand 1310 places the one or more imaging devices of the HIPD 200 at eye level, the one or more imaging devices of the HIPD 200 capture forward facing image data of the user such that, when the forward facing image data is sent to a recipient, the video call is representative of an in-person interaction.

FIG. 13B illustrates the magnetic coupling surface 1316 and the HIPD 200. In some embodiments, the HIPD 200 includes a metallic or magnetic surface that is configured to couple with the magnetic coupling surface 1316. The magnetic coupling surface 1316 keeps the HIPD 200 fixed in place such that it can be used without being held by the user. In some embodiments, the magnetic coupling surface 1316 operates as a charging surface such that when the HIPD 200 is coupled with the magnetic stand 1310, the HIPD 200 battery is charged over time or the HIPD 200 uses power from the magnetic stand 1310 without using stored power (e.g., in a battery).

FIG. 13C shows the magnetic stand 1310 coupled to an HIPD 1000 (e.g., FIG. 10B). As described above, the magnetic stand 1310 is configured such that at least one imaging device (e.g., imaging devices 1038 and 1040) of the HIPD 1000 is at eye level with and facing the user.

Figure 14B:
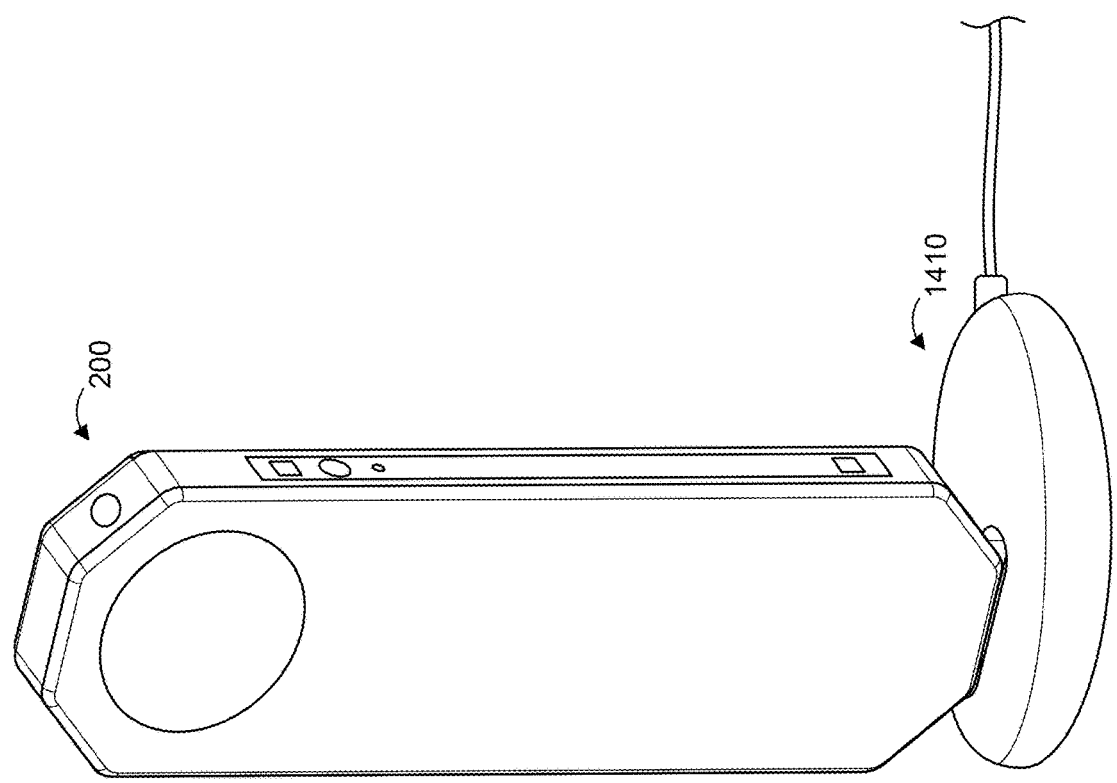
FIGS. 14A-14B illustrate a first example charging stand for a handheld intermediary processing device, in accordance with some embodiments.
Figure 14A:
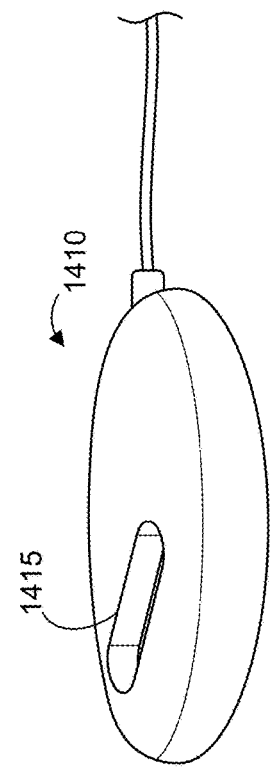

FIGS. 14A-14B illustrate a first example charging stand for a handheld intermediary processing device, in accordance with some embodiments. In some embodiments, an HIPD 200 is configured to couple with a first example charging stand 1410. The first example charging stand 1410 includes a cavity 1415 for receiving the HIPD 200. The cavity 1415 can include a connector (e.g., a wired connector, such as a USB-C connector) in an upright position configured to mechanically couple with the HIPD 200 (e.g., via a charging port of the HIPD 200). In some embodiments, the connector is recessed into the cavity 1415. Alternatively, in some embodiments, the cavity 1415 is configured to wirelessly couple with the HIPD 200 and wirelessly deliver usable power to the HIPD 200. In other words, the first example charging stand 1410 can operate as a near-field charging pad and/or other wireless-power delivery system.

FIG. 14B shows the HIPD 200 coupled with the first example charging stand 1410. The HIPD 200, when coupled with the first example charging stand 1410, mates with the first example charging stand 1410 such that it is securely held by the first example charging stand 1410. In some embodiments, while the HIPD 200 is coupled with the first example charging stand 1410, the HIPD 200 can cause a communicative coupled display to present AR representations of data. For example, as shown in FIG. 9C, the HIPD 200, while mounted on a charging stand, is able to cause a communicatively coupled display to present an AR representation of a video call. Additionally, or alternatively, the HIPD 200 can operate as an information hub and present to the user a time of day, a current battery level, notifications, etc.

Figure 15B:
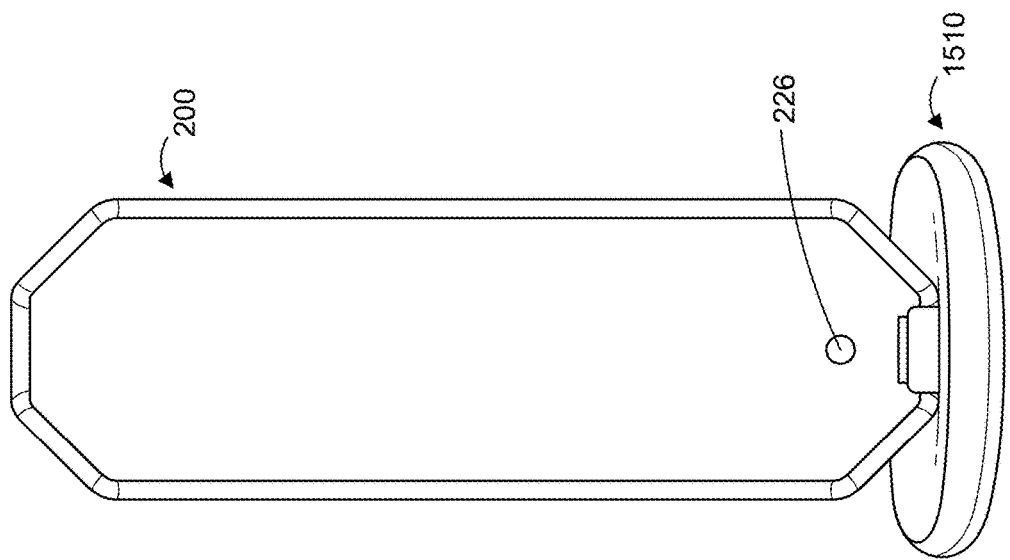
FIGS. 15A-15B illustrate a second example charging stand for a handheld intermediary processing device, in accordance with some embodiments.
Figure 15A:
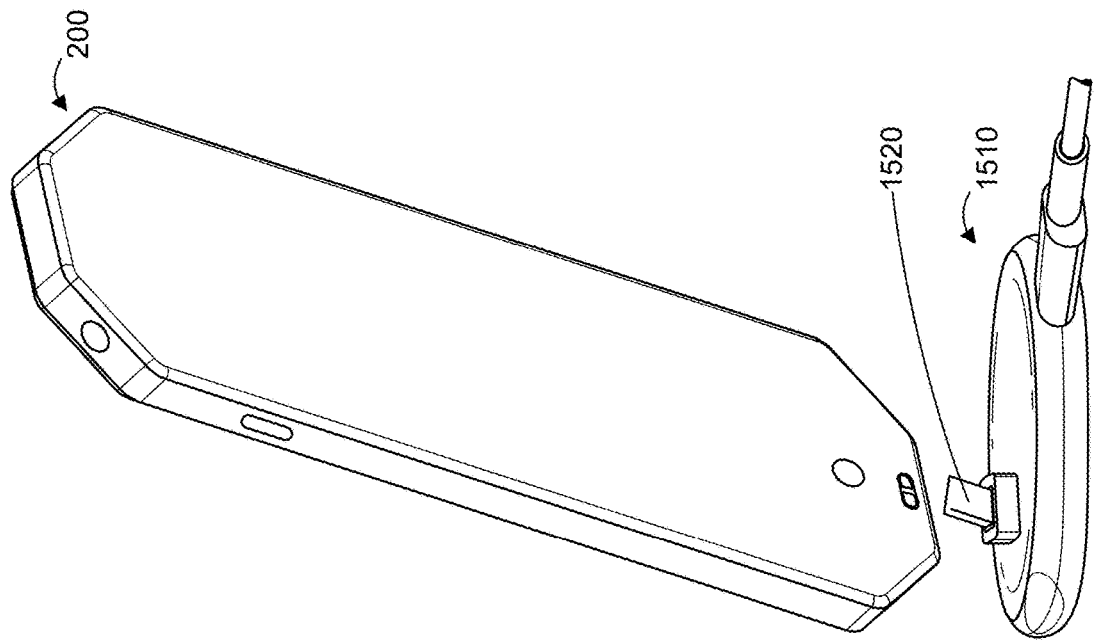

FIGS. 15A-15B illustrate a second example charging stand for a handheld intermediary processing device, in accordance with some embodiments. In some embodiments, the second example charging stand 1510 includes an external connector 1520 for coupling with the HIPD 200. The external connector 1520, when coupled with the HIPD 200, is configured to provide usable power to the HIPD 200. In some embodiments, external connector 1520 can be stored withing the second example charging stand 1510. For example, the external connector 1520 can be couple with a hinge and folded flush with the second example charging stand 1510.

FIG. 15B illustrates the second example charging stand 1510 while coupled with the HIPD 200. A rear view of the HIPD 200 while coupled with the second example charging stand 1510 is shown. In some embodiments, one or more inputs of the HIPD 200 are accessible when the HIPD 200 is coupled with the second example charging stand 1510. For example, the physical button 226 is still accessible while the HIPD 200 is coupled with the second example charging stand 1510. Similar to the first example charging stand 1410, while the HIPD 200 is coupled with the second example charging stand 1510, the HIPD 200 can cause a communicative coupled display to present AR representations of data and/or operate as an information hub.

Figure 16B:
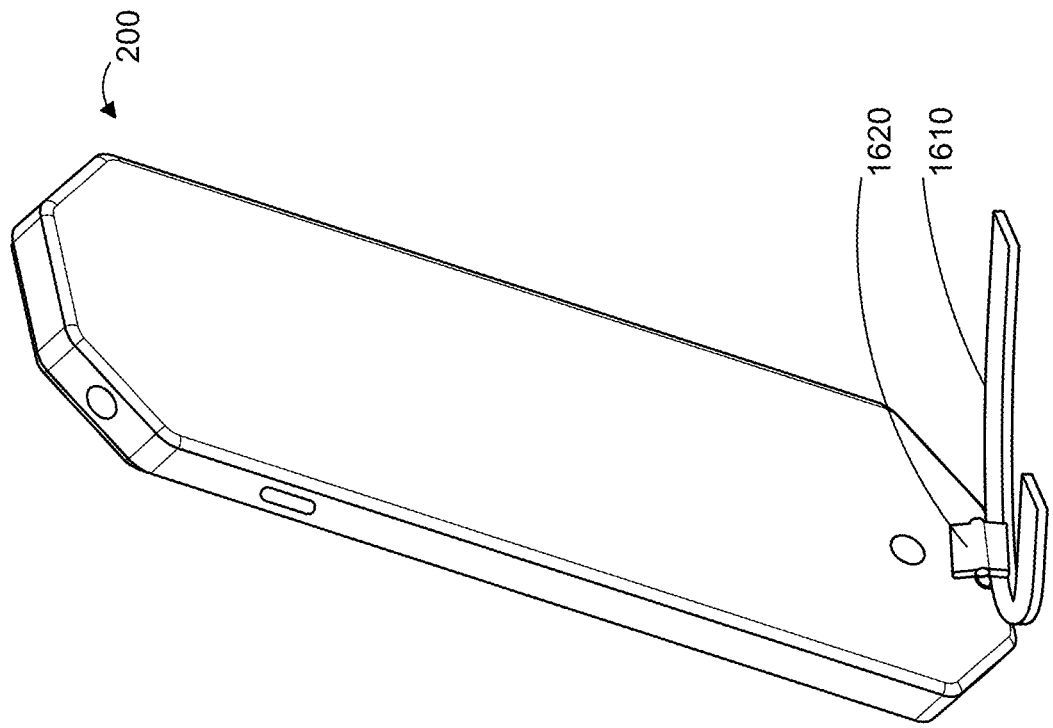
FIGS. 16A-16B illustrate an integrated stand of a handheld intermediary processing device, in accordance with some embodiments.
Figure 16A:
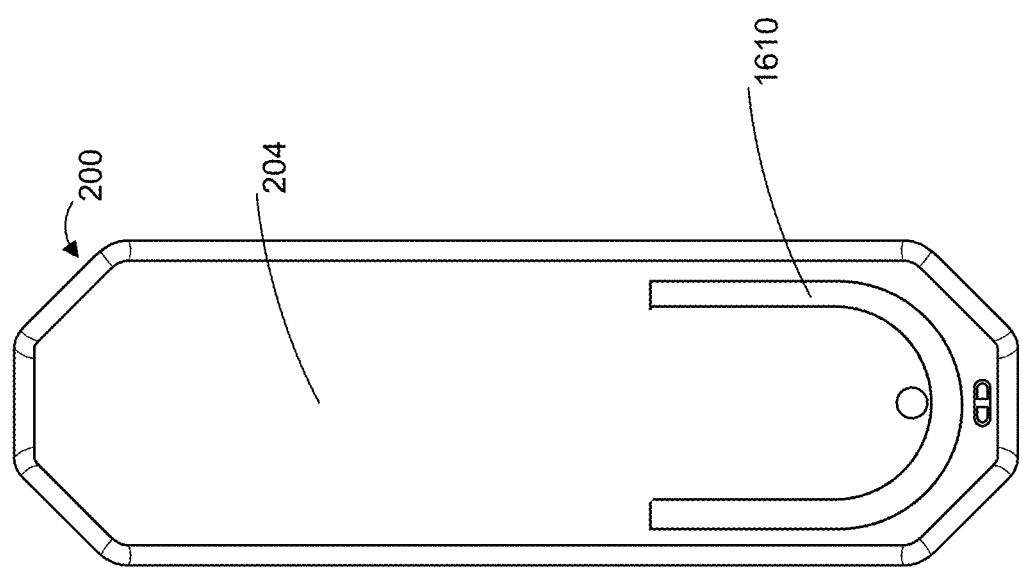

FIGS. 16A-16B illustrate an integrated stand of a handheld intermediary processing device, in accordance with some embodiments. In some embodiments, an HIPD 200 includes an integrated stand 1610 on its second surface 204. The integrated stand 1610 can be a fold-out stand for holding the HIPD 200 in an upright portion when integrated stand 1610 is exposed. Alternatively, when the integrated stand 1610 is not extended, the integrated stand 1610 is flush (e.g., in plane with the second surface 204) with the second surface 204. In some embodiments, the integrated stand 1610 is configured to magnetically couple with the second surface 204 when in the folded position.

FIG. 16B shows the integrated stand 1610 in an extended (e.g., folded-out) position. As shown in FIG. 16B, the integrated stand 1610 rotates about a hinge 1620 and holds the HIPD 200 in an upright position. In some embodiments, the HIPD 200 detects when the integrated stand 1610 is extended. In this way, the HIPD 200 utilizes its current position when causing a communicatively coupled display to present information or operates as an information hub as described above in reference to FIG. 14B.

Figure 17B:
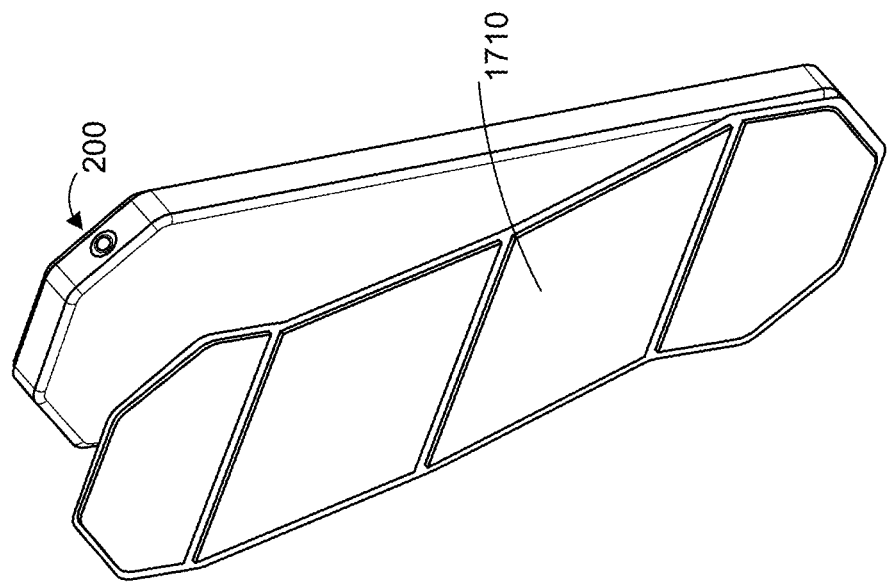
FIGS. 17A-17D illustrate a foldable stand, in accordance with some embodiments.
Figure 17A:
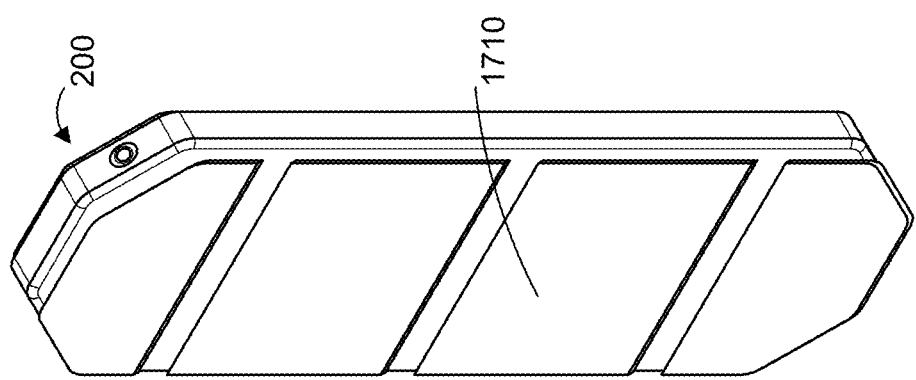

FIGS. 17A-17D illustrate a foldable stand, in accordance with some embodiments. As shown in FIG. 17A, the foldable stand 1710 is configured to couple with an HIPD 200 (e.g., via magnetic coupling). The foldable stand 1710, when not in use, is substantially planar with the second surface 204 (e.g., rear surface) of the HIPD 200. More specifically, the foldable stand 1710 couples to and covers the second surface 204 such that the overall size and shape of the HIPD 200 does not change. In some embodiments, the foldable stand 1710 provides impact resistance to the second surface 204.

Figure 17D:
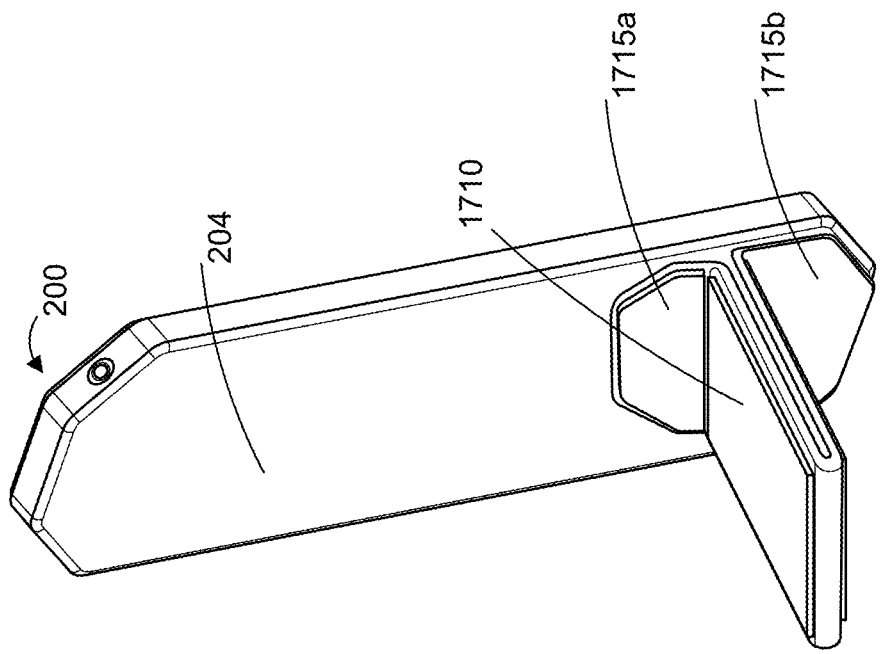
Figure 17C:
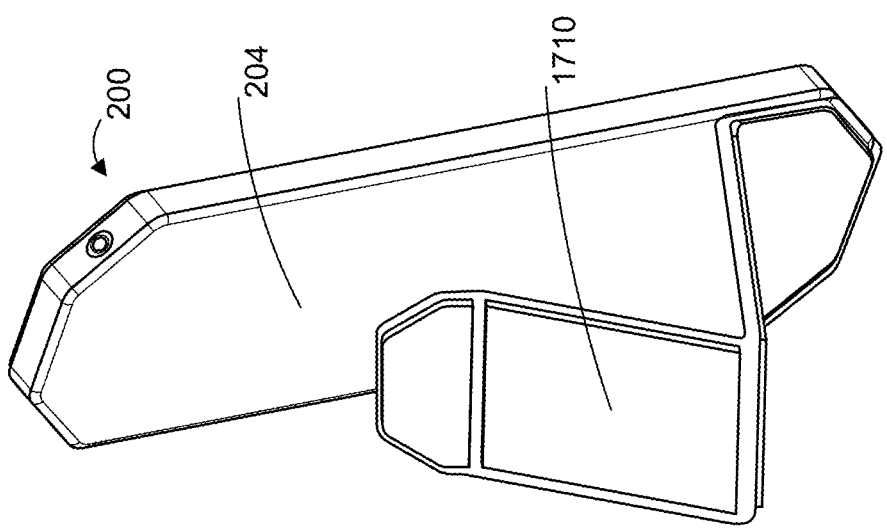

FIG. 17B-17D show the foldable stand 1710 in use. FIGS. 17B-17C show the foldable stand 1710 being folded from its planar configuration into a kickstand configuration as shown in FIG. 17D. When in the kickstand configuration, end portions 1715a and 1715b of the foldable stand 1710 magnetically couple with a portion of the second surface 204. A portion of the foldable stand 1710 extends perpendicular to the second surface 204 such that the foldable stand 1710 hold the HIPD 200 upright and at a slight angle. When the foldable stand 1710 is in the kickstand configuration, a portion of the second surface 204 is exposed. In some embodiments, the HIPD 200 is configured to detect when the foldable stand 1710 is in the kickstand configuration such that the HIPD 200 can utilize its current position when causing a communicatively coupled display to present information or operate as an information hub as described above in reference to FIG. 14B.

FIGS. 18 and 19 illustrate flow diagrams of methods performed by a handheld intermediary processing device, in accordance with some embodiments. Specifically, FIG. 18 shows a method 1800 for causing presentation of data at a device communicatively coupled with an HIPD 200 and FIG. 19 shows a method 1900 for distributing tasks between the HIPD 200 and communicatively coupled devices. Operations (e.g., steps) of the methods 1800 and 1900 can be performed by one or more processors (e.g., central processing unit and/or MCU) of a system (e.g., CPU 277 of computer system 240 of the HIPD 200; FIG. 2E). At least some of the operations shown in FIGS. 18 and 19 correspond to instructions stored in a computer memory or computer-readable storage medium (e.g., storage, RAM, and/or other memory; e.g., memory 278 of computer system 240 of an HIPD 200). Operations of the method 1800 and 1900 can be performed by a single device alone or in conjunction with one or more processors and/or hardware components of another communicatively coupled device (e.g., a wrist-wearable device 2200, AR device 2300, VR device 2310, smart textile-based garment (not shown), etc.) and/or instructions stored in memory or computer-readable medium of the other device communicatively coupled to the system. In some embodiments, the various operations of the methods described herein are interchangeable and/or optional, and respective operations of the methods are performed by any of the aforementioned devices, systems, or combination of devices and/or systems. For convenience, the method operations will be described below as being performed by particular component or device but should not be construed as limiting the performance of the operation to the particular device in all embodiments.

Turning to (A1) FIG. 18, the method 1800 for displaying AR representation of data at a location relative to the HIPD 200, in accordance with some embodiments, is shown. The method 1800 is performed at the HIPD 200 while (1810) the HIPD 200 is communicatively coupled with a head-wearable device (e.g., AR device 2300, VR device 2310, and/or other communicatively coupled device with a display), distinct and separate from the HIPD 200, and the HIPD 200 and the head-wearable device are configured to share operational data (e.g., image data, audio data, application data, messages, notifications, etc.). The method 1800 includes generating (1820), by the HIPD 200, an AR representation based on the operational data, and determining (1830), by the HIPD 200, a location relative to the HIPD 200 to present the AR representation. The method 1800 further includes providing (1840), by the HIPD 200, instructions to the head-wearable device that cause the head-wearable device to display the AR representation at the location relative to the HIPD 200.

(A2) In some embodiments of A1, the HIPD 200 does not include a display.

(A3) In some embodiments of A1-A2, the AR representation is further based on positional mapping data captured by the HIPD 200. For example, positional mapping data can be used to determine a size, orientation, and/or position of the AR representation (e.g., an AR object as shown and described above in reference to FIGS. 5A-7D). In other words, the positional mapping data can be used to determine a pose of the AR representation.

(A4) In some embodiments of A3, the positional mapping data includes six degrees of freedom positional data. For example, as shown and described above in reference to FIGS. 1A-1D and 5A-9D, mapping data of the user's environment (e.g., a room), position within the environment, objects within environment, the objects' position within the environment, and/or other mapped data can be used for the generation and presentation of the AR representation, as well as user interaction with the AR representation.

(A5) In some embodiments of A1-A4, in response to a determination that the head-wearable device (which is worn by the user and presenting the AR representation) has moved from a first position to a second position, distinct from the first position, the method 1800 includes updating, by the HIPD 200, the AR representation based on the second position to create an updated AR representation, and determining, by the HIPD 200, an updated location relative to the HIPD 200 to present the updated AR representation. The method 1800 further includes providing, by the HIPD 200, instructions to the head-wearable device that cause the head-wearable device to display the updated AR representation at the updated location relative to the HIPD 200. In this way, the HIPD 200 dynamically adjusts presentation of the AR representation such that it moves relative to the user's position, viewing angle, or other changes to the user's environment. For example, the user can move to the right of the HIPD 200 or rotate their head to the right, and the HIPD 200 can cause the AR representation to be updated such that a view angle of the AR representation is consistent with eh user's view angle, or (depending on the user's display setting) the AR representation is repositioned to a new location relative to the HIPD 200. Example changes to an AR representation based on user input and/or movements are shown and described above in reference to FIGS. 5A-9D.

(A6) In some embodiments of A1-A5, the method 1800 includes, in response to a determination that the HIPD 200 has moved from a third position to a fourth position, distinct from the third position, updating, by the HIPD 200, the AR representation based on the fourth position to create another updated AR representation, and determining, by the HIPD 200, another updated location relative to the HIPD 200 to present the other updated AR representation. In other words, the HIPD 200 can also cause the AR representation (and the presentation location) to be updated based on positional changes to the HIPD 200 or other communicatively coupled device that is presenting the AR representation. In some embodiments, the location relative to the HIPD 200 and the updated location relative to the HIPD 200 can be the same. For example, as the user moves backwards or further away from the HIPD 200 the size of the AR representation can be adjusted to be smaller while still being presented above the HIPD 200. Example changes to an AR representation based on user input and/or movements are shown and described above in reference to FIGS. 5A-9D.

(A7) In some embodiments of A5-A6, the method 1800 includes, in response to a determination that the HIPD 200 is outside a field of view of the head-wearable device, providing instructions to the head-wearable device that cause the head-wearable device to cease displaying respective updated AR representations. In some embodiments, ceasing to display respective updated AR representations include causing the head-wearable device to present a simplified representation of the operations data (e.g., displaying a 2D representation of the operational data, notifications associated with the operational data, etc.). Example changes to an AR representation based on user movements are shown and described above in reference to FIGS. 5A-9D.

(A8) In some embodiments of A5-A6, the method 1800 includes, in response to a determination that the HIPD 200 is outside the user's field of view, updating, by the HIPD 200, the AR representation based on the user's field of view to create yet another updated AR representation; and providing, by the HIPD 200, instructions to the head-wearable device that cause the head-wearable device to display the yet other updated AR representation at a display of the head-wearable device. Example changes to an AR representation are shown and described above in reference to FIGS. 5A-9D.

(A9) In some embodiments of A7-A8, the method 1800 includes, in response to the determination that the HIPD 200 is outside the field of view of the head-wearable device, providing instructions to the head-wearable device that cause the head-wearable device to display an indicator identifying a location of the HIPD 200. This allows the user to locate the HIPD 200 such that it is easy to locate. Example changes to an AR representation based on user movements are shown and described above in reference to FIGS. 5A-9D.

(A10) In some embodiments of A1-A9, determining the location relative to the HIPD 200 to present the AR representation includes selecting one of a plurality of predefined locations relative to the HIPD 200. The plurality of predefined locations relative to the HIPD 200 can include in front, behind, below, above, to the right, to the left of the HIPD 200 and/or any other variation. In some embodiments, the predefined location relative to the HIPD 200 is automatically selected based on the user's current position or a user's predefined configuration (e.g., display settings). The location at which the AR representation is presented can be modified at any time. Example changes to an AR representation are shown and described above in reference to FIGS. 5A-9D.

(A11) In some embodiments of A10, selecting the one of the plurality of predefined locations relative to the HIPD 200 includes receiving a user input defining the location relative to the HIPD 200, and selecting the one of the plurality of predefined locations based on the user input. For example, the user can manually select a predefined location relative to the HIPD 200. Alternatively, or in addition, in some embodiments, the location relative to the HIPD 200 is based on user input defining a location (e.g., a wall, a monitor screen, a projector, a platform, etc.). For example, a user can define a location at which the AR representation should be presented and the HIPD 200 can use a user defined location (for the presentation of the AR representation) to determine the location relative to the HIPD 200 at which the AR representation should be presented (by a head-wearable device or other communicatively coupled display). Example changes to an AR representation are shown and described above in reference to FIGS. 5A-9D.

(A12) In some embodiments of A10-A11, selecting the one of the plurality of predefined locations relative to the HIPD 200 includes determining one or more foreign objects within a user's field of view, and selecting the one of the plurality of predefined locations based on a location of the one or more foreign objects. In this way, the AR representation is not presented on top of one or more foreign objects or obstructed by one or more objects. For example, the HIPD can detect the presence of a table or a lamp and select one of the plurality of predefined locations relative to the HIPD 200 such that the AR representation is not presented through or below the table or lamp. In this way, the HIPD 200 maintains scene awareness between the real-world environment and the AR representation. In some embodiments, selection of one of the plurality of predefined locations relative to the HIPD 200 is also based on the user's viewing perspective. For example, the HIPD 200 can cause the AR representation to be presented within the user's field of view even though the HIPD 200 is not within the user's field of view. Example changes to an AR representation are shown and described above in reference to FIGS. 5A-9D.

By causing the AR representation to be displayed at a predetermined location relative to the HIPD 200, the HIPD 200 can ensure that the AR representation is always visible to the user. Similarly, adjustments to the presentation of the AR representation allow the user to quickly and easily locate the HIPD 200. For example, if the user moves away from the HIPD 200, the AR representation can be presented to the user within their peripheral vision and navigate towards the AR representation to locate the HIPD 200. Alternatively, if the AR representation is not visible, by causing the AR representation to be displayed at a predetermined location relative to the HIPD 200, the HIPD 200 allows the user to locate the AR representation quickly and easily.

(A13) In some embodiments of A1-A12, the method 1800 includes prior to generating, by the HIPD 200, the AR representation based on the operational data, detecting another user input to generate the AR representation. In other words, the user can provide a user input to cause the HIPD 200 to generate and present the AR representation. In this way, the user can manually initiate or turn off the presentation of the AR representation. Example changes to an AR representation are shown and described above in reference to FIGS. 1A-1D and 5A-9D.

(A14) In some embodiments of A1-A13, the location relative to the HIPD 200 is based on the AR representation of the operational data. In other words, the HIPD 200 can determine a size, position, and orientation of the AR representation and select a location for displaying the AR representation. For example, when the user initiates or receives a video call, the HIPD 200 can attempt to cause a 1-to-1 representation of a video caller to be presented and determine a location relative to the HIPD 200 that allows for the representation of the video caller to be presented without being obstructed. Example changes to an AR representation are shown and described above in reference to FIGS. 1A-1D and 5A-9D.

(A15) In some embodiments of A1-A14, the location relative to the HIPD 200 is fixed such that the AR representation is anchored to the location relative to the HIPD 200. For example, a launch pad or control center UI 115 (FIG. 1A-1D) is presented over and anchored at a position above the HIPD 200 to allow the user to initiate one or more applications from the HIPD 200. In another example, an AR representation of the video call 910 (FIG. 9A) can be fixed at a location relative to the HIPD 200. Examples of locations relative to the HIPD 200 are shown and described above in reference to FIGS. 1A-1D and 5A-9D.

(A16) In some embodiments of A1-A15, the location relative to the HIPD 200 is a portion of the surface of the HIPD 200. For example, the location relative to the HIPD 200 can be any portion of the multi-touch input surface 202, a rear surface of the HIPD 200 (e.g., a second surface 204; FIG. 2A), a side surface 206, and/or any other surface of the HIPD 200 described above in FIGS. 2A-2E and 10A-11G.

(A17) In some embodiments of A16, the portion of the surface of the HIPD 200 is a touch input surface. For example, the portion of the surface of the HIPD 200 can be any portion of the multi-touch input surface 202, such as a first region 242 of the second touch-input surface 214, a first touch-input surface 212, a bottom surface region 245, and/or any other touch-input surfaces described above in reference to FIGS. 2A-2E and 11A-12F.

(A18) In some embodiments of A1-A17, the location relative to the HIPD 200 is, a non-zero, predetermined distance above a portion of the HIPD 200. This allows the AR representation to float or hover above the HIPD 200 when presented by the head-wearable device. Examples of locations relative to the HIPD 200 are shown and described above in reference to FIGS. 1A-1D and 5A-9D.

(A19) In some embodiments of A1-A18, the location relative to the HIPD 200 is a surface of the HIPD 200.

(A20) In some embodiments of A1-A19, the operational data includes one or more of image data, audio data, device information (e.g., a battery level, system volume, etc.), application data, media content, and message data.

(B1) In accordance with some embodiments, a system that includes one or more wrist wearable devices, an artificial-reality headset, and an HIPD, and the system is configured to perform operations corresponding to any of A1-A20.

(C1) In accordance with some embodiments, a non-transitory computer readable storage medium including instructions that, when executed by a computing device (e.g., the HIPD 200) in communication with an artificial-reality headset, cause the computer device to perform operations corresponding to any of A1-A20.

(D1) An intermediary device configured to coordinate operations of a head-wearable device and a wrist-wearable device, the intermediary device configured to convey information between the head-wearable device and the wrist-wearable device in conjunction with the method of any one of A1-A20.

In (E1) FIG. 19, the method 1900 for distributing tasks between the HIPD 200 and a communicatively coupled device, in accordance with some embodiments, is shown. The method 1900 is performed at the HIPD 200 while (1910) the HIPD 200 and a head-wearable device (e.g., AR device 2300, VR device 2310, and/or other communicatively coupled device with a display) are communicatively coupled and share operational data for performing one or more computational tasks. The method 1900 includes identifying (1920) one or more back-end tasks and one or more front-end tasks associated with performing the one or more computational tasks. The one or more back-end tasks can be one or more background processing tasks that are not perceived by a user, while the one or more front-end tasks are tasks that are perceptible by the user (such as presenting information to the user, providing feedback to the user, etc.). The method 1900 further includes causing (1930) performance of the one or more back-end tasks at the HIPD 200 including updating the operational data to create updated operational data. The updated operational data includes sensor data from the HIPD 200 indicating, at least, a position of the HIPD 200. The method 1900 also includes causing (1940) performance of the one or more front-end tasks at the head-wearable device using the updated operational data such that a representation based on the one or more computational tasks is presented to the user by the head-wearable device.

(E2) In some embodiments of E1, the method 1900 includes, while the HIPD 200 and a wrist-wearable device are communicatively coupled and share additional operational data for performing one or more additional computational tasks, identifying one or more additional back-end tasks and one or more additional front-end tasks associated with performing the one or more additional computational tasks. The method 1900 includes causing performance of the one or more additional back-end tasks at the HIPD 200 including updating the additional operational data to create updated additional operational data, and causing performance of the one or more additional front-end tasks at the wrist-wearable device and/or the head-wearable device based on the updated additional operational data such that a representation of the one or more additional computational tasks is presented to the user. For example, as described above in reference to FIGS. 1A-9D, one or more operations can be initiated at the HIPD 200 and/or any other communicatively coupled device and the HIPD 200 can work in conjunction with other communicatively coupled devices to coordinate, distribute, and/or cause the performance of one or more tasks.

(E3) In some embodiments of E2, the additional operational data includes neuromuscular signal data captured by the wrist-wearable device, the one or more additional computational tasks include hand gesture recognition, and the one or more additional back-end tasks include determining an in-air hand gesture performed by the user based on the neuromuscular signal data. The method 1900 includes, in response to a determination that the in-air hand gesture is associated with an input command, updating the additional operational data based on the input command, such that the updated additional operational data includes a representation of the input command associated with the in-air hand gesture. The method 1900 can further include causing performance of the one or more additional front-end tasks at the wrist-wearable device and/or head-wearable device based on the updated additional operational data such that a representation of the one or more additional computational tasks is presented to the user. As described herein, the HIPD 200 can be used to offload and/or handoff tasks from different communicatively coupled devices. Examples of the different communicatively coupled devices are described in reference to FIGS. 1A-1D and 21A-23C.

(E4) In some embodiments of E1-E3, the operational data includes image data captured by the head-wearable device, the one or more computational tasks include hand gesture recognition, and the one or more back-end tasks include determining an in-air hand gesture performed by the user based on the image data. The method 1900 includes, in response to a determination that the in-air hand gesture is associated with an input command, updating the operational data based on the input command, such that the updated operational data includes a representation of the input command associated with the in-air hand gesture.

(E5) In some embodiments of E4, the one or more back-end tasks include determining an in-air hand gesture performed by the user based on the image data and the neuromuscular signal data and, in response to a determination that the in-air hand gesture is associated with an input command, updating the operational data and/or the additional operational data based on the input command, such that the updated operational data and/or the updated additional operational data includes a representation of the input command associated with the in-air hand gesture.

(E6) In some embodiments of E3-E5, the method 1900 includes, in accordance with a determination that a user's hand is within a field of view of the head-wearable device, determining, by the one or more back-end tasks, the in-air hand gesture performed by the user based on the image data and, in response to the determination that the in-air hand gesture is associated with the input command, updating, by the one or more back-end tasks, the operational data based on the input command, such that the updated operational data includes the representation of the input command associated with the in-air hand gesture. The method 1900 further includes, in accordance with a determination that the user's hand is not within the field of view of the head-wearable device, determining, by the one or more back-end tasks, the in-air hand gesture performed by the user based on the neuromuscular signal data and, in response to the determination that the in-air hand gesture is associated with the input command, updating, by the one or more back-end tasks, the additional operational data based on the input command, such that the updated additional operational data includes the representation of the input command associated with the in-air hand gesture.

In some embodiments, the operational data is augmented or updated based on the sensor data of each of the communicatively coupled device. In some embodiments, the method 1900 include dynamically selecting a communicative coupled device for causing performance of the one or more front-end tasks. For example, when the HIPD 200 is communicatively coupled with a wrist-wearable device 2200 and an AR device 2300, the HIPD 200 can select wrist-wearable device 2200, the AR device, or both for causing the presentation of one or more front-end tasks, such as presenting audio data, presenting image data, operating an application, operating a component of the communicatively coupled devices (e.g., a microphone, a speaker, an imaging device, a sensor, etc.), etc. In some embodiments, the method 1900 selects a communicative coupled device for causing performance of the one or more front-end tasks based on the user input. For example, in accordance with a determination that the user initiated a video call, the HIPD 200 can cause the AR device 2300 to present an AR representation of the video call, and in accordance with a determination that the user initiated a fitness application, the HIPD 200 can cause the wrist-wearable device 2200 to track biometric data for the duration of the user's workout.

(E7) In some embodiments of E1-E6, the method 1900 includes, before the HIPD 200 and the head-wearable device are communicatively coupled, detecting, by the HIPD 200, that the head-wearable device within a proximity to the HIPD 200 and associated with the HIPD 200. The method 1900, in accordance with a determination that the head-wearable device is within the proximity to the HIPD 200 and associated with the HIPD 200, communicatively coupling the head-wearable device and the HIPD 200.

(E8) In some embodiments of E7, the proximity is twenty feet. In some embodiments, the proximity is determined based on a positional relationship determined by SLAM data.

(E9) In some embodiments of E7-E8, the detecting, by the HIPD 200, that the head-wearable device is within the proximity to the HIPD 200 and associated with the HIPD 200 is based on receiving, from the HIPD 200, a signal to communicatively couple with the head-wearable device within the proximity of the HIPD 200. In some embodiments, the HIPD 200 is continuously transmits a broadcasting signal to detect the presence of one or more communicatively coupled devices. Alternatively, un some embodiments, the HIPD 200 periodically (e.g., every 15 seconds, 30 seconds, 1 minute, 5 minutes, etc.) transmits a broadcasting signal to detect the presence of one or more communicatively coupled devices.

(E10) In some embodiments of E7-E9, the detecting, by the HIPD 200, that the head-wearable device is within the proximity to the HIPD 200 and associated with the HIPD 200 is based on receiving, from the head-wearable device, a signal to communicatively couple with the HIPD 200 within the proximity of the head-wearable device. In some embodiments, the HIPD 200 is configured to continuously receive and/or detect a signal from another communicatively coupled device to associate with one another.

(E11) In some embodiments of E1-E10, the identifying one or more back-end tasks and one or more front-end tasks associated with performing the one or more computational tasks includes one or more of detecting respective battery levels of the head-wearable device and the HIPD 200; detecting respective thermal levels of the head-wearable device and the HIPD 200; detecting respective time-of-completions for a task of the head-wearable device and the HIPD 200; and detecting respective available computational resources of the head-wearable device and the HIPD 200. The above detecting can be performed for each device communicatively coupled with the HIPD 200.

(E12) In some embodiments of E1-E11, the one or more back-end tasks includes generating and/or processing one or more of image data, audio data, and haptic data based on the operational data, and the one or more front end tasks includes presenting a representation of one or more of image data, audio data, and haptic data based on the operational data.

(E13) In some embodiments of E12, the generating image data, based on the operational data, includes upsampling image data included in the operational data.

(E14) In some embodiments of E12-E13, the generating image data, based on the operational data, includes generating an artificial reality (AR) representation of the image data.

(E15) In some embodiments of E12-E14, the generating audio data, based on the operational data, includes music, alerts, alarms, etc.

(E16) In some embodiments of E12-E15, the generating haptic data, based on the operational data, includes alerts, notifications, urgency, semantic contextual haptics.

(E17) In some embodiments of E12-E16, the method 1900 includes identifying additional front-end tasks associated with performing the one or more computational tasks, and causing performance of the additional front-end tasks at the HIPD 200 using the updated operational data such that an additional representation based on the one or more computational tasks is presented to the user by the HIPD 200.

(E18) In some embodiments of E1-E17, the sensor data from the HIPD 200 indicating the position of the HIPD 200 is simultaneous localization and mapping (SLAM) data.

(E19) In some embodiments of E1-E18, the HIPD 200 is communicatively coupled to at least one of a tablet, a smartphone, a computer, a visual display, and a gaming system.

(E20) In some embodiments, the user inputs are based on a relationship between at least two devices (e.g., the HIPD 200 and/or any other communicatively coupled devices). For example, when a swipe gesture is performed on the HIPD 200, the swipe gesture (or any other user input) is based on a position of the HIPD 200 (e.g., portrait, landscape, in the user's hand, on a table, etc.) and/or a portion on a surface of the HIPD 200 (e.g., a multi-touch input surface 202) on which the user provides the swipe gesture (or any other user input), the HIPD 200 can cause a communicatively coupled device to present an AR representation at or near the HIPD 200 and/or at a location relative to the HIPD 200.

(F1) In accordance with some embodiments, a system that includes one or more wrist wearable devices, an artificial-reality headset, and an HIPD, and the system is configured to perform operations corresponding to any of E1-E20.

(G1) In accordance with some embodiments, a non-transitory computer readable storage medium including instructions that, when executed by a computing device (e.g., the HIPD 200) in communication with an artificial-reality headset, cause the computer device to perform operations corresponding to any of E1-E20.

(H1) An intermediary device configured to coordinate operations of a head-wearable device and a wrist-wearable device, the intermediary device configured to convey information between the head-wearable device and the wrist-wearable device in conjunction with the method of any one of E1-E20.

A skilled artisan, upon reading the descriptions provided herein, would understand that while head-wearable devices are used as primary illustrated examples, the novel techniques apply generally to other ocularly-coupled devices, including AR devices 2300, VR devices 2310, smart contact lenses, etc.

Figure 20:
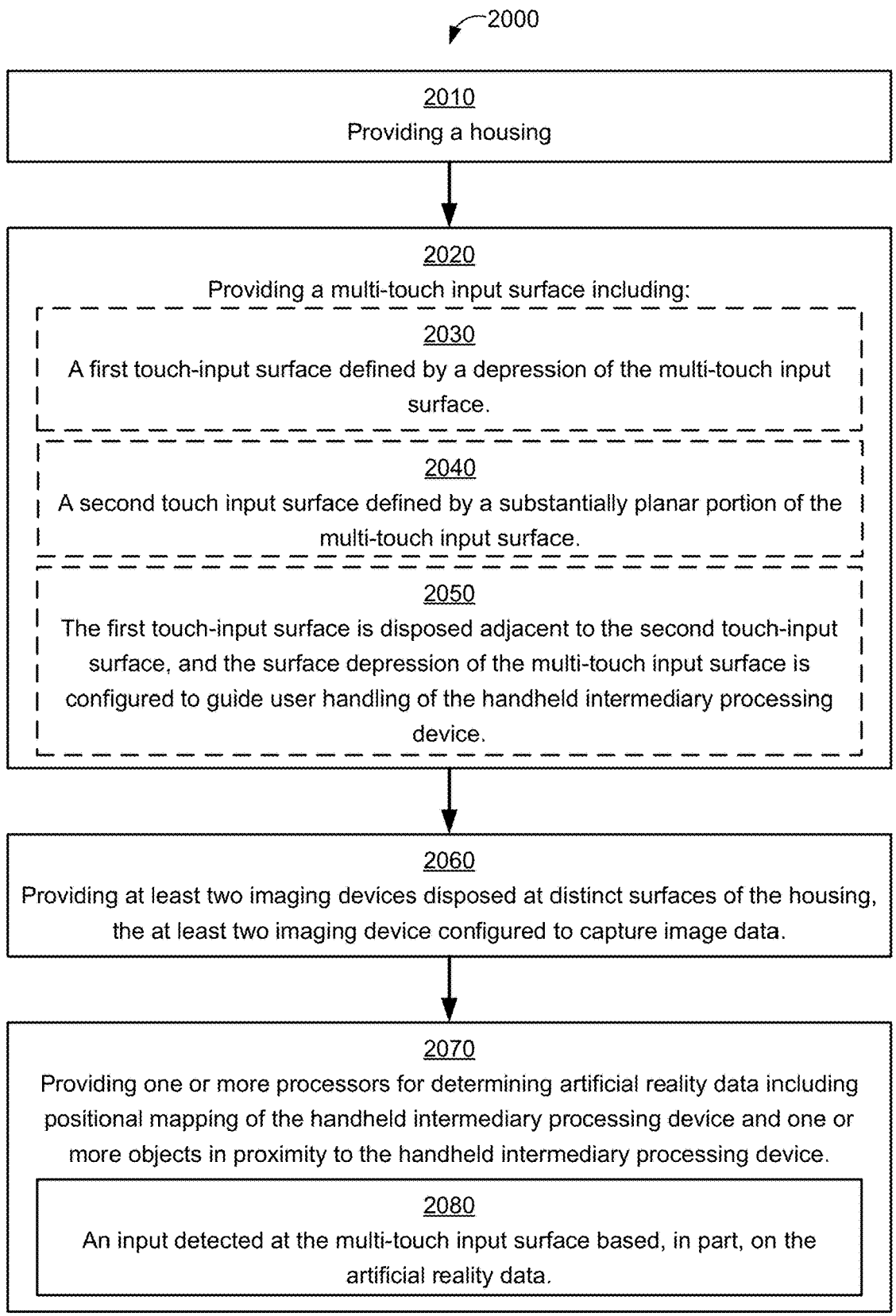
FIG. 20 illustrates a method of forming a handheld intermediary processing device, in accordance with some embodiments.

(I1) FIG. 20 illustrates a method of forming a handheld intermediary processing device, in accordance with some embodiments. Operations (e.g., steps) of the method 2000 can be performed to form an HIPD in accordance with the embodiments described above in reference to FIGS. 1A-19. In some embodiments, the various operations of the method 2000 described herein are interchangeable and/or optional.

The method 2000 forms an HIPD configured to communicatively couple with a head-wearable device (or another communicatively coupled device). The method 2000 includes providing (2010) a housing. The method 2000 includes providing (2020) a multi-touch input surface (e.g., multi-touch input surface 202; FIGS. 1A-17D). In some embodiments, the multi-touch input surface includes (2030) a first touch-input surface defined by a surface depression on the multi-touch input surface. The multi-touch input surface can also include (2040) a second touch input surface defined by a substantially planar portion of the multi-touch input surface. In some embodiments, the first touch-input surface is disposed (2050) adjacent to the second touch-input surface, and the surface depression of the multi-touch input surface is configured to guide user handling of the HIPD 200. The method 2000 also includes providing (2060) at least two imaging devices disposed at distinct surfaces of the housing, the at least two imaging device configured to capture image data. The method 2000 further includes providing (2070) providing one or more processors for determining artificial reality data including positional mapping of the HIPD 200 and one or more objects in proximity to the HIPD 200. In some embodiments, inputs detected at the multi-touch input surface are based (2080), in part, on the artificial reality data.

(I2) In some embodiments of I1, the positional mapping of the HIPD 200 includes six degrees of freedom. For example, the positional mapping data can include coordinates in the x-axis, the y-axis, the z-axis, roll, yaw, and/or pitch. In some embodiments, the at least two imaging devices capture simultaneous localization and mapping (SLAM) data.

(I3) In some embodiments of I1-I2, the HIPD 200 does include a graphic display.

(I4) In some embodiments of I1-I3, the surface depression of the multi-touch input surface is a substantially circular depression.

(I5) In some embodiments of I1-I4, the first touch-input surface and the second touch-input surface are part of a plurality of touch-input regions. In some embodiments, the first touch-input surface and the second touch-input surface can each include one or more touch-input regions. In some embodiments, at least one region of the plurality of touch-input regions s substantially circular. Alternatively, or in addition, in some embodiments, at least one region of the plurality of touch-input regions is defined by at least one depression on the substantially planar portion of the multi-touch input surface. In some embodiments, at least one region of the plurality of touch-input regions is defined by at least one protrusion on the substantially planar portion of the multi-touch input surface.

(I6) In some embodiments of I1-I5, the surface depression of the multi-touch input surface is configured to guide user handling of the HIPD 200 such that a user's palm is adjacent to the second touch-input surface.

(I7) In some embodiments of I1-I6, the housing further including at least one haptic generator.

(I8) In some embodiments of I1-I7, the housing further including a surface adjacent to the multi-touch input surface, the surface adjacent to the multi-touch input surface including at least one other imaging device distinct from the at least two imaging devices imaging devices for capturing image data, and at least one sensor. For example, as described above in reference to FIG. 2A, the HIPD 200 includes a side surface 206. The surface adjacent to the multi-touch input surface can include an edge camera and/or a side Stereo RGB camera. The side surface 206 can include a light emitting device, such as a status LED (e.g., LED 236), a depth sensor (e.g., a depth projector 234 and/or a depth receiver 239), and an ambient light sensor 235.

(I9) In some embodiments of I8, the surface adjacent to the multi-touch input surface is at a predetermined, non-perpendicular angle to the multi-touch input surface. For example, the side surface 206 can be configured such that at least one imaging device is at at least 26 degrees.

(I10) In some embodiments of I9, the surface adjacent to the multi-touch input surface further includes a light emitting device indicating that the at least one imaging device is capturing the image data. For example, the light emitting device can be a privacy indicator illuminated when an imaging device is active.

(I11) In some embodiments of I1-I10, the housing including a second surface, opposite of the multi-touch input surface, the second surface including at least one other imaging device distinct from the at least two imaging devices for capturing image data and at least one sensor.

(I12) In some embodiments of I11, at least a portion of the second surface is magnetic. At least a portion of the second surface can be configured to magnetically couple to a magnetic stand. In some embodiments, at least one of the first portion and the second portion is magnetic.

(I13) In some embodiments of I11-I12, the second surface includes at least one elastomer protrusion (e.g., elastomer protrusion 222; FIG. 2A) to support the HIPD 200 in an upright position. In some embodiments, on the edge portion of the HIPD 200 can include one or more elastomer protrusions 222.

(I14) In some embodiments of I11-I13, the second surface includes a stand for the device which folds out such that the stand supports the HIPD 200 in an upright position when in a folded-out or extended position. In some embodiments, the stand is in-plane with the second surface when in a folded-in position.

(I15) In some embodiments of I11-I14, the second surface further includes a button and the HIPD is further configured to, in response to a detection of a user input at the button (e.g., physical button 226; FIG. 2A), cause the HIPD 200 to turn on and off, initiate a communicatively coupling process (e.g., a Bluetooth synchronization process), and reset the HIPD 200.

(I16) In some embodiments of I1-I15, the at least one sensor includes a depth sensor, a time-of-flight sensor, and an ambient light sensor. In some embodiments, the at least one sensor includes a rear Indirect Time of Flight (iToF), and/or a rear stereo RGB cameras.

(I17) In some embodiments of I1-I16, the housing further includes at least one USB-C type charging port.

(I18) In some embodiments of I17, the at least one USB-C type charging port is configured to support the HIPD 200 in an upright position when coupled with a charging stand.

(I19) In some embodiments of I1-I18, the HIPD 200 further includes at least one wireless charging receiver (e.g., to receive wireless power for powering and/or charging the HIPD 200).

(I20) In some embodiments of I1-I19, the housing further includes a bezel configured to receive a bezel stand for the HIPD 200. In some embodiments, the bezel is recessed in the second portion configured to receive a stand for the HIPD 200.

(I21) In some embodiments of I1-I20, the HIPD 200 further includes one or more sensors including at least one of an inertial measurement unit, a magnetometer, and an altimeter.

(I22) In some embodiments of I1-I21, the multi-touch input surface further includes a light indicating that the HIPD 200 is on.

The method 2000 can be used to form an HIPD 200 in accordance with any embodiment described above in reference to FIGS. 1A-17D.

(J1) A means for performing or causing the performance of any one of A1-A20 and/or E1-E20. The means can include software algorithms (e.g., algorithms implementing the flowcharts that are described below) performed on general-purpose hardware and/or application-specific integrated circuits configured to perform the algorithms described herein (e.g., algorithms implementing the flowcharts that are described above).

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU), microcontroller unit (MCU), etc.), is an electronic component that is responsible for executing instructions and controlling the operation of an electronic device (e.g., a wrist-wearable device 2200, a head-wearable device, an HIPD 200, a smart textile-based garment (not shown), or other computer system). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes and can include a hardware module and/or a software module.

As described herein, memory refers to electronic components in a computer or electronic device that store data and instructions for the processor to access and manipulate. The devices described herein can include volatile and non-volatile memory. Examples of memory can include: (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware, and/or boot loaders); (iii) flash memory, magnetic disk storage devices, optical disk storage devices, other non-volatile solid state storage devices, which can be configured to store data in electronic devices (e.g., USB drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, JSON data, etc.). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include: (i) universal serial bus (USB) and/or micro-USB interfaces configured for connecting devices to an electronic device; (ii) bluetooth interfaces configured to allow devices to communicate with each other, including bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) WiFi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; (vii) light sensors (e.g., time-of-flight sensors, infrared light sensors, visible light sensors, etc.), and/or sensor for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiogramar EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; (iii) messaging applications; (iv) media-streaming applications; (v) financial applications; (vi) calendars; (vii) clocks; (viii) web-browsers; (ix) social media applications, (x) camera applications, (xi) web-based applications; (xii) health applications; (xiii) artificial reality applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

As described herein, a graphics module is a component or software module that is designed to handle graphical operations and/or processes and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified.

Example AR Systems

Figure 21A:
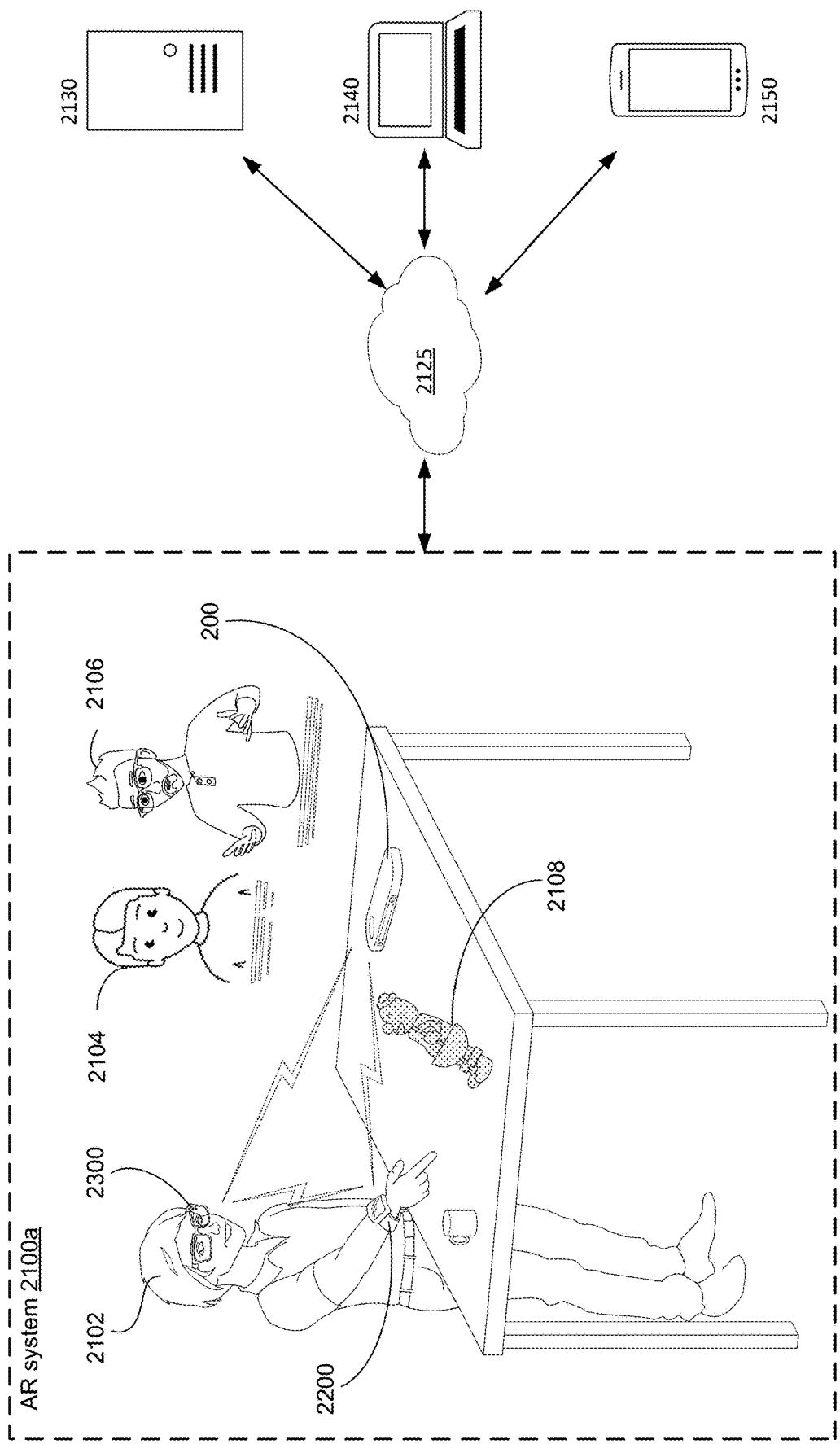
Figures 1, 21B:
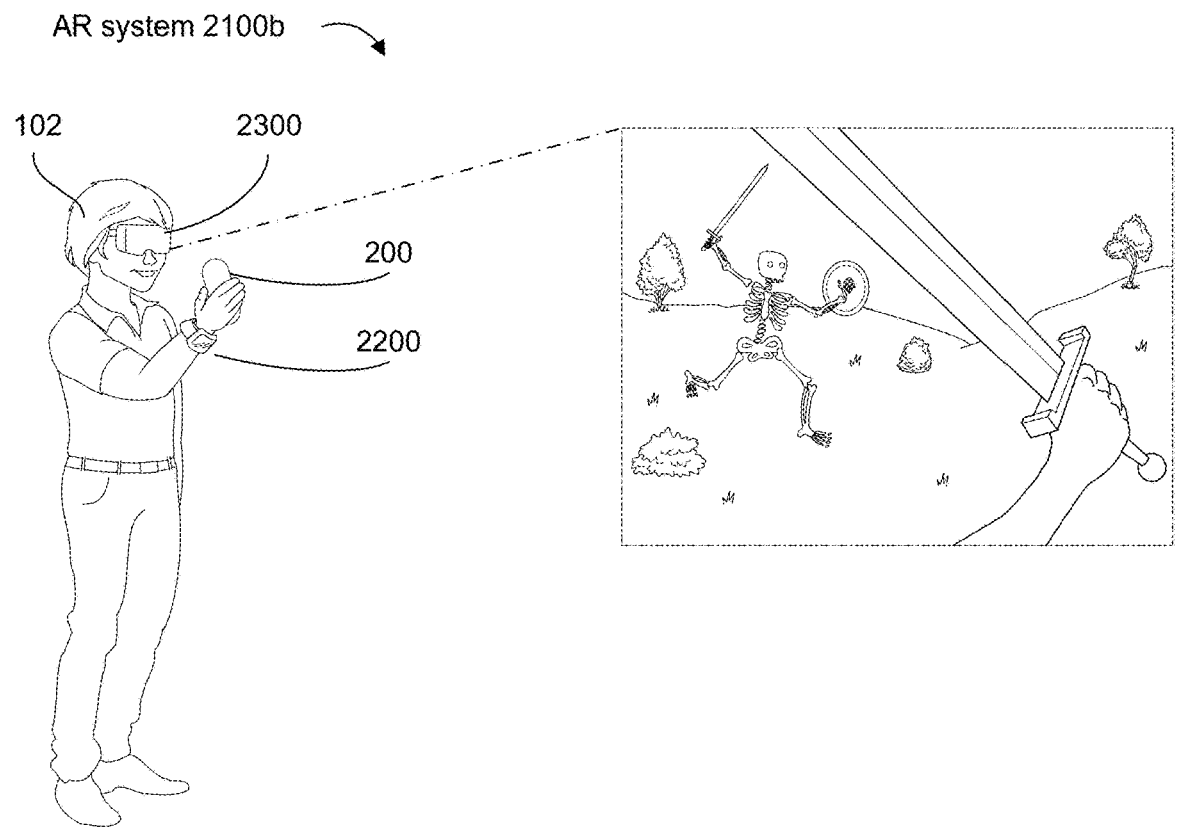
Figures 2, 21B:
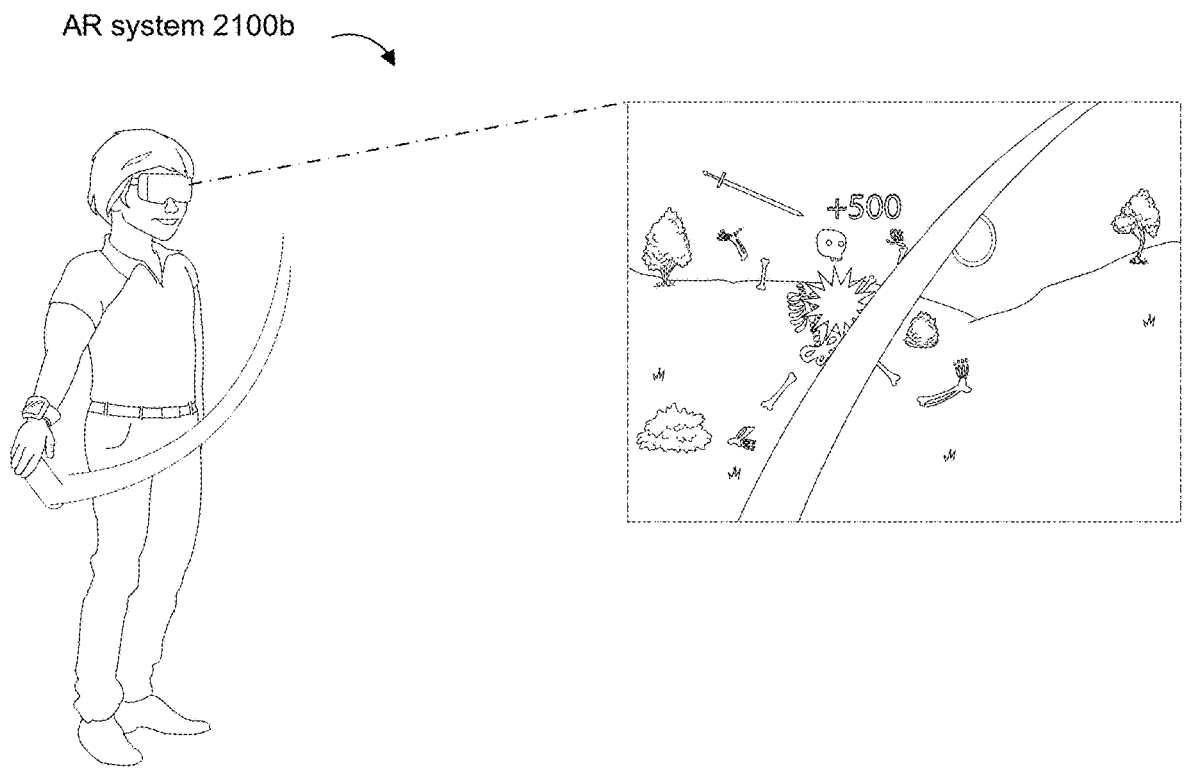

FIGS. 21A-21B-2 illustrate example artificial-reality systems, in accordance with some embodiments. FIG. 21A shows a first AR system 2100a and first example user interactions using a wrist-wearable device 2200, a head-wearable device (e.g., AR device 2300), and/or a handheld intermediary processing device (HIPD) 200. FIGS. 21B-1 and 21B-2 show a second AR system 2100b and second example user interactions using a wrist-wearable device 2200, a head-wearable device (e.g., VR device 2310), and/or an HIPD 200. As the skilled artisan will appreciate upon reading the descriptions provided herein, the above-example AR systems (described in detail below) can perform various functions and/or operations described above with reference to FIGS. 1A-20.

The wrist-wearable device 2200 and one or more of its components are described below in reference to FIGS. 22A-22B; the head-wearable devices and their one or more components are described below in reference to FIGS. 23A-23D; and the HIPD 200 and its one or more components are described below in reference to FIGS. 2A-2B. The wrist-wearable device 2200, the head-wearable devices, and/or the HIPD 200 can communicatively couple via a network 2125 (e.g., cellular, near field, Wi-Fi, personal area network, wireless LAN, etc.). Additionally, the wrist-wearable device 2200, the head-wearable devices, and/or the HIPD 200 can also communicatively couple with one or more servers 2130, computers 2140 (e.g., laptops, computers, etc.), mobile devices 2150 (e.g., smartphones, tablets, etc.), and/or other electronic devices via the network 2125 (e.g., cellular, near field, Wi-Fi, personal area network, wireless LAN, etc.)

Turning to FIG. 21A, a user 2102 is shown wearing the wrist-wearable device 2200 and the AR device 2300 and having the HIPD 200 on their desk. The wrist-wearable device 2200, the AR device 2300, and the HIPD 200 facilitate user interaction with an AR environment. In particular, as shown by the first AR system 2100a, the wrist-wearable device 2200, the AR device 2300, and/or the HIPD 200 cause presentation of one or more avatars 2104, digital representations of contacts 2106, and virtual objects 2108. As discussed below, the user 2102 can interact with the one or more avatars 2104, digital representations of the contacts 2106, and virtual objects 2108 via the wrist-wearable device 2200, the AR device 2300, and/or the HIPD 200.

The user 2102 can use any of the wrist-wearable device 2200, the AR device 2300, and/or the HIPD 200 to provide user inputs. For example, the user 2102 can perform one or more hand gestures that are detected by the wrist-wearable device 2200 (e.g., using one or more EMG sensors and/or IMUs, described below in reference to FIGS. 22A-22B) and/or AR device 2300 (e.g., using one or more image sensor or camera, described below in reference to FIGS. 23A-23B) to provide a user input. Alternatively, or additionally, the user 2102 can provide a user input via one or more touch surfaces of the wrist-wearable device 2200, the AR device 2300, and/or the HIPD 200, and/or voice commands captured by a microphone of the wrist-wearable device 2200, the AR device 2300, and/or the HIPD 200. In some embodiments, the wrist-wearable device 2200, the AR device 2300, and/or the HIPD 200 include a digital assistant to help the user in providing a user input (e.g., completing a sequence of operations, suggesting different operations or commands, providing reminders, confirming a command, etc.). In some embodiments, the user 2102 can provide a user input via one or more facial gestures and/or facial expressions. For example, cameras of the wrist-wearable device 2200, the AR device 2300, and/or the HIPD 200 can track the user 2102's eyes for navigating a user interface.

The wrist-wearable device 2200, the AR device 2300, and/or the HIPD 200 can operate alone or in conjunction to allow the user 2102 to interact with the AR environment. In some embodiments, the HIPD 200 is configured to operate as a central hub or control center for the wrist-wearable device 2200, the AR device 2300, and/or another communicatively coupled device. For example, the user 2102 can provide an input to interact with the AR environment at any of the wrist-wearable device 2200, the AR device 2300, and/or the HIPD 200, and the HIPD 200 can identify one or more back-end and front-end tasks to cause the performance of the requested interaction and distribute instructions to cause the performance of the one or more back-end and front-end tasks at the wrist-wearable device 2200, the AR device 2300, and/or the HIPD 200. In some embodiments, a back-end task is background processing task that is not perceptible by the user (e.g., rendering content, decompression, compression, etc.), and a front-end task is a user-facing task that is perceptible to the user (e.g., presenting information to the user, providing feedback to the user, etc.)). As described below in reference to FIGS. 2A-2B, the HIPD 200 can perform the back-end tasks and provide the wrist-wearable device 2200 and/or the AR device 2300 operational data corresponding to the performed back-end tasks such that the wrist-wearable device 2200 and/or the AR device 2300 can perform the front-end tasks. In this way, the HIPD 200, which has more computational resources and greater thermal headroom than the wrist-wearable device 2200 and/or the AR device 2300, performs computationally intensive tasks and reduces the computer resource utilization and/or power usage of the wrist-wearable device 2200 and/or the AR device 2300.

In the example shown by the first AR system 2100a, the HIPD 200 identifies one or more back-end tasks and front-end tasks associated with a user request to initiate an AR video call with one or more other users (represented by the avatar 2104 and the digital representation of the contact 2106) and distributes instructions to cause the performance of the one or more back-end tasks and front-end tasks. In particular, the HIPD 200 performs back-end tasks for processing and/or rendering image data (and other data) associated with the AR video call and provides operational data associated with the performed back-end tasks to the AR device 2300 such that the AR device 2300 perform front-end tasks for presenting the AR video call (e.g., presenting the avatar 2104 and the digital representation of the contact 2106).

In some embodiments, the HIPD 200 can operate as a focal or anchor point for causing the presentation of information. This allows the user 2102 to be generally aware of where information is presented. For example, as shown in the first AR system 2100a, the avatar 2104 and the digital representation of the contact 2106 are presented above the HIPD 200. In particular, the HIPD 200 and the AR device 2300 operate in conjunction to determine a location for presenting the avatar 2104 and the digital representation of the contact 2106. In some embodiments, information can be presented a predetermined distance from the HIPD 200 (e.g., within 5 meters). For example, as shown in the first AR system 2100a, virtual object 2108 is presented on the desk some distance from the HIPD 200. Similar to the above example, the HIPD 200 and the AR device 2300 can operate in conjunction to determine a location for presenting the virtual object 2108. Alternatively, in some embodiments, presentation of information is not bound by the HIPD 200. More specifically, the avatar 2104, the digital representation of the contact 2106, and the virtual object 2108 do not have to be presented within a predetermined distance of the HIPD 200.

User inputs provided at the wrist-wearable device 2200, the AR device 2300, and/or the HIPD 200 are coordinated such that the user can use any device to initiate, continue, and/or complete an operation. For example, the user 2102 can provide a user input to the AR device 2300 to cause the AR device 2300 to present the virtual object 2108 and, while the virtual object 2108 is presented by the AR device 2300, the user 2102 can provide one or more hand gestures via the wrist-wearable device 2200 to interact and/or manipulate the virtual object 2108.

Turning to FIGS. 21B-1 and 21B-2, the user 2102 is shown wearing the wrist-wearable device 2200 and a VR device 2310 and holding the HIPD 200. In the second AR system 2100b, the wrist-wearable device 2200, the VR device 2310, and/or the HIPD 200 are used to interact within an AR environment, such as a VR game or other AR application. While the VR device 2310 present a representation of a VR game (e.g., first AR game environment 2120) to the user 2102, the wrist-wearable device 2200, the VR device 2310, and/or the HIPD 200 detect and coordinate one or more user inputs to allow the user 2102 to interact with the VR game.

In some embodiments, the user 2102 can provide a user input via the wrist-wearable device 2200, the VR device 2310, and/or the HIPD 200 that causes an action in a corresponding AR environment. For example, the user 2102 in the second AR system 2100b (shown in FIG. 21B-1) raises the HIPD 200 to prepare for a swing in the first AR game environment 2120. The VR device 2310, responsive to the user 2102 raising the HIPD 200, causes the AR representation of the user 2122 to perform a similar action (e.g., raise a virtual object, such as a virtual sword 2124). In some embodiments, each device uses respective sensor data and/or image data to detect the user input and provide an accurate representation of the user 2102's motion. For example, imaging sensors 254 (e.g., SLAM cameras or other cameras discussed below in FIGS. 2A and 2B) of the HIPD 200 can be used to detect a position of the 200 relative to the user 2102's body such that the virtual object can be positioned appropriately within the first AR game environment 2120; sensor data from the wrist-wearable device 2200 can be used to detect a velocity at which the user 2102 raises the HIPD 200 such that the AR representation of the user 2122 and the virtual sword 2124 are synchronized with the user 2102's movements; and image sensors 2326 (FIGS. 23A-23C) of the VR device 2310 can be used to represent the user 2102's body, boundary conditions, or real-world objects within the first AR game environment 2120.

In FIG. 21B-2, the user 2102 performs a downward swing while holding the HIPD 200. The user 2102's downward swing is detected by the wrist-wearable device 2200, the VR device 2310, and/or the HIPD 200 and a corresponding action is performed in the first AR game environment 2120. In some embodiments, the data captured by each device is used to improve the user's experience within the AR environment. For example, sensor data of the wrist-wearable device 2200 can be used to determine a speed and/or force at which the downward swing is performed and image sensors of the HIPD 200 and/or the VR device 2310 can be used to determine a location of the swing and how it should be represented in the first AR game environment 2120, which, in turn, can be used as inputs for the AR environment (e.g., game mechanics, which can use detected speed, force, locations, and/or aspects of the user 2102's actions to classify a user's inputs (e.g., user performs a light strike, hard strike, critical strike, glancing strike, miss, etc.) or calculate an output (e.g., amount of damage)).

While the wrist-wearable device 2200, the VR device 2310, and/or the HIPD 200 are described as detecting user inputs, in some embodiments, user inputs are detected at a single device (with the single device being responsible for distributing signals to the other devices for performing the user input). For example, the HIPD 200 can operate an application for generating the first AR game environment 2120 and provide the VR device 2310 with corresponding data for causing the presentation of the first AR game environment 2120, as well as detect the 2102's movements (while holding the HIPD 200) to cause the performance of corresponding actions within the first AR game environment 2120. Additionally or alternatively, in some embodiments, operational data (e.g., sensor data, image data, application data, device data, and/or other data) of one or more devices is provide to a single device (e.g., the HIPD 200) to process the operational data and cause respective devices to perform an action associated with processed operational data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

Integration of Artificial Intelligence with AR Systems

In some embodiments, an interaction in which an artificially intelligent virtual assistant can assist in requests made by a user 2102. The AI virtual assistant can be used to complete open-ended requests made through natural language inputs by a user 2102. For example, in FIG. 21A the user 2102 makes an audible request to summarize the conversation and then share the summarized conversation with others in the meeting. In addition, the AI virtual assistant is configured to use sensors of the AR system (e.g., cameras of an AR headset, microphones, and various other sensors of any of the devices in the system) to provide contextual prompts to the user for initiating tasks.

In some embodiments, an example neural network used in Artificial Intelligence applications. Uses of Artificial Intelligence (AI) are varied and encompass many different aspects of the devices and systems described herein. AI capabilities cover a diverse range of applications and deepen interactions between the user 2102 and user devices (e.g., the AR device 2300, the HIPD 200, the wrist-wearable device 2200, etc.). The AI discussed herein can be derived using many different training techniques. While the primary AI model example discussed herein is a neural network, other AI models can be used. Non-limiting examples of AI models include artificial neural networks (ANNs), deep neural networks (DNNs), convolution neural networks (CNNs), recurrent neural networks (RNNs), large language models (LLMs), long short-term memory networks, transformer models, decision trees, random forests, support vector machines, k-nearest neighbors, genetic algorithms, Markov models, Bayesian networks, fuzzy logic systems, and deep reinforcement learnings, etc. The AI models can be implemented at one or more of the user devices, and/or any other devices described herein. For devices and systems herein that employ multiple AI models, different models can be used depending on the task. For example, for a natural-language artificially intelligent virtual assistant, an LLM can be used and for the object detection of a physical environment, a DNN can be used instead.

In another example, an AI virtual assistant can include many different AI models and based on the user's request, multiple AI models may be employed (concurrently, sequentially or a combination thereof). For example, an LLM-based AI model can provide instructions for helping a user follow a recipe and the instructions can be based in part on another A1 model that is derived from an ANN, a DNN, an RNN, etc. that is capable of discerning what part of the recipe the user is on (e.g., object and scene detection).

As AI training models evolve, the operations and experiences described herein could potentially be performed with different models other than those listed above, and a person skilled in the art would understand that the list above is non-limiting.

A user 2102 can interact with an AI model through natural language inputs captured by a voice sensor, text inputs, or any other input modality that accepts natural language and/or a corresponding voice sensor module. In another instance, input is provided by tracking the eye gaze of a user 2102 via a gaze tracker module. Additionally, the AI model can also receive inputs beyond those supplied by a user 2102. For example, the AI can generate its response further based on environmental inputs (e.g., temperature data, image data, video data, ambient light data, audio data, GPS location data, inertial measurement (i.e., user motion) data, pattern recognition data, magnetometer data, depth data, pressure data, force data, neuromuscular data, heart rate data, temperature data, sleep data) captured in response to a user request by various types of sensors and/or their corresponding sensor modules. The sensors' data can be retrieved entirely from a single device (e.g., AR device 2300) or from multiple devices that are in communication with each other (e.g., a system that includes at least two of an AR device 2300, the HIPD 200, the wrist-wearable device 2200, etc.). The AI model can also access additional information (e.g., one or more servers 2130, the computers 2140, the mobile devices 2150, and/or other electronic devices) via a network 2125.

A non-limiting list of AI-enhanced functions includes but is not limited to image recognition, speech recognition (e.g., automatic speech recognition), text recognition (e.g., scene text recognition), pattern recognition, natural language processing and understanding, classification, regression, clustering, anomaly detection, sequence generation, content generation, and optimization. In some embodiments, AI-enhanced functions are fully or partially executed on cloud-computing platforms communicatively coupled to the user devices (e.g., the AR device 2300, the HIPD 200, the wrist-wearable device 2300) via the one or more networks. The cloud-computing platforms provide scalable computing resources, distributed computing, managed AI services, interference acceleration, pre-trained models, APIs and/or other resources to support comprehensive computations required by the AI-enhanced function.

Example outputs stemming from the use of an AI model can include natural language responses, mathematical calculations, charts displaying information, audio, images, videos, texts, summaries of meetings, predictive operations based on environmental factors, classifications, pattern recognitions, recommendations, assessments, or other operations. In some embodiments, the generated outputs are stored on local memories of the user devices (e.g., the AR device 2300, the HIPD 200, the wrist-wearable device 2200), storage options of the external devices (servers, computers, mobile devices, etc.), and/or storage options of the cloud-computing platforms.

The AI-based outputs can be presented across different modalities (e.g., audio-based, visual-based, haptic-based, and any combination thereof) and across different devices of the XR system described herein. Some visual-based outputs can include the displaying of information on XR augments of an XR headset, user interfaces displayed at a wrist-wearable device, laptop device, mobile device, etc. On devices with or without displays (e.g., HIPD 200), haptic feedback can provide information to the user 2102. An AI model can also use the inputs described above to determine the appropriate modality and device(s) to present content to the user (e.g., a user walking on a busy road can be presented with an audio output instead of a visual output to avoid distracting the user 2102).

Example Wrist-Wearable Devices

Figure 22A:
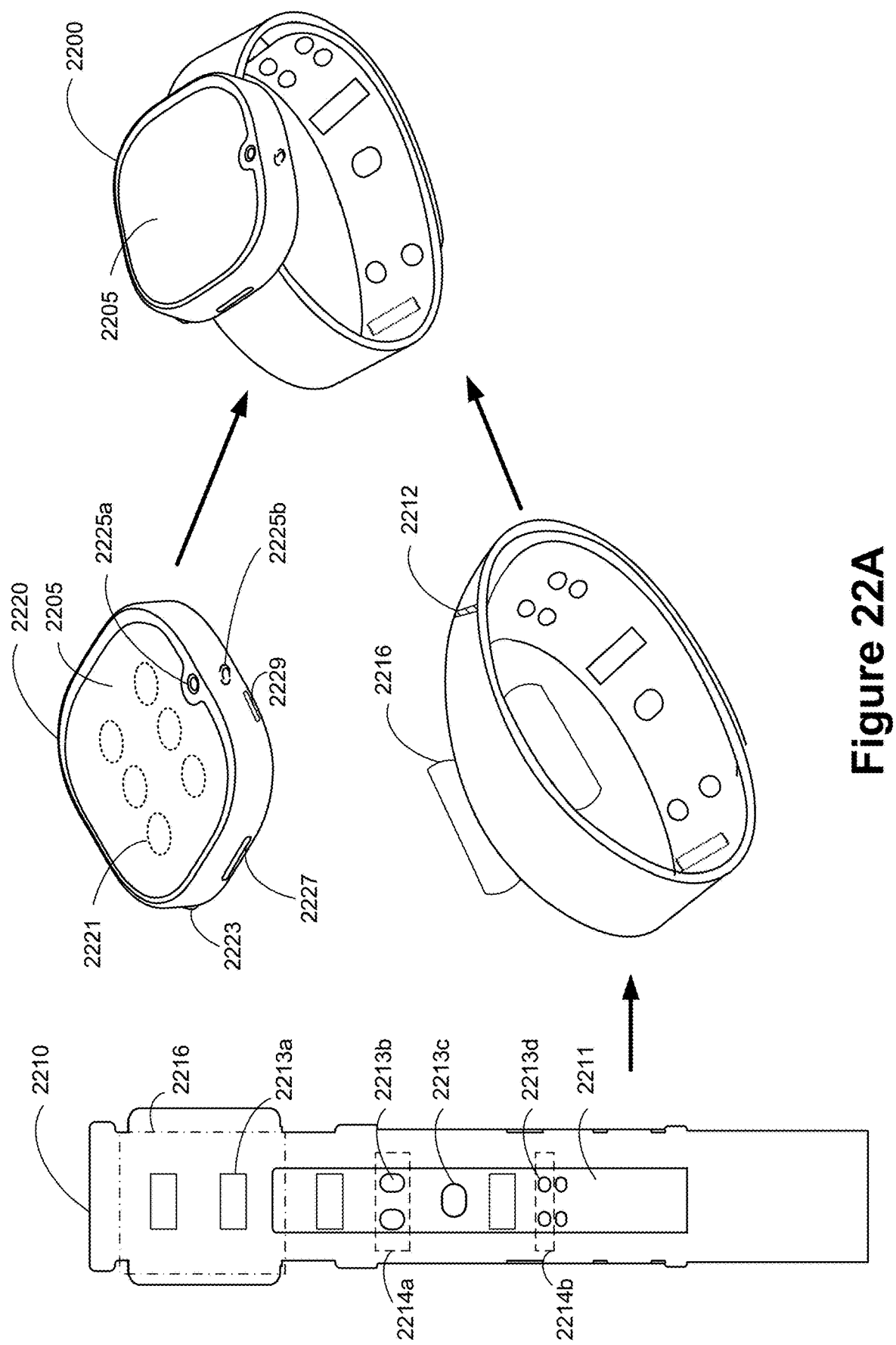
FIGS. 22A and 22B illustrate an example wrist-wearable device 2200, in accordance with some embodiments.
Figure 22B:
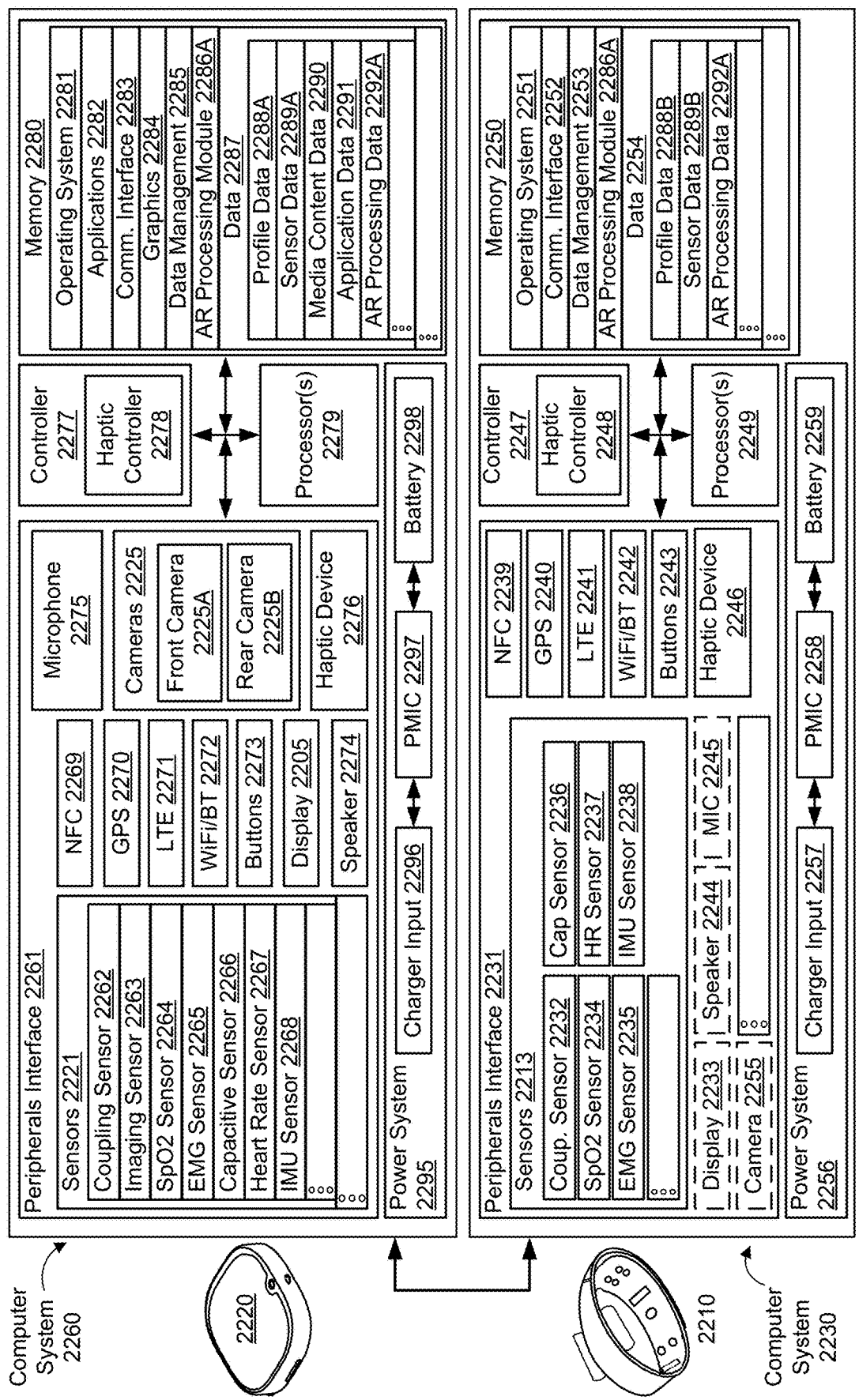
Figure 23A:
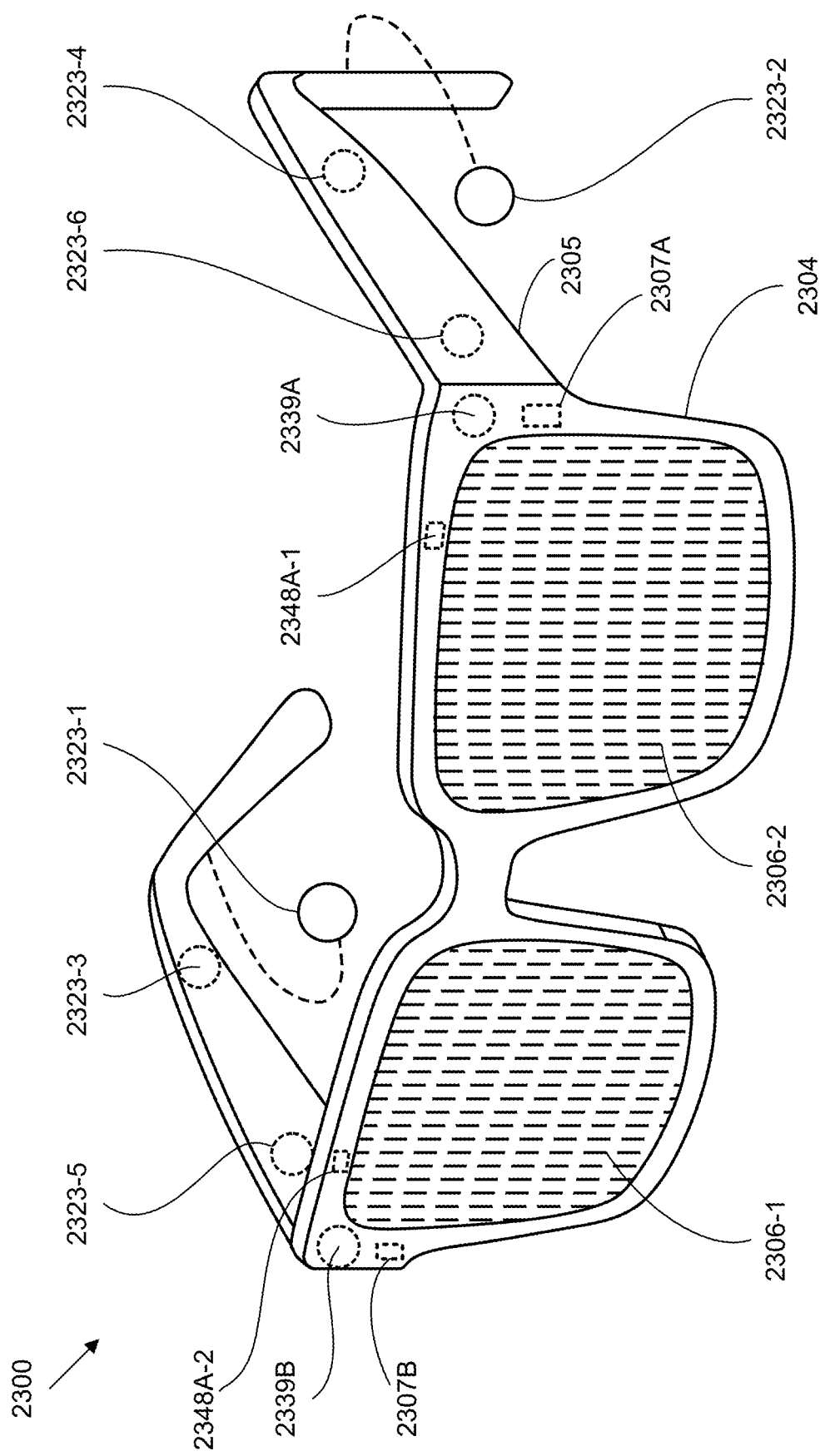
FIGS. 23A-23C show example head-wearable devices, in accordance with some embodiments.
Figures 1, 23B:
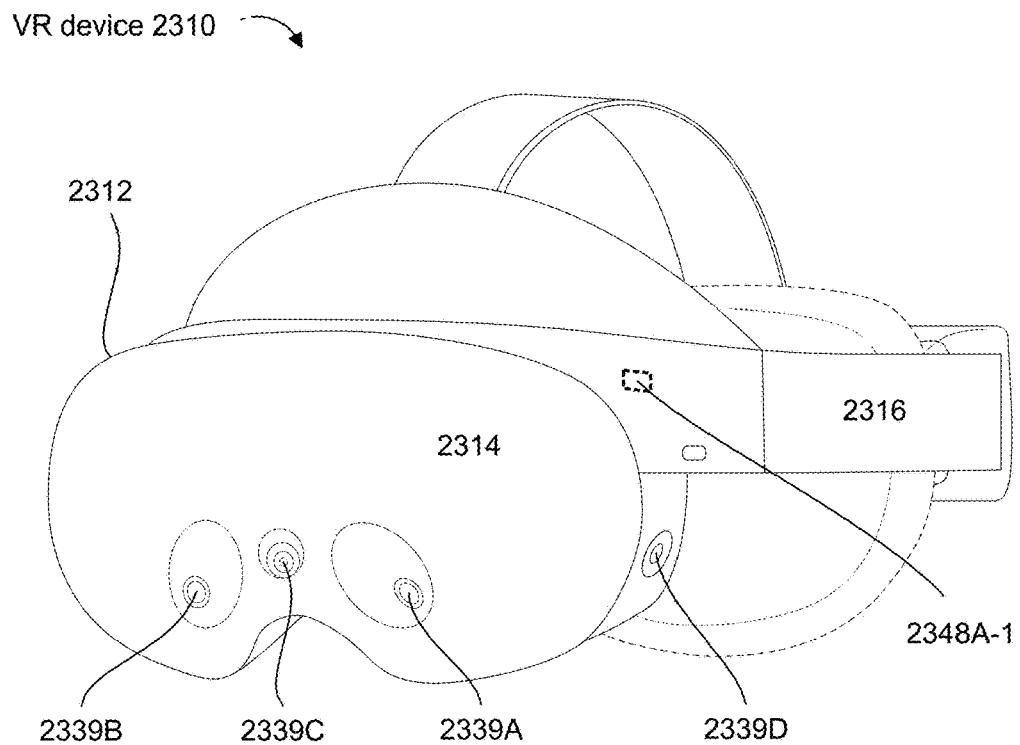
Figures 2, 23B:
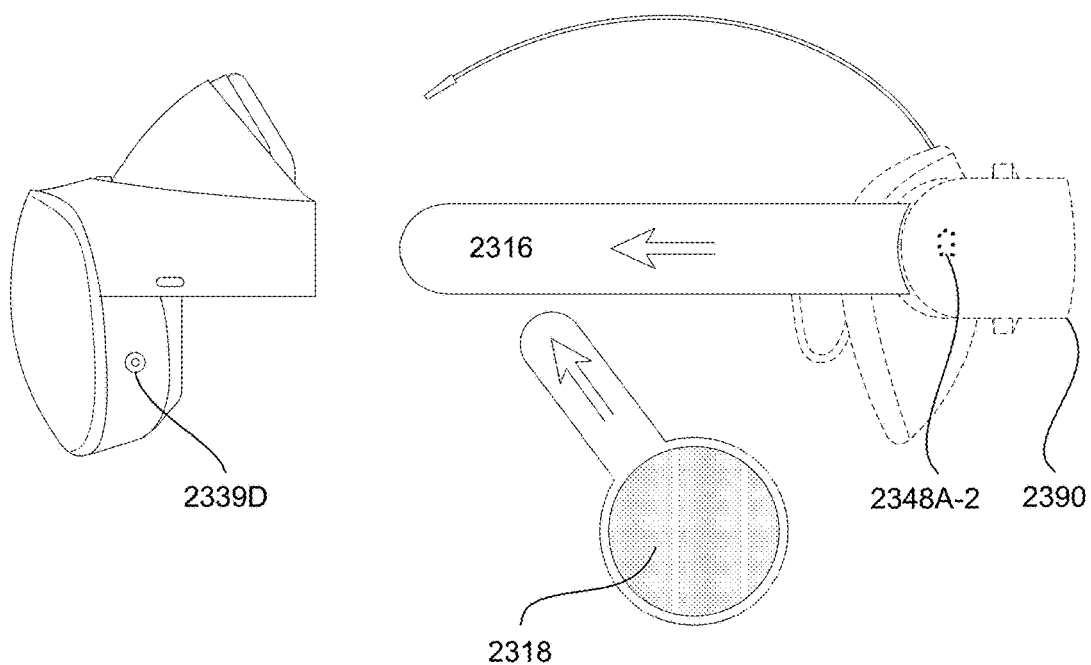
Figure 23C:
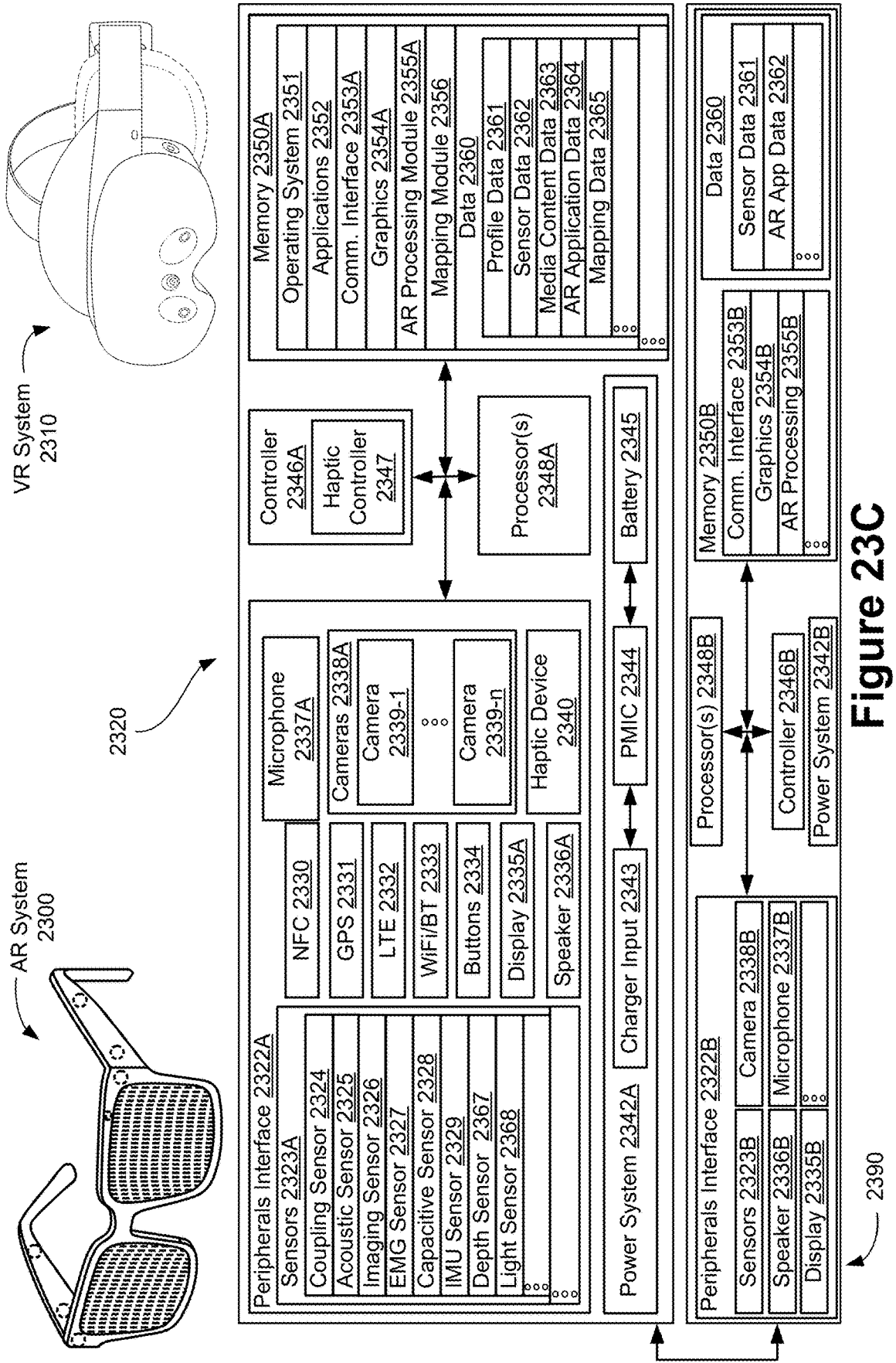

FIGS. 22A and 22B illustrate an example wrist-wearable device 2200, in accordance with some embodiments. The wrist-wearable device 2200 is an instance of the wearable device 2200 described in reference to FIGS. 1A-20 herein, such that the wrist-wearable devices should be understood to have the features of the wrist-wearable device 2200 and vice versa. FIG. 22A illustrates components of the wrist-wearable device 2200, which can be used individually or in combination, including combinations that include other electronic devices and/or electronic components.

FIG. 22A shows a wearable band 2210 and a watch body 2220 (or capsule) being coupled, as discussed below, to form the wrist-wearable device 2200. The wrist-wearable device 2200 can perform various functions and/or operations associated with navigating through user interfaces and selectively opening applications, as well as the functions and/or operations described above with reference to FIGS. 1A-20.

As will be described in more detail below, operations executed by the wrist-wearable device 2200 can include: (i) presenting content to a user (e.g., displaying visual content via a display 2205); (ii) detecting (e.g., sensing) user input (e.g., sensing a touch on peripheral button 2223 and/or at a touch screen of the display 2205, a hand gesture detected by sensors (e.g., biopotential sensors)); (iii) sensing biometric data via one or more sensors 2213 (e.g., neuromuscular signals, heart rate, temperature, sleep, etc.); messaging (e.g., text, speech, video, etc.); image capture via one or more imaging devices or cameras 2225; wireless communications (e.g., cellular, near field, Wi-Fi, personal area network, etc.); location determination; financial transactions; providing haptic feedback; alarms; notifications; biometric authentication; health monitoring; sleep monitoring; etc.

The above-example functions can be executed independently in the watch body 2220, independently in the wearable band 2210, and/or via an electronic communication between the watch body 2220 and the wearable band 2210. In some embodiments, functions can be executed on the wrist-wearable device 2200 while an AR environment is being presented (e.g., via one of the AR systems 2100a and 2100b). As the skilled artisan will appreciate upon reading the descriptions provided herein, the novel wearable devices described herein can be used with other types of AR environments.

The wearable band 2210 can be configured to be worn by a user such that an inner (or inside) surface of the wearable structure 2211 of the wearable band 2210 is in contact with the user's skin. When worn by a user, sensors 2213 contact the user's skin. The sensors 2213 can sense biometric data such as a user's heart rate, saturated oxygen level, temperature, sweat level, neuromuscular signal sensors, or a combination thereof. The sensors 2213 can also sense data about a user's environment including a user's motion, altitude, location, orientation, gait, acceleration, position, or a combination thereof. In some embodiment, the sensors 2213 are configured to track a position and/or motion of the wearable band 2210. The one or more sensors 2213 can include any of the sensors defined above and/or discussed below with respect to FIG. 22B.

The one or more sensors 2213 can be distributed on an inside and/or an outside surface of the wearable band 2210. In some embodiments, the one or more sensors 2213 are uniformly spaced along the wearable band 2210. Alternatively, in some embodiments, the one or more sensors 2213 are positioned at distinct points along the wearable band 2210. As shown in FIG. 22A, the one or more sensors 2213 can be the same or distinct. For example, in some embodiments, the one or more sensors 2213 can be shaped as a pill (e.g., sensor 2213a), an oval, a circle a square, an oblong (e.g., sensor 2213c) and/or any other shape that maintains contact with the user's skin (e.g., such that neuromuscular signal and/or other biometric data can be accurately measured at the user's skin). In some embodiments, the one or more sensors 2213 are aligned to form pairs of sensors (e.g., for sensing neuromuscular signals based on differential sensing within each respective sensor). For example, sensor 2213b is aligned with an adjacent sensor to form sensor pair 2214a and sensor 2213d aligned with an adjacent sensor to form sensor pair 2214b. In some embodiments, the wearable band 2210 does not have a sensor pair. Alternatively, in some embodiments, the wearable band 2210 has a predetermined number of sensor pairs (one pair of sensors, three pairs of sensors, four pairs of sensors, six pairs of sensors, sixteen pairs of sensors, etc.).

The wearable band 2210 can include any suitable number of sensors 2213. In some embodiments, the number and arrangement of sensors 2213 depends on the particular application for which the wearable band 2210 is used. For instance, a wearable band 2210 configured as an armband, wristband, or chest-band may include a plurality of sensors 2213 with different number of sensors 2213 and different arrangement for each use case, such as medical use cases as compared to gaming or general day-to-day use cases.

In accordance with some embodiments, the wearable band 2210 further includes an electrical ground electrode and a shielding electrode. The electrical ground and shielding electrodes, like the sensors 2213, can be distributed on the inside surface of the wearable band 2210 such that they contact a portion of the user's skin. For example, the electrical ground and shielding electrodes can be at an inside surface of coupling mechanism 2216 or an inside surface of a wearable structure 2211. The electrical ground and shielding electrodes can be formed and/or use the same components as the sensors 2213. In some embodiments, the wearable band 2210 includes more than one electrical ground electrode and more than one shielding electrode.

The sensors 2213 can be formed as part of the wearable structure 2211 of the wearable band 2210. In some embodiments, the sensors 2213 are flush or substantially flush with the wearable structure 2211 such that they do not extend beyond the surface of the wearable structure 2211. While flush with the wearable structure 2211, the sensors 2213 are still configured to contact the user's skin (e.g., via a skin-contacting surface). Alternatively, in some embodiments, the sensors 2213 extend beyond the wearable structure 2211 a predetermined distance (e.g., 0.1-2 mm) to make contact and depress into the user's skin. In some embodiment, the sensors 2213 are coupled to an actuator (not shown) configured to adjust an extension height (e.g., a distance from the surface of the wearable structure 2211) of the sensors 2213 such that the sensors 2213 make contact and depress into the user's skin. In some embodiments, the actuators adjust the extension height between 0.01 mm-1.2 mm. This allows the user to customize the positioning of the sensors 2213 to improve the overall comfort of the wearable band 2210 when worn while still allowing the sensors 2213 to contact the user's skin. In some embodiments, the sensors 2213 are indistinguishable from the wearable structure 2211 when worn by the user.

The wearable structure 2211 can be formed of an elastic material, elastomers, etc. configured to be stretched and fitted to be worn by the user. In some embodiments, the wearable structure 2211 is a textile or woven fabric. As described above, the sensors 2213 can be formed as part of a wearable structure 2211. For example, the sensors 2213 can be molded into the wearable structure 2211 or be integrated into a woven fabric (e.g., the sensors 2213 can be sewn into the fabric and mimic the pliability of fabric (e.g., the sensors 2213 can be constructed from a series woven strands of fabric)).

The wearable structure 2211 can include flexible electronic connectors that interconnect the sensors 2213, the electronic circuitry, and/or other electronic components (described below in reference to FIG. 22B) that are enclosed in the wearable band 2210. In some embodiments, the flexible electronic connectors are configured to interconnect the sensors 2213, the electronic circuitry, and/or other electronic components of the wearable band 2210 with respective sensors and/or other electronic components of another electronic device (e.g., watch body 2220). The flexible electronic connectors are configured to move with the wearable structure 2211 such that the user adjustment to the wearable structure 2211 (e.g., resizing, pulling, folding, etc.) does not stress or strain the electrical coupling of components of the wearable band 2210.

As described above, the wearable band 2210 is configured to be worn by a user. In particular, the wearable band 2210 can be shaped or otherwise manipulated to be worn by a user. For example, the wearable band 2210 can be shaped to have a substantially circular shape such that it can be configured to be worn on the user's lower arm or wrist. Alternatively, the wearable band 2210 can be shaped to be worn on another body part of the user, such as the user's upper arm (e.g., around a bicep), forearm, chest, legs, etc. The wearable band 2210 can include a retaining mechanism 2212 (e.g., a buckle, a hook and loop fastener, etc.) for securing the wearable band 2210 to the user's wrist or other body part. While the wearable band 2210 is worn by the user, the sensors 2213 sense data (referred to as sensor data) from the user's skin. In particular, the sensors 2213 of the wearable band 2210 obtain (e.g., sense and record) neuromuscular signals.

The sensed data (e.g., sensed neuromuscular signals) can be used to detect and/or determine the user's intention to perform certain motor actions. In particular, the sensors 2213 sense and record neuromuscular signals from the user as the user performs muscular activations (e.g., movements, gestures, etc.). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 2205 of the wrist-wearable device 2200 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 2213 can be used to provide a user with an enhanced interaction with a physical object (e.g., devices communicatively coupled with the wearable band 2210) and/or a virtual object in an artificial-reality application generated by an artificial-reality system (e.g., user interface objects presented on the display 2205, or another computing device (e.g., a smartphone)).

In some embodiments, the wearable band 2210 includes one or more haptic devices 2246 (FIG. 22B; e.g., a vibratory haptic actuator) that are configured to provide haptic feedback (e.g., a cutaneous and/or kinesthetic sensation, etc.) to the user's skin. The sensors 2213, and/or the haptic devices 2246 can be configured to operate in conjunction with multiple applications including, without limitation, health monitoring, social media, games, and artificial reality (e.g., the applications associated with artificial reality).

The wearable band 2210 can also include coupling mechanism 2216 (e.g., a cradle or a shape of the coupling mechanism can correspond to shape of the watch body 2220 of the wrist-wearable device 2200) for detachably coupling a capsule (e.g., a computing unit) or watch body 2220 (via a coupling surface of the watch body 2220) to the wearable band 2210. In particular, the coupling mechanism 2216 can be configured to receive a coupling surface proximate to the bottom side of the watch body 2220 (e.g., a side opposite to a front side of the watch body 2220 where the display 2205 is located), such that a user can push the watch body 2220 downward into the coupling mechanism 2216 to attach the watch body 2220 to the coupling mechanism 2216. In some embodiments, the coupling mechanism 2216 can be configured to receive a top side of the watch body 2220 (e.g., a side proximate to the front side of the watch body 2220 where the display 2205 is located) that is pushed upward into the cradle, as opposed to being pushed downward into the coupling mechanism 2216. In some embodiments, the coupling mechanism 2216 is an integrated component of the wearable band 2210 such that the wearable band 2210 and the coupling mechanism 2216 are a single unitary structure. In some embodiments, the coupling mechanism 2216 is a type of frame or shell that allows the watch body 2220 coupling surface to be retained within or on the wearable band 2210 coupling mechanism 2216 (e.g., a cradle, a tracker band, a support base, a clasp, etc.).

The coupling mechanism 2216 can allow for the watch body 2220 to be detachably coupled to the wearable band 2210 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 2220 to the wearable band 2210 and to decouple the watch body 2220 from the wearable band 2210. For example, a user can twist, slide, turn, push, pull, or rotate the watch body 2220 relative to the wearable band 2210, or a combination thereof, to attach the watch body 2220 to the wearable band 2210 and to detach the watch body 2220 from the wearable band 2210. Alternatively, as discussed below, in some embodiments, the watch body 2220 can be decoupled from the wearable band 2210 by actuation of the release mechanism 2229.

The wearable band 2210 can be coupled with a watch body 2220 to increase the functionality of the wearable band 2210 (e.g., converting the wearable band 2210 into a wrist-wearable device 2200, adding an additional computing unit and/or battery to increase computational resources and/or a battery life of the wearable band 2210, adding additional sensors to improve sensed data, etc.). As described above, the wearable band 2210 (and the coupling mechanism 2216) is configured to operate independently (e.g., execute functions independently) from watch body 2220. For example, the coupling mechanism 2216 can include one or more sensors 2213 that contact a user's skin when the wearable band 2210 is worn by the user and provide sensor data for determining control commands.

A user can detach the watch body 2220 (or capsule) from the wearable band 2210 in order to reduce the encumbrance of the wrist-wearable device 2200 to the user. For embodiments in which the watch body 2220 is removable, the watch body 2220 can be referred to as a removable structure, such that in these embodiments the wrist-wearable device 2200 includes a wearable portion (e.g., the wearable band 2210) and a removable structure (the watch body 2220).

Turning to the watch body 2220, the watch body 2220 can have a substantially rectangular or circular shape. The watch body 2220 is configured to be worn by the user on their wrist or on another body part. More specifically, the watch body 2220 is sized to be easily carried by the user, attached on a portion of the user's clothing, and/or coupled to the wearable band 2210 (forming the wrist-wearable device 2200). As described above, the watch body 2220 can have a shape corresponding to the coupling mechanism 2216 of the wearable band 2210. In some embodiments, the watch body 2220 includes a single release mechanism 2229 or multiple release mechanisms (e.g., two release mechanisms 2229 positioned on opposing sides of the watch body 2220, such as spring-loaded buttons) for decoupling the watch body 2220 and the wearable band 2210. The release mechanism 2229 can include, without limitation, a button, a knob, a plunger, a handle, a lever, a fastener, a clasp, a dial, a latch, or a combination thereof.

A user can actuate the release mechanism 2229 by pushing, turning, lifting, depressing, shifting, or performing other actions on the release mechanism 2229. Actuation of the release mechanism 2229 can release (e.g., decouple) the watch body 2220 from the coupling mechanism 2216 of the wearable band 2210, allowing the user to use the watch body 2220 independently from wearable band 2210, and vice versa. For example, decoupling the watch body 2220 from the wearable band 2210 can allow the user to capture images using rear-facing camera 2225B. Although the is shown positioned at a corner of watch body 2220, the release mechanism 2229 can be positioned anywhere on watch body 2220 that is convenient for the user to actuate. In addition, in some embodiments, the wearable band 2210 can also include a respective release mechanism for decoupling the watch body 2220 from the coupling mechanism 2216. In some embodiments, the release mechanism 2229 is optional and the watch body 2220 can be decoupled from the coupling mechanism 2216 as described above (e.g., via twisting, rotating, etc.).

The watch body 2220 can include one or more peripheral buttons 2223 and 2227 for performing various operations at the watch body 2220. For example, the peripheral buttons 2223 and 2227 can be used to turn on or wake (e.g., transition from a sleep state to an active state) the display 2205, unlock the watch body 2220, increase or decrease a volume, increase or decrease a brightness, interact with one or more applications, interact with one or more user interfaces, etc. Additionally, or alternatively, in some embodiments, the display 2205 operates as a touch screen and allows the user to provide one or more inputs for interacting with the watch body 2220.

In some embodiments, the watch body 2220 includes one or more sensors 2221. The sensors 2221 of the watch body 2220 can be the same or distinct from the sensors 2213 of the wearable band 2210. The sensors 2221 of the watch body 2220 can be distributed on an inside and/or an outside surface of the watch body 2220. In some embodiments, the sensors 2221 are configured to contact a user's skin when the watch body 2220 is worn by the user. For example, the sensors 2221 can be placed on the bottom side of the watch body 2220 and the coupling mechanism 2216 can be a cradle with an opening that allows the bottom side of the watch body 2220 to directly contact the user's skin. Alternatively, in some embodiments, the watch body 2220 does not include sensors that are configured to contact the user's skin (e.g., including sensors internal and/or external to the watch body 2220 that configured to sense data of the watch body 2220 and the watch body 2220's surrounding environment). In some embodiment, the sensors 2213 are configured to track a position and/or motion of the watch body 2220.

The watch body 2220 and the wearable band 2210 can share data using a wired communication method (e.g., a Universal Asynchronous Receiver/Transmitter (UART), a USB transceiver, etc.) and/or a wireless communication method (e.g., near field communication, Bluetooth, etc.). For example, the watch body 2220 and the wearable band 2210 can share data sensed by the sensors 2213 and 2221, as well as application and device specific information (e.g., active and/or available applications, output devices (e.g., display, speakers, etc.), input devices (e.g., touch screen, microphone, imaging sensors, etc.).

In some embodiments, the watch body 2220 can include, without limitation, a front-facing camera 2225A and/or a rear-facing camera 2225B, sensors 2221 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 2263; FIG. 22B), a touch sensor, a sweat sensor, etc.). In some embodiments, the watch body 2220 can include one or more haptic devices 2276 (FIG. 22B; a vibratory haptic actuator) that is configured to provide haptic feedback (e.g., a cutaneous and/or kinesthetic sensation, etc.) to the user. The sensors 2221 and/or the haptic device 2276 can also be configured to operate in conjunction with multiple applications including, without limitation, health monitoring applications, social media applications, game applications, and artificial reality applications (e.g., the applications associated with artificial reality).

As described above, the watch body 2220 and the wearable band 2210, when coupled, can form the wrist-wearable device 2200. When coupled, the watch body 2220 and wearable band 2210 operate as a single device to execute functions (operations, detections, communications, etc.) described herein. In some embodiments, each device is provided with particular instructions for performing the one or more operations of the wrist-wearable device 2200. For example, in accordance with a determination that the watch body 2220 does not include neuromuscular signal sensors, the wearable band 2210 can include alternative instructions for performing associated instructions (e.g., providing sensed neuromuscular signal data to the watch body 2220 via a different electronic device). Operations of the wrist-wearable device 2200 can be performed by the watch body 2220 alone or in conjunction with the wearable band 2210 (e.g., via respective processors and/or hardware components) and vice versa. In some embodiments, operations of the wrist-wearable device 2200, the watch body 2220, and/or the wearable band 2210 can be performed in conjunction with one or more processors and/or hardware components of another communicatively coupled device (e.g., the HIPD 200; FIGS. 2A-2B).

As described below with reference to the block diagram of FIG. 22B, the wearable band 2210 and/or the watch body 2220 can each include independent resources required to independently execute functions. For example, the wearable band 2210 and/or the watch body 2220 can each include a power source (e.g., a battery), a memory, data storage, a processor (e.g., a central processing unit (CPU)), communications, a light source, and/or input/output devices.

FIG. 22B shows block diagrams of a computing system 2230 corresponding to the wearable band 2210, and a computing system 2260 corresponding to the watch body 2220, according to some embodiments. A computing system of the wrist-wearable device 2200 includes a combination of components of the wearable band computing system 2230 and the watch body computing system 2260, in accordance with some embodiments.

The watch body 2220 and/or the wearable band 2210 can include one or more components shown in watch body computing system 2260. In some embodiments, a single integrated circuit includes all or a substantial portion of the components of the watch body computing system 2260 are included in a single integrated circuit. Alternatively, in some embodiments, components of the watch body computing system 2260 are included in a plurality of integrated circuits that are communicatively coupled. In some embodiments, the watch body computing system 2260 is configured to couple (e.g., via a wired or wireless connection) with the wearable band computing system 2230, which allows the computing systems to share components, distribute tasks, and/or perform other operations described herein (individually or as a single device).

The watch body computing system 2260 can include one or more processors 2279, a controller 2277, a peripherals interface 2261, a power system 2295, and memory (e.g., a memory 2280), each of which are defined above and described in more detail below.

The power system 2295 can include a charger input 2296, a power-management integrated circuit (PMIC) 2297, and a battery 2298, each are which are defined above. In some embodiments, a watch body 2220 and a wearable band 2210 can have respective charger inputs (e.g., charger input 2296 and 2257), respective batteries (e.g., battery 2298 and 2259), and can share power with each other (e.g., the watch body 2220 can power and/or charge the wearable band 2210, and vice versa). Although watch body 2220 and/or the wearable band 2210 can include respective charger inputs, a single charger input can charge both devices when coupled. The watch body 2220 and the wearable band 2210 can receive a charge using a variety of techniques. In some embodiments, the watch body 2220 and the wearable band 2210 can use a wired charging assembly (e.g., power cords) to receive the charge. Alternatively, or in addition, the watch body 2220 and/or the wearable band 2210 can be configured for wireless charging. For example, a portable charging device can be designed to mate with a portion of watch body 2220 and/or wearable band 2210 and wirelessly deliver usable power to a battery of watch body 2220 and/or wearable band 2210. The watch body 2220 and the wearable band 2210 can have independent power systems (e.g., power system 2295 and 2256) to enable each to operate independently. The watch body 2220 and wearable band 2210 can also share power (e.g., one can charge the other) via respective PMICs (e.g., PMICs 2297 and 2258) that can share power over power and ground conductors and/or over wireless charging antennas.

In some embodiments, the peripherals interface 2261 can include one or more sensors 2221, many of which listed below are defined above. The sensors 2221 can include one or more coupling sensor 2262 for detecting when the watch body 2220 is coupled with another electronic device (e.g., a wearable band 2210). The sensors 2221 can include imaging sensors 2263 (one or more of the cameras 2225, and/or separate imaging sensors 2263 (e.g., thermal-imaging sensors)). In some embodiments, the sensors 2221 include one or more SpO2 sensors 2264. In some embodiments, the sensors 2221 include one or more biopotential-signal sensors (e.g., EMG sensors 2265, which may be disposed on a user-facing portion of the watch body 2220 and/or the wearable band 2210). In some embodiments, the sensors 2221 include one or more capacitive sensors 2266. In some embodiments, the sensors 2221 include one or more heart rate sensors 2267. In some embodiments, the sensors 2221 include one or more IMU sensors 2268. In some embodiments, one or more IMU sensors 2268 can be configured to detect movement of a user's hand or other location that the watch body 2220 is placed or held).

In some embodiments, the peripherals interface 2261 includes a near-field communication (NFC) component 2269, a global-position system (GPS) component 2270, a long-term evolution (LTE) component 2271, and/or a Wi-Fi and/or Bluetooth communication component 2272. In some embodiments, the peripherals interface 2261 includes one or more buttons 2273 (e.g., the peripheral buttons 2223 and 2227 in FIG. 22A), which, when selected by a user, cause operation to be performed at the watch body 2220. In some embodiments, the peripherals interface 2261 includes one or more indicators, such as a light emitting diode (LED), to provide a user with visual indicators (e.g., message received, low battery, active microphone and/or camera, etc.).

The watch body 2220 can include at least one display 2205, for displaying visual representations of information or data to the user, including user-interface elements and/or three-dimensional virtual objects. The display can also include a touch screen for inputting user inputs, such as touch gestures, swipe gestures, and the like. The watch body 2220 can include at least one speaker 2274 and at least one microphone 2275 for providing audio signals to the user and receiving audio input from the user. The user can provide user inputs through the microphone 2275 and can also receive audio output from the speaker 2274 as part of a haptic event provided by the haptic controller 2278. The watch body 2220 can include at least one camera 2225, including a front-facing camera 2225A and a rear-facing camera 2225B. The cameras 2225 can include ultra-wide-angle cameras, wide angle cameras, fish-eye cameras, spherical cameras, telephoto cameras, a depth-sensing cameras, or other types of cameras.

The watch body computing system 2260 can include one or more haptic controllers 2278 and associated componentry (e.g., haptic devices 2276) for providing haptic events at the watch body 2220 (e.g., a vibrating sensation or audio output in response to an event at the watch body 2220). The haptic controllers 2278 can communicate with one or more haptic devices 2276, such as electroacoustic devices, including a speaker of the one or more speakers 2274 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 2278 can provide haptic events to that are capable of being sensed by a user of the watch body 2220. In some embodiments, the one or more haptic controllers 2278 can receive input signals from an application of the applications 2282.

In some embodiments, the computer system 2230 and/or the computer system 2260 can include memory 2280, which can be controlled by a memory controller of the one or more controllers 2277 and/or one or more processors 2279. In some embodiments, software components stored in the memory 2280 include one or more applications 2282 configured to perform operations at the watch body 2220. In some embodiments, the one or more applications 2282 include games, word processors, messaging applications, calling applications, web browsers, social media applications, media streaming applications, financial applications, calendars, clocks, etc. In some embodiments, software components stored in the memory 2280 include one or more communication interface modules 2283 as defined above. In some embodiments, software components stored in the memory 2280 include one or more graphics modules 2284 for rendering, encoding, and/or decoding audio and/or visual data; and one or more data management modules 2285 for collecting, organizing, and/or providing access to the data 2287 stored in memory 2280. In some embodiments, software components stored in the memory 2280 include an AR processing module 2286A (analogous to AR processing module 285; FIG. 2E). In some embodiments, one or more of applications 2282 and/or one or more modules can work in conjunction with one another to perform various tasks at the watch body 2220.

In some embodiments, software components stored in the memory 2280 can include one or more operating systems 2281 (e.g., a Linux-based operating system, an Android operating system, etc.). The memory 2280 can also include data 2287. The data 2287 can include profile data 2288A, sensor data 2289A, media content data 2290, application data 2291, and AR processing data 2292A (analogous to AR processing data 294; FIG. 2E).

It should be appreciated that the watch body computing system 2260 is an example of a computing system within the watch body 2220, and that the watch body 2220 can have more or fewer components than shown in the watch body computing system 2260, combine two or more components, and/or have a different configuration and/or arrangement of the components. The various components shown in watch body computing system 2260 are implemented in hardware, software, firmware, or a combination thereof, including one or more signal processing and/or application-specific integrated circuits.

Turning to the wearable band computing system 2230, one or more components that can be included in the wearable band 2210 are shown. The wearable band computing system 2230 can include more or fewer components than shown in the watch body computing system 2260, combine two or more components, and/or have a different configuration and/or arrangement of some or all of the components. In some embodiments, all, or a substantial portion of the components of the wearable band computing system 2230 are included in a single integrated circuit. Alternatively, in some embodiments, components of the wearable band computing system 2230 are included in a plurality of integrated circuits that are communicatively coupled. As described above, in some embodiments, the wearable band computing system 2230 is configured to couple (e.g., via a wired or wireless connection) with the watch body computing system 2260, which allows the computing systems to share components, distribute tasks, and/or perform other operations described herein (individually or as a single device).

The wearable band computing system 2230, similar to the watch body computing system 2260, can include one or more processors 2249, one or more controllers 2247 (including one or more haptics controller 2248), a peripherals interface 2231 that can includes one or more sensors 2213 and other peripheral devices, power source (e.g., a power system 2256), and memory (e.g., a memory 2250) that includes an operating system (e.g., an operating system 2251), data (e.g., data 2254 including profile data 2288B, sensor data 2289B, AR processing data 2292B, etc.), and one or more modules (e.g., a communications interface module 2252, a data management module 2253, an AR processing module 2286B, etc.).

The one or more sensors 2213 can be analogous to sensors 2221 of the computer system 2260 and in light of the definitions above. For example, sensors 2213 can include one or more coupling sensors 2232, one or more SpO2 sensor 2234, one or more EMG sensors 2235, one or more capacitive sensor 2236, one or more heart rate sensor 2237, and one or more IMU sensor 2238.

The peripherals interface 2231 can also include other components analogous to those included in the peripheral interface 2261 of the computer system 2260, including an NFC component 2239, a GPS component 2240, an LTE component 2241, a Wi-Fi and/or Bluetooth communication component 2242, and/or one or more haptic devices 2276 as described above in reference to peripherals interface 2261. In some embodiments, the peripherals interface 2231 includes one or more buttons 2243, a display 2233, a speaker 2244, a microphone 2245, and a camera 2255. In some embodiments, the peripherals interface 2231 includes one or more indicators, such as an LED.

It should be appreciated that the wearable band computing system 2230 is an example of a computing system within the wearable band 2210, and that the wearable band 2210 can have more or fewer components than shown in the wearable band computing system 2230, combine two or more components, and/or have a different configuration and/or arrangement of the components. The various components shown in wearable band computing system 2230 can be implemented in one or a combination of hardware, software, firmware, including one or more signal processing and/or application-specific integrated circuits.

The wrist-wearable device 2200 with respect to FIG. 22A is an example of the wearable band 2210 and the watch body 2220 coupled, so the wrist-wearable device 2200 will be understood to include the components shown and described for the wearable band computing system 2230 and the watch body computing system 2260. In some embodiments, wrist-wearable device 2200 has a split architecture (e.g., a split mechanical architecture, a split electrical architecture) between the watch body 2220 and the wearable band 2210. In other words, all of the components shown in the wearable band computing system 2230 and the watch body computing system 2260 can be housed or otherwise disposed in a combined watch device 2200, or within individual components of the watch body 2220, wearable band 2210, and/or portions thereof (e.g., a coupling mechanism 2216 of the wearable band 2210).

The techniques described above can be used with any device for sensing neuromuscular signals, including the arm-wearable devices of FIG. 22A-22B, but could also be used with other types of wearable devices for sensing neuromuscular signals (such as body-wearable or head-wearable devices that might have neuromuscular sensors closer to the brain or spinal column).

In some embodiments, a wrist-wearable device 2200 can be used in conjunction with a head-wearable device described below (e.g., AR device 2300 and VR device 2310) and/or an HIPD 200; and the wrist-wearable device 2200 can also be configured to be used to allow a user to control aspect of the artificial reality (e.g., by using EMG-based gestures to control user interface objects in the artificial reality and/or by allowing a user to interact with the touch-screen on the wrist-wearable device to also control aspects of the artificial reality). Having thus described example wrist-wearable device, attention will now be turned to example head-wearable devices, such AR device 2300 and VR device 2310.

Example Head-Wearable Devices

FIGS. 23A-23C show example head-wearable devices, in accordance with some embodiments. Head-wearable devices can include, but are not limited to, AR devices 2310 (e.g., AR or smart eyewear devices, such as smart glasses, smart monocles, smart contacts, etc.), VR devices 2310 (e.g., VR headsets, head-mounted displays (HMD) s, etc.), or other ocularly coupled devices. The AR devices 2300 and the VR devices 2310 are instances of the head-wearable devices described in reference to FIGS. 1A-20 herein, such that the head-wearable device should be understood to have the features of the AR devices 2300 and/or the VR devices 2310, and vice versa. The AR devices 2300 and the VR devices 2310 can perform various functions and/or operations associated with navigating through user interfaces and selectively opening applications, as well as the functions and/or operations described above with reference to FIGS. 1A-20.

In some embodiments, an AR system (e.g., AR systems 2100a and 2100b; FIGS. 21A-21B-2) includes an AR device 2300 (as shown in FIG. 23A) and/or VR device 2310 (as shown in FIGS. 23B-1-B-2). In some embodiments, the AR device 2300 and the VR device 2310 can include one or more analogous components (e.g., components for presenting interactive artificial-reality environments, such as pro-cessors, memory, and/or presentation devices, including one or more displays and/or one or more waveguides), some of which are described in more detail with respect to FIG. 23C. The head-wearable devices can use display projectors (e.g., display projector assemblies 2307A and 2307B) and/or waveguides for projecting representations of data to a user. Some embodiments of head-wearable devices do not include displays.

FIG. 23A shows an example visual depiction of the AR device 2300 (e.g., which may also be described herein as augmented-reality glasses, and/or smart glasses). The AR device 2300 can work in conjunction with additional electronic components that are not shown in FIGS. 23A, such as a wearable accessory device and/or an intermediary processing device, in electronic communication or otherwise configured to be used in conjunction with the AR device 2300. In some embodiments, the wearable accessory device and/or the intermediary processing device may be configured to couple with the AR device 2300 via a coupling mechanism in electronic communication with a coupling sensor 2324, where the coupling sensor 2324 can detect when an electronic device becomes physically or electronically coupled with the AR device 2300. In some embodiments, the AR device 2300 can be configured to couple to a housing (e.g., a portion of frame 2304 or temple arms 2305), which may include one or more additional coupling mechanisms configured to couple with additional accessory devices. The components shown in FIG. 23A can be implemented in hardware, software, firmware, or a combination thereof, including one or more signal-processing components and/or application-specific integrated circuits (ASICs).

The AR device 2300 includes mechanical glasses components, including a frame 2304 configured to hold one or more lenses (e.g., one or both lenses 2306-1 and 2306-2). One of ordinary skill in the art will appreciate that the AR device 2300 can include additional mechanical components, such as hinges configured to allow portions of the frame 2304 of the AR device 2300 to be folded and unfolded, a bridge configured to span the gap between the lenses 2306-1 and 2306-2 and rest on the user's nose, nose pads configured to rest on the bridge of the nose and provide support for the AR device 2300, earpieces configured to rest on the user's ears and provide additional support for the AR device 2300, temple arms 2305 configured to extend from the hinges to the earpieces of the AR device 2300, and the like. One of ordinary skill in the art will further appreciate that some examples of the AR device 2300 can include none of the mechanical components described herein. For example, smart contact lenses configured to present artificial reality to users may not include any components of the AR device 2300.

The lenses 2306-1 and 2306-2 can be individual displays or display devices (e.g., a waveguide for projected representations). The lenses 2306-1 and 2306-2 may act together or independently to present an image or series of images to a user. In some embodiments, the lenses 2306-1 and 2306-2 can operate in conjunction with one or more display projector assemblies 2307A and 2307B to present image data to a user. While the AR device 2300 includes two displays, embodiments of this disclosure may be implemented in AR devices with a single near-eye display (NED) or more than two NEDs.

The AR device 2300 includes electronic components, many of which will be described in more detail below with respect to FIG. 23C. Some example electronic components are illustrated in FIG. 23A, including sensors 2323-1, 2323-2, 2323-3, 2323-4, 2323-5, and 2323-6, which can be distributed along a substantial portion of the frame 2304 of the AR device 2300. The different types of sensors are described below in reference to FIG. 23C.

The AR device 2300 also includes a left camera 2339A and a right camera 2339B, which are located on different sides of the frame 2304. And the eyewear device includes one or more processors 2348A and 2348B (e.g., an integral microprocessor, such as an ASIC) that is embedded into a portion of the frame 2304.

FIGS. 23B-1 and 23B-2 show an example visual depiction of the VR device 2310 (e.g., a head-mounted display (HMD) 2312, also referred to herein as an artificial-reality headset, a head-wearable device, a VR headset, etc.). The HMD 2312 includes a front body 2314 and a frame 2316 (e.g., a strap or band) shaped to fit around a user's head. In some embodiments, the front body 2314 and/or the frame 2316 includes one or more electronic elements for facilitating presentation of and/or interactions with an AR and/or VR system (e.g., displays, processors (e.g., processor 2348A-1), IMUs, tracking emitter or detectors, sensors, etc.). In some embodiments, the HMD 2312 includes output audio transducers (e.g., an audio transducer 2318-1), as shown in FIG. 23B-2. In some embodiments, one or more components, such as the output audio transducer(s) 2318 and the frame 2316, can be configured to attach and detach (e.g., are detachably attachable) to the HMD 2312 (e.g., a portion or all of the frame 2316, and/or the output audio transducer 2318), as shown in FIG. 23B-2. In some embodiments, coupling a detachable component to the HMD 2312 causes the detachable component to come into electronic communication with the HMD 2312. The VR device 2310 includes electronic components, many of which will be described in more detail below with respect to FIG. 23C.

FIG. 23B-1 to 23B-2 also show that the VR device 2310 one or more cameras, such as the left camera 2339A and the right camera 2339B, which can be analogous to the left and right cameras on the frame 2304 of the AR device 2300. In some embodiments, the VR device 2310 includes one or more additional cameras (e.g., cameras 2339C and 2339D), which can be configured to augment image data obtained by the cameras 2339A and 2339B by providing more information. For example, the camera 2339C can be used to supply color information that is not discerned by cameras 2339A and 2339B. In some embodiments, one or more of the cameras 2339A to 2339D can include an optional IR cut filter configured to remove IR light from being received at the respective camera sensors.

The VR device 2310 can include a housing 2390 storing one or more components of the VR device 2310 and/or additional components of the VR device 2310. The housing 2390 can be a modular electronic device configured to couple with the VR device 2310 (or an AR device 2300) and supplement and/or extend the capabilities of the VR device 2310 (or an AR device 2300). For example, the housing 2390 can include additional sensors, cameras, power sources, processors (e.g., processor 2348A-2), etc. to improve and/or increase the functionality of the VR device 2310. Examples of the different components included in the housing 2390 are described below in reference to FIG. 23C.

Alternatively or in addition, in some embodiments, the head-wearable device, such as the VR device 2310 and/or the AR device 2300), includes, or is communicatively coupled to, another external device (e.g., a paired device), such as an HIPD 200 (discussed above in reference to FIGS. 2A-2E) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as an intermediary processing device (e.g., an HIPD 200, an optional neckband, and/or wearable accessory device) with the head-wearable devices (e.g., an AR device 2300 and/or VR device 2310) enables the head-wearable devices to achieve a similar form factor of a pair of glasses while still providing sufficient battery and computation power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable devices overall while allowing the head-wearable devices to retain its desired functionality. For example, the intermediary processing device (e.g., the HIPD 200) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, storage, etc.) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, like an HIPD 200, can process information generated by one or more sensors of its sensors and/or information provided by other communicatively coupled devices. For example, a head-wearable device can include an IMU, and the intermediary processing device (neckband and/or an HIPD 200) can compute all inertial and spatial calculations from the IMUs located on the head-wearable device. Additional examples of processing performed by a communicatively coupled device, such as the HIPD 200, are provided above in reference to FIGS. 2A-2E.

Artificial-reality systems may include a variety of types of visual feedback mechanisms. For example, display devices in the AR devices 2300 and/or the VR devices 2310 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen. In addition to or instead of using display screens, some artificial-reality systems include one or more projection systems. For example, display devices in the AR device 2300 and/or the VR device 2310 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 2300 and the VR device 2310, either or both of the example head-wearable devices described herein can be configured to present fully-immersive VR scenes presented in substantially all of a user's field of view, additionally or alternatively to, subtler augmented-reality scenes that are presented within a portion, less than all, of the user's field of view.

In some embodiments, the AR device 2300 and/or the VR device 2310 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., wrist-wearable devices which may be incorporated into headwear, gloves, body suits, handheld controllers, environmental devices (e.g., chairs or floormats), and/or any other type of device or system, such as a wrist-wearable device 2200, an HIPD 200, smart textile-based garment (not shown), etc.), and/or other devices described herein.

While the AR device 2300 and/or the VR device 2310 is shown being capable of certain functions, it is understood that an AR device can be an AR device with varying functionalities based on costs and market demands. For example, an AR device may include a single output modality such as an audio output modality. In another example, the AR device may include a low-fidelity display as one of the output modalities, where simple information (e.g., text and/or low-fidelity images/video) is capable of being presented to the user. In yet another example, the AR device can be configured with face-facing light emitting diodes (LEDs) configured to provide a user with information, e.g., an LED around the right-side lens can illuminate to notify the wearer to turn right while directions are being provided or an LED on the left-side can illuminate to notify the wearer to turn left while directions are being provided. In another embodiment, the AR device can include an outward-facing projector such that information (e.g., text information, media) may be displayed on the palm of a user's hand or other suitable surface (e.g., a table, whiteboard). In yet another embodiment, information may also be provided by locally dimming portions of a lens to emphasize portions of the environment in which the user's attention should be directed. Some AR devices can present AR augments either monocularly or binocularly (e.g., an AR augment can be presented at only a single display associated with a single lens as opposed presenting an AR augmented at both lenses to produce a binocular image). In some instances an AR device capable of presenting AR augments binocularly can optionally display AR augments monocularly as well (e.g., for power-saving purposes or other presentation considerations). These examples are non-exhaustive and features of one AR device described above can be combined with features of another AR device described above.

FIG. 23C illustrates a computing system 2320 and an optional housing 2390, each of which show components that can be included in a head-wearable device (e.g., the AR device 2300 and/or the VR device 2310). In some embodiments, more or less components can be included in the optional housing 2390 depending on practical restraints of the respective head-wearable device being described. Additionally, or alternatively, the optional housing 2390 can include additional components to expand and/or augment the functionality of a head-wearable device.

In some embodiments, the computing system 2320 and/or the optional housing 2390 can include one or more peripheral interfaces 2322A and 2322B, one or more power systems 2342A and 2342B (including charger input 2343, PMIC 2344, and battery 2345), one or more controllers 2346A and 2346B (including one or more haptic controllers 2347), one or more processors 2348A and 2348B (as defined above, including any of the examples provided), and memory 2350A and 2350B, which can all be in electronic communication with each other. For example, the one or more processors 2348A and/or 2348B can be configured to execute instructions stored in the memory 2350A and/or 2350B, which can cause a controller of the one or more controllers 2346A and/or 2346B to cause operations to be performed at one or more peripheral devices of the peripherals interfaces 2322A and/or 2322B. In some embodiments, each operation described can occur based on electrical power provided by the power system 2342A and/or 2342B.

In some embodiments, the peripherals interface 2322A can include one or more devices configured to be part of the computing system 2320, many of which have been defined above and/or described with respect to wrist-wearable devices shown in FIGS. 22A and 22B. For example, the peripherals interface can include one or more sensors 2323A. Some example sensors include: one or more coupling sensors 2324, one or more acoustic sensors 2325, one or more imaging sensors 2326, one or more EMG sensors 2327, one or more capacitive sensors 2328, and/or one or more IMU sensors 2329. In some embodiments, the sensors 2323A further include depth sensors 2367, light sensors

2368 and/or any other types of sensors defined above or described with respect to any other embodiments discussed herein.

In some embodiments, the peripherals interface can include one or more additional peripheral devices, including one or more NFC devices 2330, one or more GPS devices 2331, one or more LTE devices 2332, one or more WiFi and/or Bluetooth devices 2333, one or more buttons 2334 (e.g., including buttons that are slidable or otherwise adjustable), one or more displays 2335A, one or more speakers 2336A, one or more microphones 2337A, one or more cameras 2338A (e.g., including the a first camera 2339-1 through nth camera 2339-n, which are analogous to the left camera 2339A and/or the right camera 2339B), one or more haptic devices 2340; and/or any other types of peripheral devices defined above or described with respect to any other embodiments discussed herein.

The head-wearable devices can include a variety of types of visual feedback mechanisms (e.g., presentation devices). For example, display devices in the AR device 2300 and/or the VR device 2310 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes), and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 2335A can be coupled to each of the lenses 2306-1 and 2306-2 of the AR device 2300. The displays 2335A coupled to each of the lenses 2306-1 and 2306-2 can act together or independently to present an image or series of images to a user. In some embodiments, the AR device 2300 and/or the VR device 2310 includes a single display 2335A (e.g., a near-eye display) or more than two displays 2335A.

In some embodiments, a first set of one or more displays 2335A can be used to present an augmented-reality environment, and a second set of one or more display devices 2335A can be used to present a virtual-reality environment. In some embodiments, one or more waveguides are used in conjunction with presenting artificial-reality content to the user of the AR device 2300 and/or the VR device 2310 (e.g., as a means of delivering light from a display projector assembly and/or one or more displays 2335A to the user's eyes). In some embodiments, one or more waveguides are fully or partially integrated into the AR device 2300 and/or the VR device 2310. Additionally, or alternatively to display screens, some artificial-reality systems include one or more projection systems. For example, display devices in the AR device 2300 and/or the VR device 2310 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. The head-wearable devices can also be configured with any other suitable type or form of image projection system. In some embodiments, one or more waveguides are provided additionally or alternatively to the one or more display(s) 2335A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15-50% of the ambient light and/or the real-world live view) can be passed through the user interface element, such that the user can distinguish at least a portion of the physical environment over which the user interface element is being displayed.

The head-wearable devices can include one or more external displays 2335A for presenting information to users. For example, an external display 2335A can be used to show a current battery level, network activity (e.g., connected, disconnected, etc.), current activity (e.g., playing a game, in a call, in a meeting, watching a movie, etc.), and/or other relevant information. In some embodiments, the external displays 2335A can be used to communicate with others. For example, a user of the head-wearable device can cause the external displays 2335A to present a do not disturb notification. The external displays 2335A can also be used by the user to share any information captured by the one or more components of the peripherals interface 2322A and/or generated by head-wearable device (e.g., during operation and/or performance of one or more applications).

The memory 2350A can include instructions and/or data executable by one or more processors 2348A (and/or processors 2348B of the housing 2390) and/or a memory controller of the one or more controllers 2346A (and/or controller 2346B of the housing 2390). The memory 2350A can include one or more operating systems 2351; one or more applications 2352; one or more communication interface modules 2353A; one or more graphics modules 2354A; one or more AR processing modules 2355A (analogous to AR processing module 285; FIG. 2E); mapping module 2356 (analogous to mapping module 287; FIG. 2E); and/or any other types of modules or components defined above or described with respect to any other embodiments discussed herein.

The data 2360 stored in memory 2350A can be used in conjunction with one or more of the applications and/or programs discussed above. The data 2360 can include profile data 2361; sensor data 2362; media content data 2363; AR application data 2364; AR processing data (analogous to AR processing module 294; FIG. 2E); mapping data 2365 (analogous to mapping module 299; FIG. 2E); and/or any other types of data defined above or described with respect to any other embodiments discussed herein.

In some embodiments, the controller 2346A of the head-wearable devices processes information generated by the sensors 2323A on the head-wearable devices and/or another component of the head-wearable devices and/or communicatively coupled with the head-wearable devices (e.g., components of the housing 2390, such as components of peripherals interface 2322B). For example, the controller 2346A can process information from the acoustic sensors 2325 and/or image sensors 2326. For each detected sound, the controller 2346A can perform a direction of arrival (DOA) estimation to estimate a direction from which the detected sound arrived at a head-wearable device. As one or more of the acoustic sensors 2325 detects sounds, the controller 2346A can populate an audio data set with the information (e.g., represented by sensor data 2362).

In some embodiments, a physical electronic connector can convey information between the head-wearable devices and another electronic device, and/or between one or more processors 2348A of the head-wearable devices and the controller 2346A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 200) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 2300 and/or the VR device 2310 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with in AR environment), among a variety of other functions. For example, FIGS. 23B-1 and 23B-2 show the VR device 2310 having cameras 2339A-2339D, which can be used to provide depth information for creating a voxel field and a two-dimensional mesh to provide object information to the user to avoid collisions.

The optional housing 2390 can include analogous components to those describe above with respect to the computing system 2320. For example, the optional housing 2390 can include a respective peripherals interface 2322B including more or less components to those described above with respect to the peripherals interface 2322A. As described above, the components of the optional housing 2390 can be used augment and/or expand on the functionality of the head-wearable devices. For example, the optional housing 2390 can include respective sensors 2323B, speakers 2336B, displays 2335B, microphones 2337B, cameras 2338B, and/or other components to capture and/or present data. Similarly, the optional housing 2390 can include one or more processors 2348B, controllers 2346B, and/or memory 2350B (including respective communication interface modules 2353B; one or more graphics modules 2354B; one or more AR processing modules 2355B, one or more processing modules 2356, etc.) that can be used individually and/or in conjunction with the components of the computing system 2320.

The techniques described above in FIGS. 23A-23C can be used with different head-wearable devices. In some embodiments, the head-wearable devices (e.g., the AR device 2300 and/or the VR device 2310) can be used in conjunction with one or more wearable device such as a wrist-wearable device 2200 (or components thereof), as well as an HIPD 200 (FIGS. 2A-2E).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer-readable storage medium including instructions that, when executed by one or more processors, cause the one or more processors to:

while a handheld intermediary processing device and a head-wearable device are communicatively coupled and share operational data for performing one or more computational tasks:
  identify one or more back-end tasks and one or more front-end tasks associated with performing the one or more computational tasks;
  cause performance of the one or more back-end tasks at the handheld intermediary processing device including updating the operational data to create updated operational data; and
  cause performance of the one or more front-end tasks at the head-wearable device using the updated operational data such that a representation based on the one or more computational tasks is presented to a user by the head-wearable device.

2. The non-transitory computer-readable storage medium of claim 1, wherein the instructions, that when executed, further cause the one or more processors to:
  while the handheld intermediary processing device and a wrist-wearable device are communicatively coupled and share additional operational data for performing one or more additional computational tasks:
    identify one or more additional back-end tasks and one or more additional front-end tasks associated with performing the one or more additional computational tasks;
    cause performance of the one or more additional back-end tasks at the handheld intermediary processing device including updating the additional operational data to create updated additional operational data; and
    cause performance of the one or more additional front-end tasks at one or more of the wrist-wearable device and the head-wearable device based on the updated additional operational data such that a representation of the one or more additional computational tasks is presented to the user.

3. The non-transitory computer-readable storage medium of claim 2, wherein:
  the additional operational data includes neuromuscular signal data captured by the wrist-wearable device;
  the one or more additional computational tasks include hand gesture recognition; and
  the one or more additional back-end tasks include:
    determining an in-air hand gesture performed by the user based on the neuromuscular signal data;
    in response to a determination that the in-air hand gesture is associated with an input command, updating the additional operational data based on the input command, such that the updated additional operational data includes a representation of the input command associated with the in-air hand gesture; and
    causing performance of the one or more additional front-end tasks at one or more of the wrist-wearable device and the head-wearable device based on the updated additional operational data such that a representation of the one or more additional computational tasks is presented to the user.

4. The non-transitory computer-readable storage medium of claim 3, wherein:
  the operational data includes image data captured by the head-wearable device;
  the one or more computational tasks include hand gesture recognition; and
  the one or more back-end tasks include:
    determining an in-air hand gesture performed by the user based on the image data; and
    in response to a determination that the in-air hand gesture is associated with an input command, updating the operational data based on the input command, such that the updated operational data includes a representation of the input command associated with the in-air hand gesture.

5. The non-transitory computer-readable storage medium of claim 4, wherein:
  the one or more back-end tasks include:
    determining an in-air hand gesture performed by the user based on the image data and the neuromuscular signal data, and
    in response to a determination that the in-air hand gesture is associated with an input command, updating at least one of the operational data and the additional operational data based on the input command, such that at least one of the updated operational data and the updated additional operational data includes a representation of the input command associated with the in-air hand gesture.

6. The non-transitory computer-readable storage medium of claim 4, wherein the instructions, that when executed, further cause the one or more processors to:
  in accordance with a determination that a user's hand is within a field-of view of the head-wearable device:
    determine, by the one or more back-end tasks, the in-air hand gesture performed by the user based on the image data, and
    in response to the determination that the in-air hand gesture is associated with the input command, update, by the one or more back-end tasks, the operational data based on the input command, such that the updated operational data includes the representation of the input command associated with the in-air hand gesture; and
  in accordance with a determination that the user's hand is not within the field-of view of the head-wearable device:
    determine, by the one or more back-end tasks, the in-air hand gesture performed by the user based on the neuromuscular signal data, and
    in response to the determination that the in-air hand gesture is associated with the input command, update, by the one or more back-end tasks, the additional operational data based on the input command, such that the updated additional operational data includes the representation of the input command associated with the in-air hand gesture.

7. The non-transitory computer-readable storage medium of claim 1, wherein the instructions, that when executed, further cause the one or more processors to:
  before the handheld intermediary processing device and the head-wearable device are communicatively coupled, detect, by the handheld intermediary processing device, the head-wearable device within a proximity to the handheld intermediary processing device and associated with the handheld intermediary processing device; and
  in accordance with a determination that the head-wearable device is within the proximity to the handheld intermediary processing device and associated with the handheld intermediary processing device, communicatively couple the head-wearable device and the handheld intermediary processing device.

8. The non-transitory computer-readable storage medium of claim 7, wherein the proximity is twenty feet.

9. The non-transitory computer-readable storage medium of claim 7, wherein the detection, by the handheld intermediary processing device, of the head-wearable device is within the proximity to the handheld intermediary processing device and associated with the handheld intermediary processing device is based on:
receiving, from the handheld intermediary device, a signal to communicatively couple with the head-wearable device within the proximity of the handheld intermediary processing device.

10. The non-transitory computer-readable storage medium of claim 7, wherein the detection, by the handheld intermediary processing device, of the head-wearable device is within the proximity to the handheld intermediary processing device and associated with the handheld intermediary processing device is based on:
receiving, from the head-wearable device, a signal to communicatively couple with the handheld intermediary processing device within the proximity of the head-wearable device.

11. The non-transitory computer-readable storage medium of claim 1, wherein the identification of the one or more back-end tasks and the one or more front-end tasks associated with performing the one or more computational tasks comprises one or more of:
detecting respective battery levels of the head-wearable device and the handheld intermediary processing device
detecting respective thermal levels of the head-wearable device and the handheld intermediary processing device
detecting respective time-of-completions for a task of the head-wearable device and the handheld intermediary processing device
detecting respective available computational resources of the head-wearable device and the handheld intermediary processing device.

12. The non-transitory computer-readable storage medium of claim 1, wherein:
the one or more back-end tasks includes one of generating and processing one or more of image data, audio data, and haptic data based on the operational data;
the one or more front end tasks includes presenting a representation of one or more of image data, audio data, and haptic data based on the operational data.

13. The non-transitory computer-readable storage medium of claim 12, wherein the generation of audio data, based on the operational data, includes music, alerts, alarms.

14. The non-transitory computer-readable storage medium of claim 12, wherein the generation of haptic data, based on the operational data, includes, alerts, notifications, urgency, semantic contextual haptics.

15. The non-transitory computer-readable storage medium of claim 12, wherein the generation of image data, based on the operational data, includes upsampling image data included in the operational data.

16. The non-transitory computer-readable storage medium of claim 12, wherein the generation of image data, based on the operational data, includes generating an artificial reality (AR) representation of the image data.

17. The non-transitory computer-readable storage medium of claim 1, wherein the instructions, that when executed, further cause the one or more processors to:
identify additional front-end tasks associated with performing the one or more computational tasks, and
cause performance of the additional front-end tasks at the handheld intermediary processing device using the updated operational data such that an additional representation based on the one or more computational tasks is presented to the user by the handheld intermediary processing device.

18. The non-transitory computer-readable storage medium of claim 1, wherein the updated operational data is simultaneous localization and mapping (SLAM) data indicating a position of the handheld intermediary processing device.

19. A method comprising:
while a handheld intermediary processing device and a head-wearable device are communicatively coupled and share operational data for performing one or more computational tasks:
identifying one or more back-end tasks and one or more front-end tasks associated with performing the one or more computational tasks;
causing performance of the one or more back-end tasks at the handheld intermediary processing device including updating the operational data to create updated operational data; and
causing performance of the one or more front-end tasks at the head-wearable device using the updated operational data such that a representation based on the one or more computational tasks is presented to a user by the head-wearable device.

20. A system that includes:
a handheld intermediary processing device;
a head-wearable device;
one or more programs, wherein the one or more programs are stored in memory and configured to be executed by one or more processors, the one or more programs including instructions for:
while the handheld intermediary processing device and the head-wearable device are communicatively coupled and share operational data for performing one or more computational tasks:
identifying one or more back-end tasks and one or more front-end tasks associated with performing the one or more computational tasks;
causing performance of the one or more back-end tasks at the handheld intermediary processing device including updating the operational data to create updated operational data; and
causing performance of the one or more front-end tasks at the head-wearable device using the updated operational data such that a representation based on the one or more computational tasks is presented to a user by the head-wearable device.

* * * * *